United States Patent [19]

Hoffman et al.

[11] 4,177,513
[45] Dec. 4, 1979

[54] TASK HANDLING APPARATUS FOR A COMPUTER SYSTEM

[75] Inventors: Roy L. Hoffman, Pine Island; William G. Kempke, Rochester; John W. McCullough, Rochester; Frank G. Soltis, Rochester; Richard T. Turner, Rochester, all of Minn.

[73] Assignee: International Business Machines Corporation, Armonk, N.Y.

[21] Appl. No.: 813,901

[22] Filed: Jul. 8, 1977

[51] Int. Cl.² ............................................. G06F 9/18
[52] U.S. Cl. ................................................... 364/200
[58] Field of Search ................. 364/200 MS File, 900

[56] References Cited

U.S. PATENT DOCUMENTS

| | | | |
|---|---|---|---|
| 3,447,135 | 5/1969 | Calta et al. | 364/200 |
| 3,496,551 | 2/1970 | Driscoll et al. | 364/200 |
| 3,530,438 | 9/1970 | Mellen et al. | 364/200 |
| 3,594,732 | 7/1971 | Mendelson et al. | 364/200 |
| 3,599,162 | 8/1971 | Byrns et al. | 364/200 |
| 3,665,415 | 5/1972 | Beard et al. | 364/200 |
| 3,699,530 | 10/1972 | Capowski et al. | 364/200 |
| 3,725,864 | 4/1973 | Clark et al. | 364/200 |
| 3,774,163 | 11/1973 | Recoque | 364/200 |
| 3,944,985 | 3/1976 | Brandstaetter et al. | 364/200 |
| 4,015,242 | 3/1977 | Anceau et al. | 364/200 |
| 4,084,228 | 4/1978 | Dufond et al. | 364/200 |

*Primary Examiner*—Mark E. Nusbaum
*Attorney, Agent, or Firm*—Donald F. Voss

[57] ABSTRACT

Task handling apparatus in a computer system is structured to be common to system control tasks, user tasks and I/O tasks. Although the task handling apparatus contains a task priority structure, all tasks are handled in the same manner, and there are no fixed interrupt levels for I/O tasks. There are N levels of priority, and N is variable. Each task is a server for a functional request. Task dispatching elements (TDE's) are enqueued in priority sequence on a task dispatching queue (TDQ). A task dispatcher functions to dispatch the highest priority TDE on the TDQ, if any, and to perform task switching. Intertask communication is accomplished by send message, send count, receive message and receive count mechanisms, and is coupled with task synchronization. Task synchronization is achieved by dequeueing and enqueueing TDE's on the TDQ. An active task becomes inactive dispatchable when a higher priority TDE is enqueued on the TDQ by send message or send count mechanisms. The active task becomes inactive waiting when a receive message or receive count is not satisfied. An inactive dispatchable task becomes the active task when it becomes the highest priority enqueued TDE on the TDQ by the receive message or receive count mechanisms. An inactive waiting task becomes either the active task or an inactive dispatchable task after being enqueued on the TDQ by the send message or send count mechanisms, depending upon whether it is the highest or other than the highest priority TDE on the TDQ.

9 Claims, 38 Drawing Figures

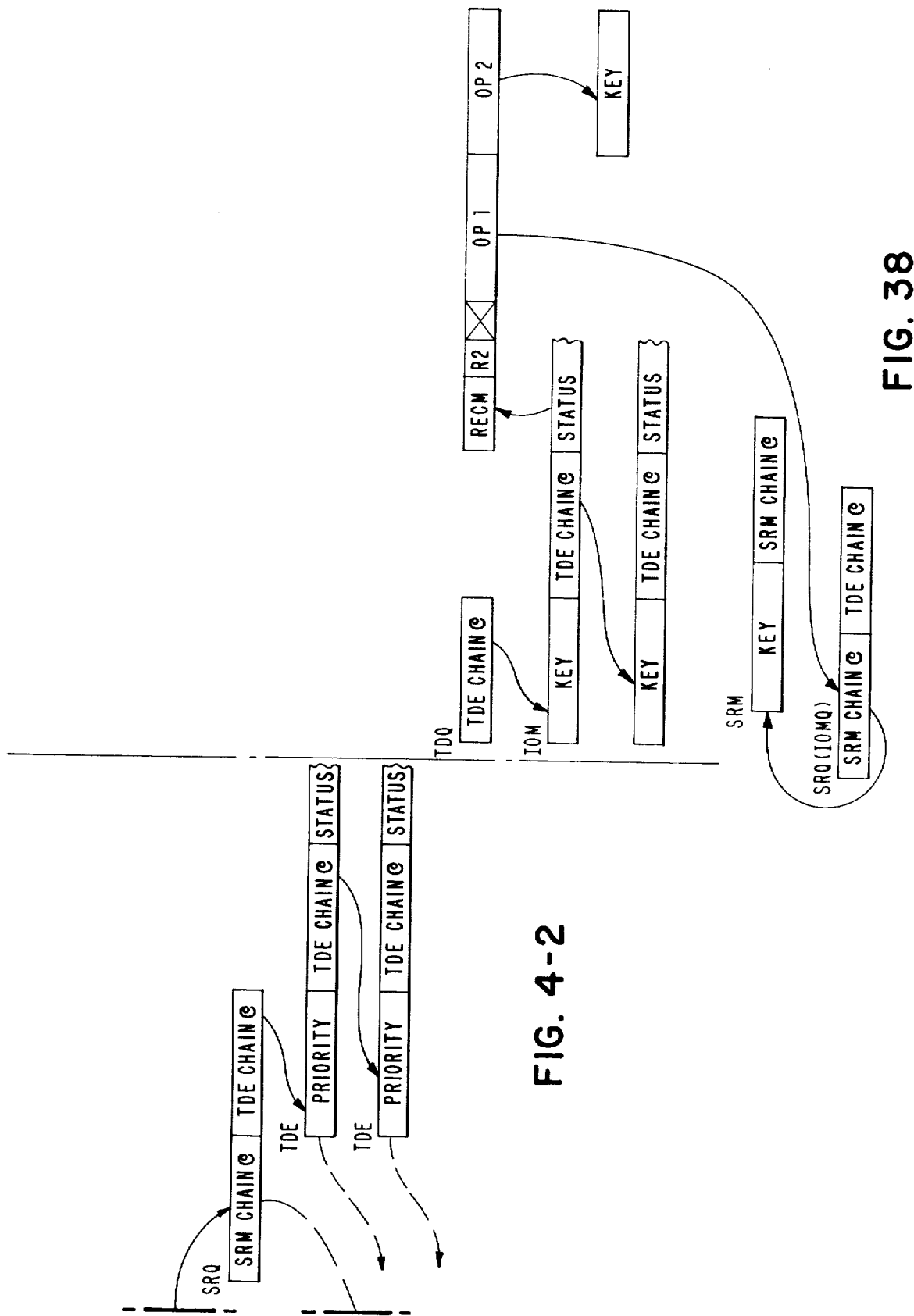

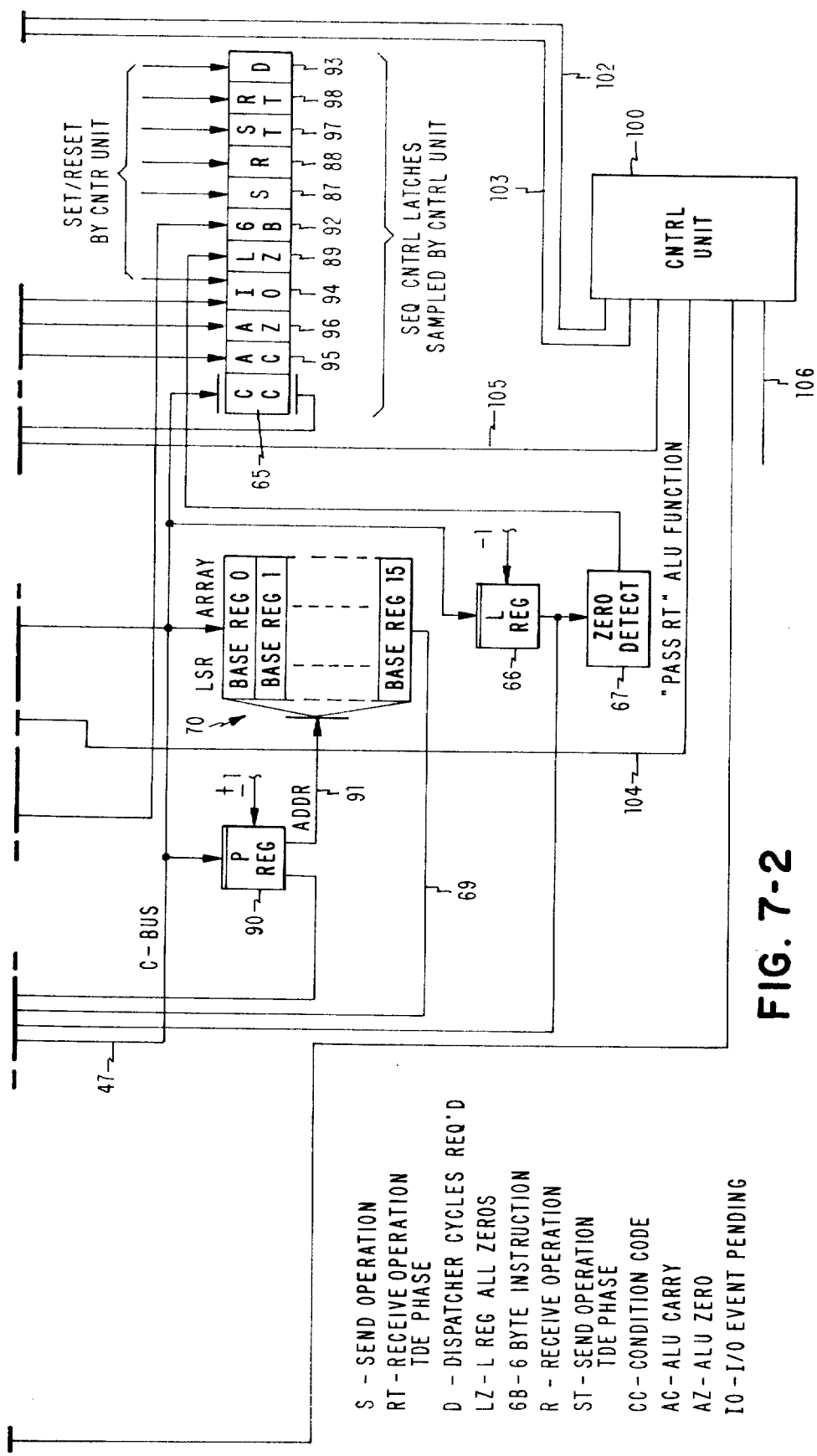

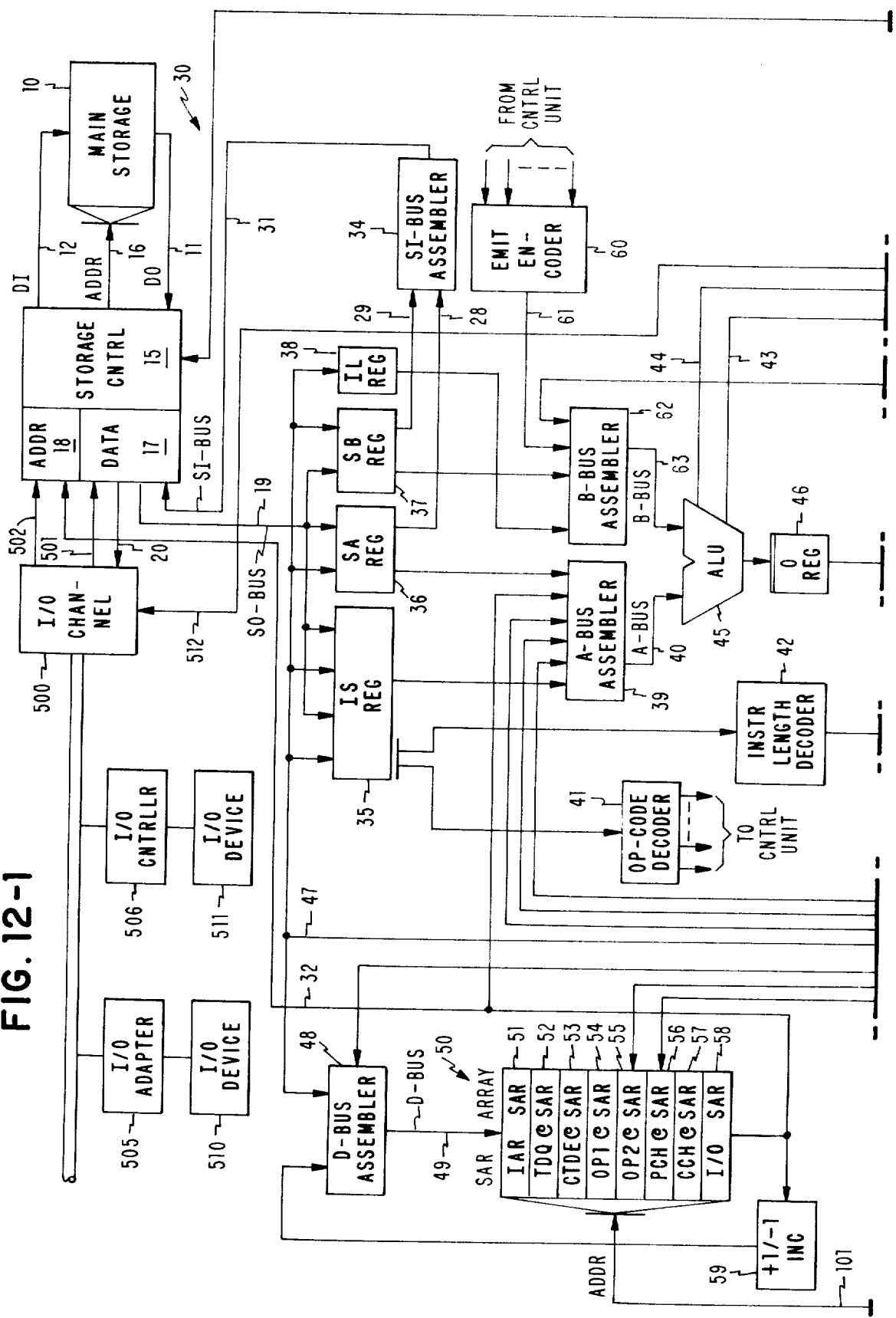

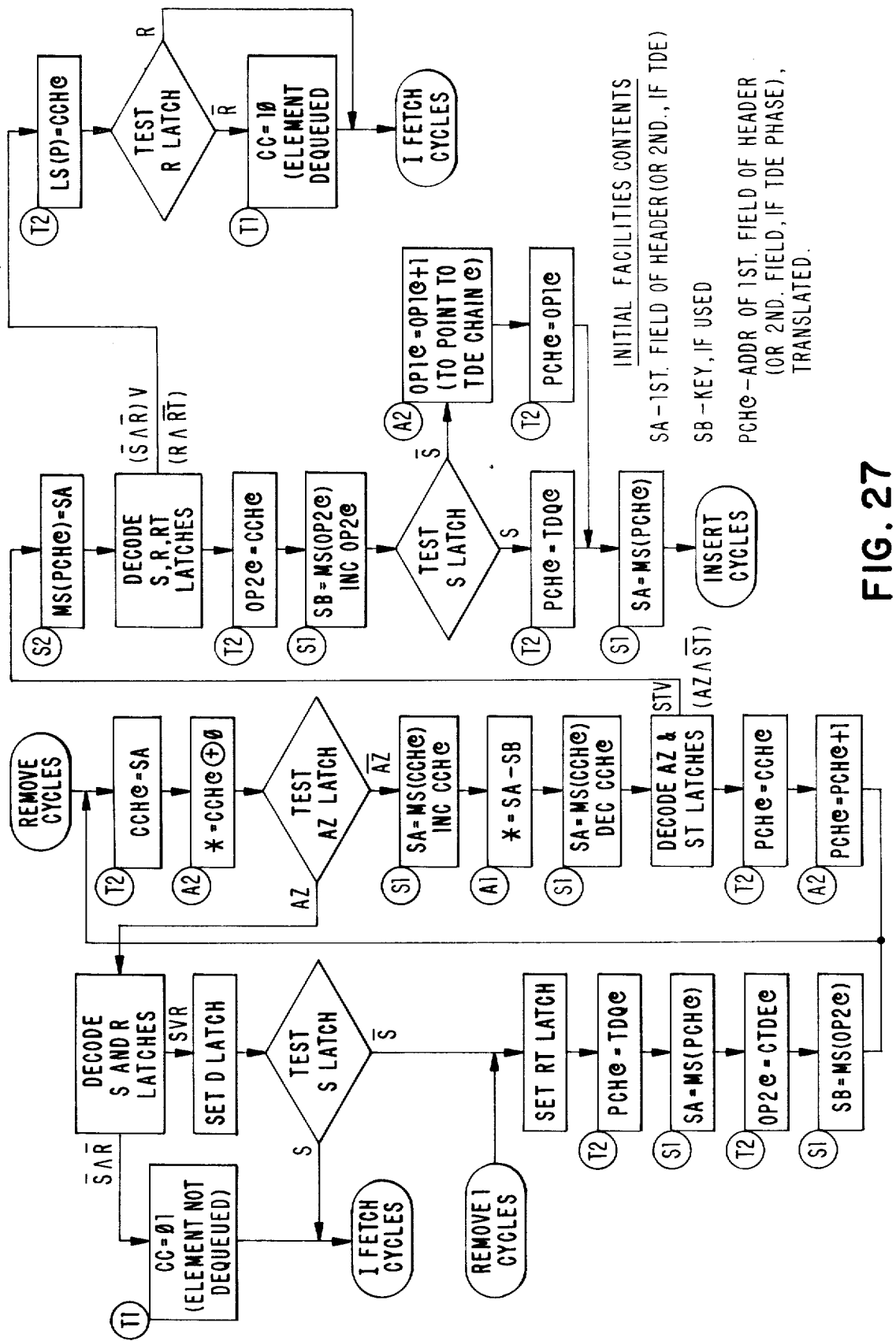

TASK HANDLING APPARATUS FOR A COMPUTER SYSTEM

BACKGROUND OF THE INVENTION

1. Field of the Invention

This invention relates to stored program digital computer systems, and more particularly, to apparatus for controlling execution of tasks and task switching.

The invention finds particular utility in stored program computer systems configured to operate interactively with terminal operators, or in stored program computer systems having need to execute a large number of jobs operating in a batch mode such as in a large multiprogramming environment.

2. Description of the Prior Art

In the past, stored program computer systems used a combination of hardware and software for performing the task handling and switching function. The combination of hardware and software includes an interrupt structure with a fixed number of interrupt levels or classes incorporated into hardware, with software resolving contention among tasks on the same interrupt level. Additionally, prior art systems had one priority resolution mechanism for CPU tasks and another priority resolution mechanism for input/output tasks. In the present invention, the priority resolution mechanism or task handling function is entirely in hardware, and a common mechanism is used for the CPU and the input/output tasks. By this arrangement task handling performance comparable to prior systems is obtainable with a lower performance central processing unit. In the past, it was only feasible to use computers having high performance central processing units for computer job applications requiring a large number of tasks. Further, unlike an interrupt driven system of the prior art, there is no forced switching to I/O processing level by the need for servicing I/O interrupts. The need for service by an I/O device is posted in the task handling apparatus and the I/O device is serviced only when the associated I/O task becomes the highest priority task in the system. The status of the I/O device requiring service is acquired after the request for service during the next instruction fetch cycle, or at predetermined times during execution of certain current instructions of the active task. An instruction fetch cycle of the active task always includes a test for ascertaining the need for I/O cycles for saving I/O status. Also, during execution of certain instructions such as complex instructions, tests are made for determining the need for handling I/O events. After the I/O event is handled, a task switch may or may not take place, depending upon whether or not the I/O task requesting service has a priority higher than the active task.

SUMMARY OF THE INVENTION

The principal objects of the invention are to provide improved task handling apparatus which (a) has a fast response time, (b) enables the use of a relatively low preformance central processing unit in a computer system operating in an interactive mode, (c) has N levels of priority rather than a fixed number, (d) enables priorities to be set under program control, (e) is common to system control tasks, user tasks and I/O tasks, (f) couples intertask communication with task synchronization, (g) can operate with either virtual or real storage arrangements for all task handling functions including I/O tasks and (h) captures status of an I/O device requiring service whether or not the I/O task for providing the service is the active task.

The foregoing objects are achieved by structuring the task handling apparatus to include a task dispatcher and an intertask communication mechanism. The task dispatcher renders the highest priority task dispatching element (TDE) on a task dispatching queue (TDQ) active. TDE's are on the TDQ in priority sequence. There are N levels of priority, and N is variable. Each task has a priority key which can be changed under program control. The active task causes instructions to be executed whereby work is performed, or it communicates with other tasks requesting the other tasks to do some work. The other tasks are either in an inactive dispatchable or inactive waiting state. The instruction fetch cycle of the active task always first tests for the need to execute I/O event cycles or dispatch cycles. I/O event cycles have priority over dispatch cycles. The status of an I/O device is obtained during I/O event cycles. Dispatch cycles provide for storing the status of the old task dispatching element (TDE) and for loading the CPU facilities with the status of the new TDE. Task status includes an instruction address, instruction length count, condition code and base registers.

The intertask communication mechanism includes send count, send message, receive count and receive message mechanisms. The active task invokes the send message or send count mechanisms to ask another task to do some work, and invokes the receive count or receive message mechanisms to determine if the work was performed by the other task. If the receive count or receive message is not satisfied, i.e., the work has not been done, the active task is dequeued from the TDQ and put into the inactive waiting state by the receive mechanisms. The waiting is done on an intertask communication queue such as a send-receive message queue (SRQ) or on a send receive counter (SRC). The highest priority TDE on the TDQ is then dispatched as the active task. The formerly active task stays in the inactive waiting state until the other task invokes the send count or send message mechanism to indicate that it has completed the work requested. The send count and send message mechanisms take inactive waiting TDE's off of the SRQ or SRC and enqueue them in priority sequence onto the TDQ. If there are not dispatchable TDE's on the TDQ, there is no work to be done, and the system is in an idle or wait state.

BRIEF DESCRIPTION OF THE DRAWINGS

FIG. 2 is a diagram illustrating connective relationships between user and I/O tasks;

FIGS. 4-1 and 4-2, with FIG. 4-2 disposed to the right of FIG. 4-1, taken together are a diagram illustrating interrelationships between a TDQ, SRQ, SRC, instruction stream and base registers;

FIGS. 7-1 and 7-2, with FIG. 7-1 disposed above FIG. 7-2, taken together are a block diagram similar to FIGS. 1-1 and 1-2, but illustrating the signal paths for a T1 CPU cycle;

FIGS. 8-1 and 8-2, with FIG. 8-1 disposed above FIG. 8-2, taken together are a block diagram similar to FIGS. 7-1 and 7-2, but illustrating the signal paths for a T2 CPU cycle;

FIGS. 9-1 and 9-2, with FIG. 9-1 disposed above FIG. 9-2, taken together are a block diagram similar to FIGS. 7-1 and 7-2, but illustrating the signal paths for a T3 CPU cycle;

FIGS. 10-1 and 10-2, with FIG. 10-1 disposed above FIG. 10-2, taken together are a block diagram similar to FIGS. 7-1 and 7-2, but illustrating the signal paths for an A1 CPU cycle;

FIGS. 11-1 and 11-2, with FIG. 11-1 disposed above FIG. 11-2, taken together are a block diagram similar to FIGS. 7-1 and 7-2, but illustrating the signal paths for an A2 CPU cycle;

FIGS. 12-1 and 12-2, with FIG. 12-1 disposed above FIG. 12-2, taken together are a block diagram similar to FIGS. 7-1 and 7-2, but illustrating the signal paths for an S1 CPU cycle;

FIGS. 13-1 and 13-2, with FIG. 13-1 disposed above FIG. 13-2, taken together are a block diagram similar to FIGS. 7-1 and 7-2, but illustrating the signal paths for an S2 CPU cycle;

FIG. 27 is a flow diagram illustrating remove cycles;

DETAILED DESCRIPTION

Figure 1:
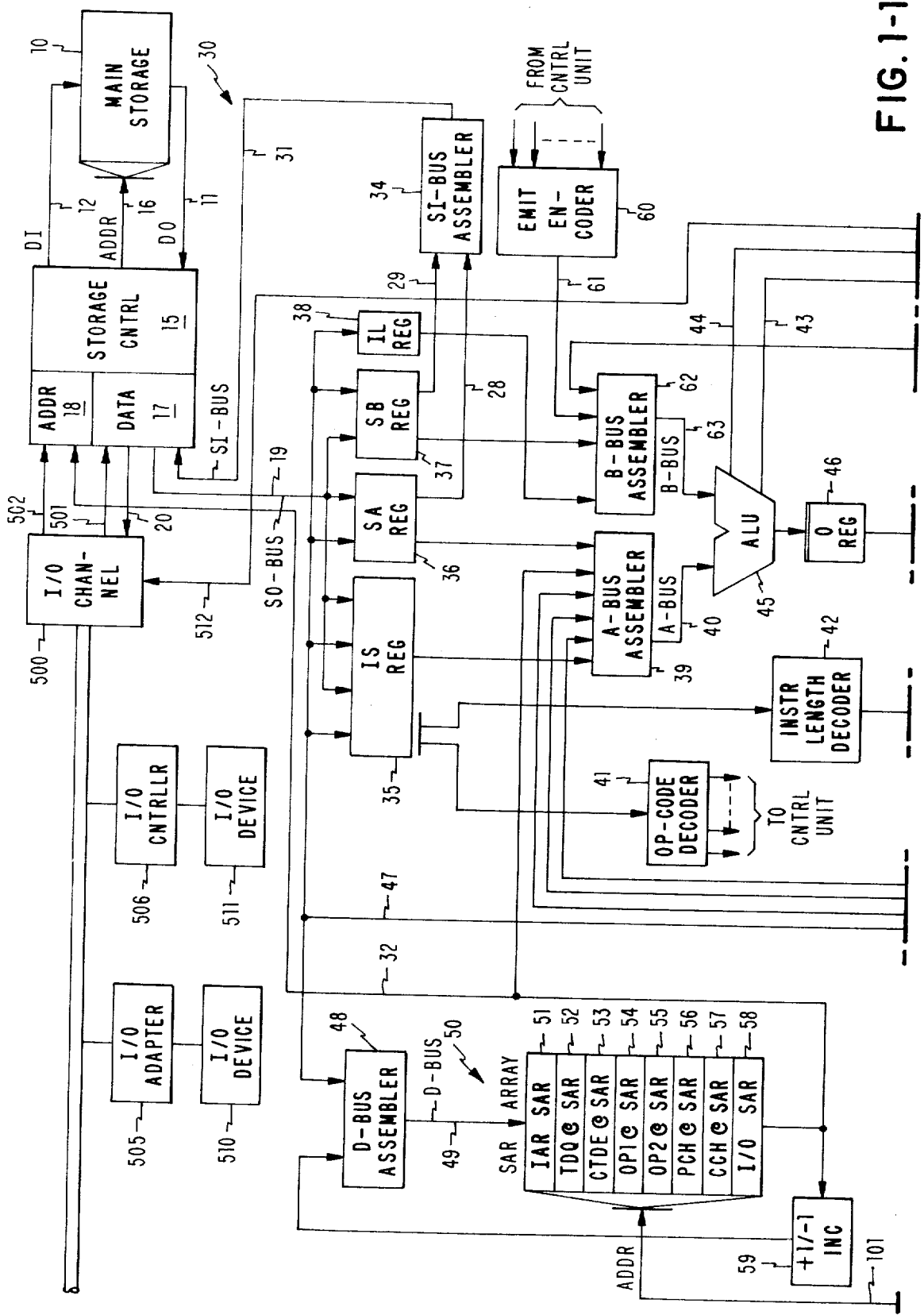
FIGS. 1-1 and 1-2, with FIG. 1-1 disposed above FIG. 1-2, taken together are a block diagram of a computer system embodying the invention.

With reference to the drawings, and particularly to FIG. 1, the invention, by way of example, is illustrated as being incorporated into a stored program computer system which includes main storage 10. Main storage 10 is conventional, and is structured to be selectively addressable under control of storage control 15. Main storage 10 contains both instructions and data which are oriented on a byte basis. A byte consists of eight binary bits, excluding a parity bit. The data and address paths to and from storage are on a word basis which in this example consists of four bytes. The organization of main storage 10 is not critical with respect to the present invention.

Main storage 10 is selectively addressable by storage control 15 which presents an address on bus 16. If a read operation is to take place, the data from the addressed location is available on bus 11 and entered into data register 17 of storage control 15. During a write operation, storage control 15 makes data available on bus 12, and this data is written into the addressed location in storage 10. The read and write operations are quite conventional. Storage control 15 controls the reading and writing of main storage 10 according to a storage read cycle and a storage write cycle as set forth in timing diagrams of FIGS. 19 and 20. The specific logic elements for producing such storage cycles is well within the skill of a person skilled in the art to which this subject matter pertains. Reference may also be had to the block diagram on Page 185 of "Digital Logic and Computer Operations" copyrighted 1967 by McGraw-Hill, Inc. and authored by Robert T. Barron and Albert T. Piccirilli.

Storage control 15 is connected to receive data and addresses from both central processing unit (CPU) 30 and I/O channel 500. CPU 30 provides data to register 17 on bus 31, and addresses to register 18 on bus 32. Register 17 is connected to provide data to CPU 30 via bus 19. I/O channel 500 provides data and addresses to registers 17 and 18 over buses 501 and 502, respectively. Data is provided to the channel from register 17 via bus 20. I/O channel 500 connects to I/O devices 510 and 511 via I/O adapter 505 and I/O controller 506, respectively. The number and type of I/O devices connected to the I/O channel and the manner of connection is not pertinent to the present invention. The I/O channel 500, however, must be able to communicate a need for I/O event cycles. Whenever I/O event cycles are required, channel 500 provides a signal on line 512, which is connected to set an I/O latch 94 in CPU 30.

Figure 3:
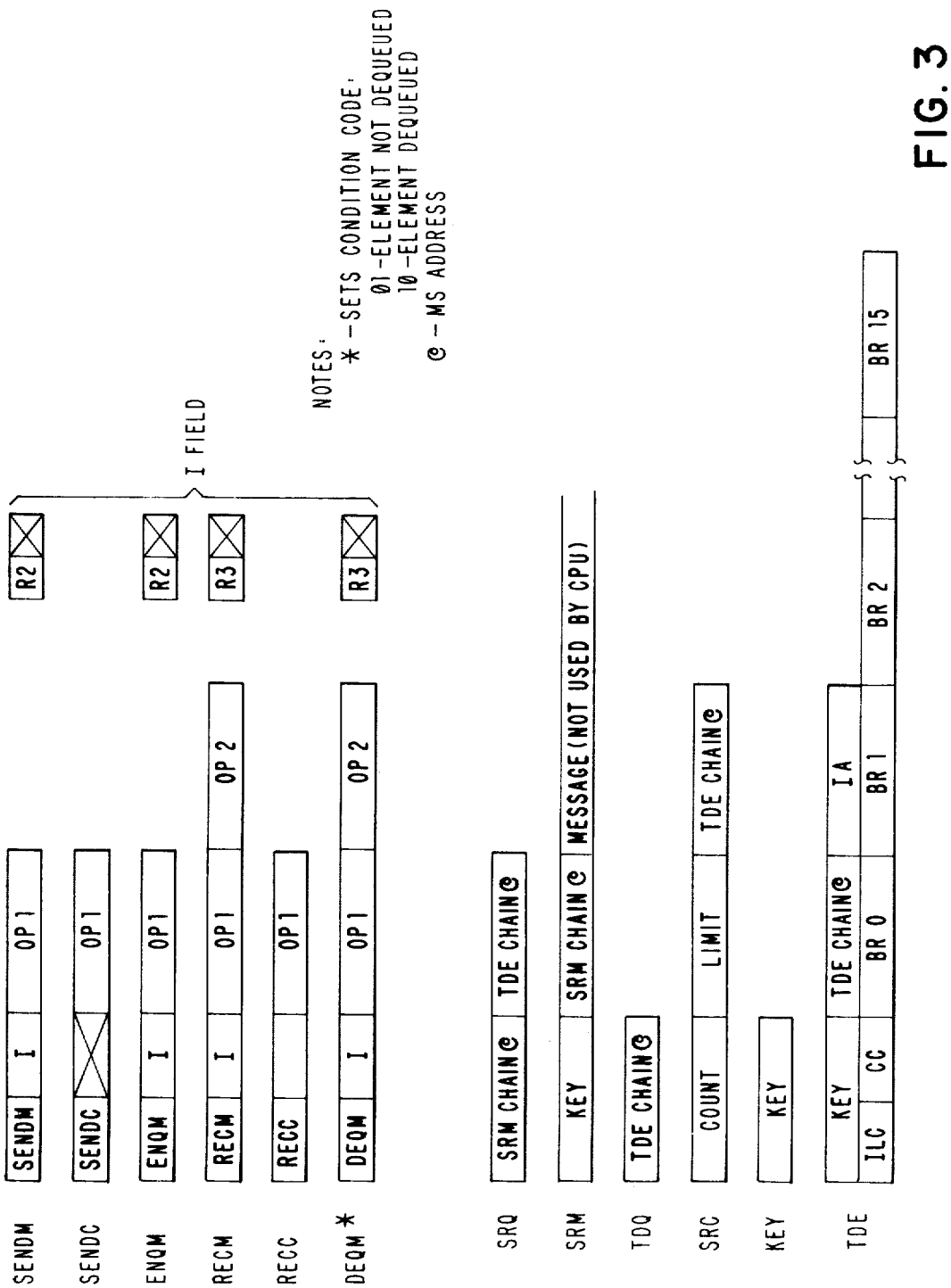
FIG. 3 is a diagram illustrating the format of queueing instructions and objects.

The computer system incorporating the invention is initialized by loading main storage 10 with a task queue (TDQ), consisting of one or more task dispatching elements (TDE's). The TDQ is a system object meaning that it is a unit of data having particular significance; i.e., control data. The TDQ is a chained list of objects containing CPU status information of executable tasks where one task, and in this example, the top task is the active task, and all other tasks in the list are inactive dispatchable tasks. The format of the TDQ is shown in FIG. 3 as consisting of a TDE chain address. The format of the TDE's is also shown in FIG. 3. During the initial operation of the system, the TDQ object is located by transferring an address from TDQ SAR register 52 in SAR array registers 50 to address register 18. The TDQ SAR register 52 is selected by an address from control unit 100 on bus 101. The SAR array registers 50 include all of the specific registers containing storage addresses necessary for pointing to objects and instructions involved in the present invention, as well as the normal instruction address register (IAR). IAR 51 contains the address of the next instruction to be fetched and executed at the time the current instruction is being executed; i.e. it is the program location counter. As will be seen later herein, each of the SAR array registers 50 can be incremented or decremented under control of control unit 100 without having the contents of the register pass through ALU 45. In this particular instance, all address increment/decrement operations, i.e., +1/−1, provide a four byte or one word increment/decrement. The computer system incorporating the present invention can have more than one TDQ, but if so, one of the TDQ's will be a prime TDQ, and the other TDQ's will be secondary TDQ's.

The TDE address contained in the TDQ object is passed from storage 10 into the data register 17 during a read storage cycle, and from register 17 via bus 19 into SA register 36. SA register 36 is a main storage operand buffer. The contents of register 36 are passed to ALU 45 via A-bus assembler 39 and A-bus 40. Assembler 39, and assemblers 34, 48 and 62 to be described hereinafter, are well known and consist of logical AND circuits or gates which are selectively conditioned to pass one of several sets of inputs to the output or bus such as set forth in FIG. 1 of U.S. Pat. No. 3,961,313 dated June 1, 1976 by Ronald E. Bodner, et al. ALU 45 receives a signal from control unit 100, which causes ALU 45 to pass the left side input into O-register 46. ALU 45 is of the type well known in the art for performing two's complement binary add and subtract operations and AND, OR and Exclusive OR (XOR) logical operations. Arithmetic and logical operations set AZ latch 96 if all bits of the result are zeroes. During an arithmetic add operation, the setting of the AC latch 95 indicates that there was a carry out of the high order bit position. On a subtract operation, the setting of AC latch 95 indicates that there was no borrow into the high order bit position. Pass left and pass right operations are used for register-to-register transfers, and occur without any setting of the ALU condition latches AC 95 and AZ 96. The 0 register 46 functions as the ALU 45 output register for latching the ALU result prior to gating the result to C bus 47. The output of 0 register 46 is connected by C-bus 47 to D-bus assembler 48. The D-bus assembler 48 feeds SAR array 50 via D-bus 49. In this instance, control unit 100 provides a signal to D-bus assembler 48 to cause it to select bus 47 as a source, and provides an address via bus 101 for addressing CTDE SAR register 53, whereby the current TDE address is entered into register 53.

Figures 1, 8:
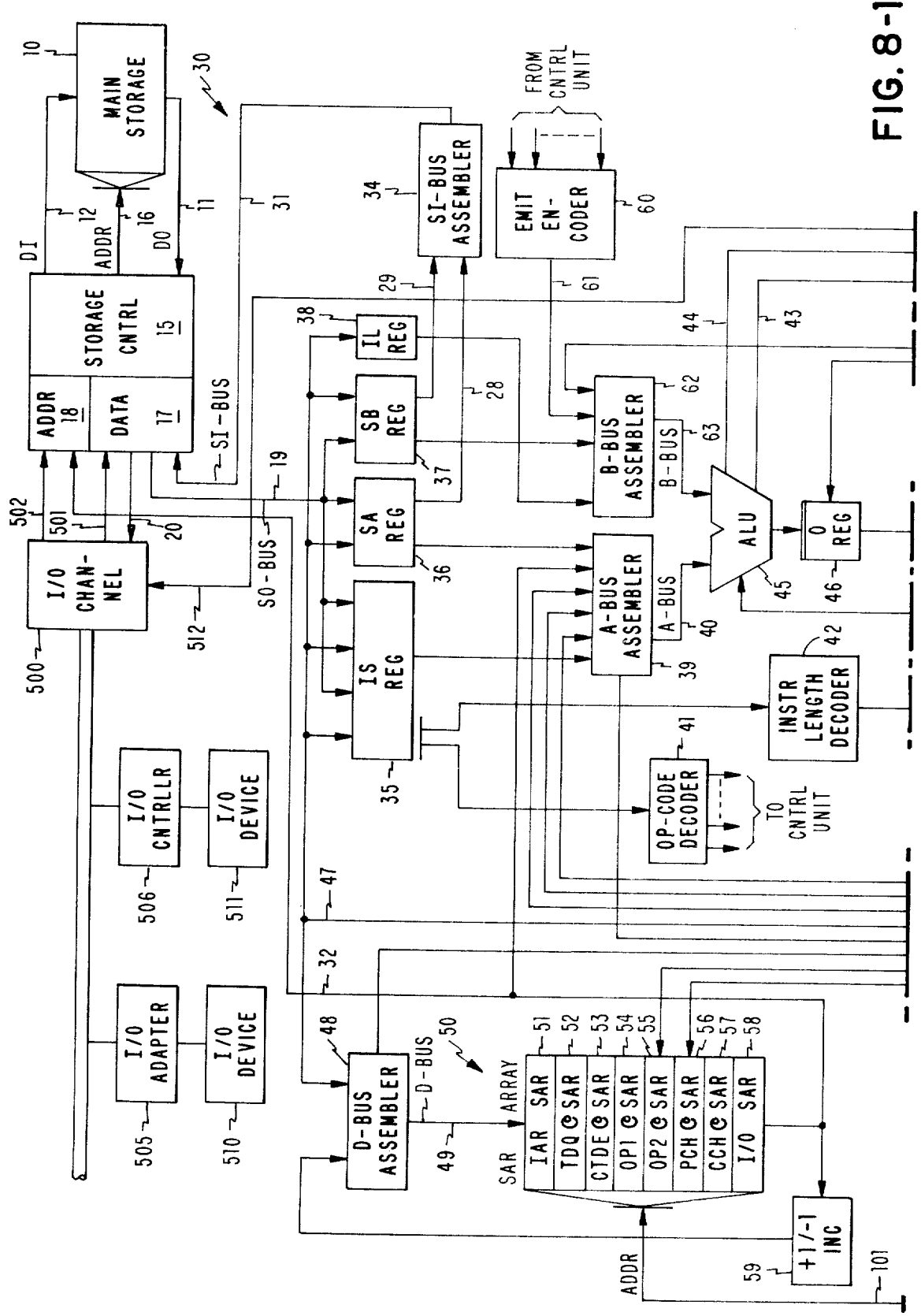
Figures 2, 8:
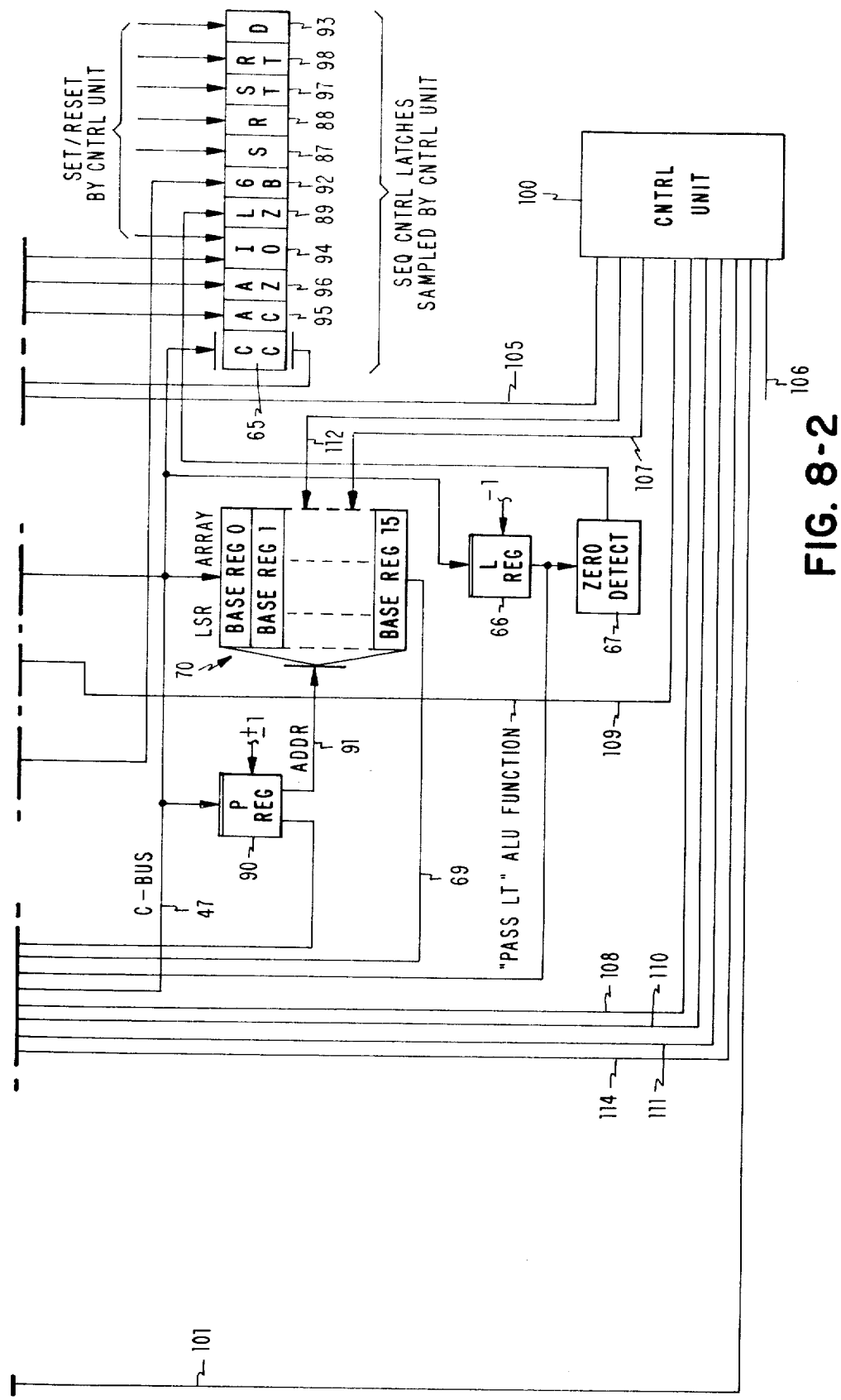
Figure 15:
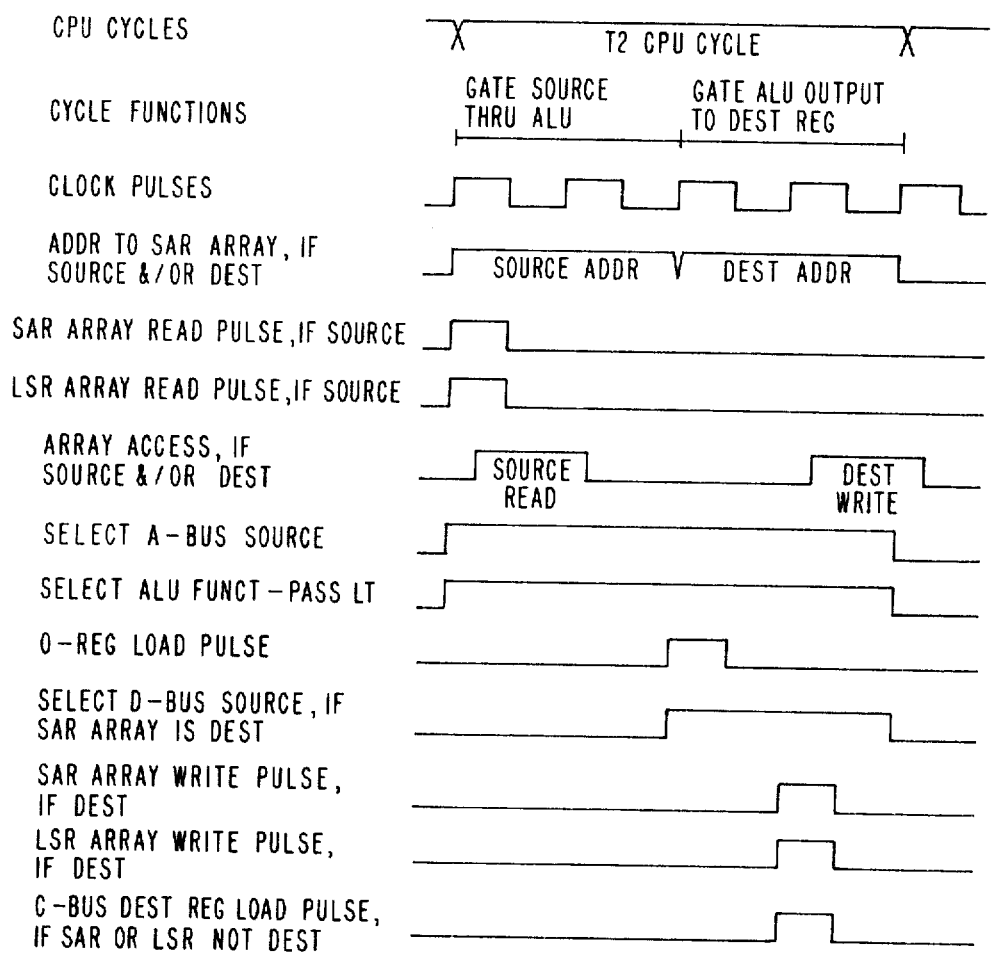

The operation just described is accomplished during a CPU T2 CPU cycle, which is illustrated in FIGS. 8 and 15, and will be described in detail later herein. The function of a T2 CPU cycle is to transfer the contents of any A-bus 40 source register to any C-bus 47 destination register.

Register 53, which contains the current TDE address (CTDE), is used to hold this address during the entire duration of the associated task. Thus, it is necessary to also load a working register with the current TDE address, which can be incremented or decremented so as to load the CPU registers with address and status information of that TDE. It should be understood that when the current TDE address is transferred from register 53 into this work register, which will be described shortly, the current TDE address also remains in register 53. It should also be understood that register 53 contains the address of the TDE that is active at the start of the current instruction. If dispatch latch (D latch) 93 is set during execution of the current instruction, then, at the start of the execution of the next instruction, the contents of register 53 are compared with the address of the top TDE on the TDQ, to determine if a task switch is required. As will be seen later herein, a task switch may or may not occur, depending upon whether or not a different TDE becomes the top TDE on the TDQ. Hence, if the address of the current TDE does not compare with the address of the top TDE, a task switch is required. The top TDE on the TDQ, of course, is pointed to by the TDQ object, as previously mentioned. Therefore, another T2 CPU cycle will be taken to transfer the current TDE address from register 53 into the OP 1 SAR register 54. The TDE address in OP 1 SAR register 54 is then incremented by two words, so as to point to the instruction address field (IA) contained in the TDE.

The incrementing of the current TDE address by two words is accomplished by an A2 CPU cycle, which will be described in detail later herein. It is sufficient to note at this time, that during and A2 CPU cycle the SAR array 50 is addressed via control unit 100, whereby the contents of OP 1 SAR register 54 are placed on bus 32, which, in addition to feeding address register 18, also feeds A-bus assembler 39. Control unit 100 provides a selection signal to A-bus assembler 39 to cause the same to select bus 32 as the source. Thus, the current TDE address is presented to the left side of ALU 45 via A-bus 40. Control unit 100 also causes emit encoder 60 to present a value of two over bus 61 to B-bus assembler 62, whereby the value two is presented to the right side of ALU 45 via B-bus 63. Emit encoder 60 can be in the form of the encoder as shown on page 107 of the aforementioned book entitled "Digital Logic and Computer Operations". ALU 45 then performs an add operation in response to a control signal from control unit 100, and the result is entered into 0-register 46. The address then passes from 0-register 46 via bus 47, D-bus assembler 48 and D-bus 49 into OP 1 SAR 54.

The incremented address now residing in OP 1 SAR register 54 is then transferred into address register 18 as part of an S1 cycle, which will be described in detail later herein. The address in register 18 is passed by storage control 15 over bus 16 to address main storage 10. The word appearing on bus 11, in response to the read operation of main storage 10, is entered into register 17 and placed on bus 19. The word on bus 19 is then entered into SA register 36. During this S1 cycle, the address taken from OP 1 SAR register 54 is also passed to incrementer 59, which increments the address by one and passes the address to D-bus assembler 48, whereby it is returned into register 54 via the D-bus 49, so as to point to the next word of the TDE, which, in this instance, contains the instruction length code (IL) field and the condition code (CC) field of the first instruction associated with the task.

The contents of SA register 36 contains the address of the first instruction associated with the task. This address is entered into IAR SAR 51 by means of a T2 CPU cycle. Before retrieving the first instruction associated with the task, it is necessary to fetch the remaining words of the TDE. Thus, the incremented address in OP 1 SAR register 54 is entered into address register 18, and the next word of the TDE is read from main storage 10. The instruction length count (IL) and condition code (CC) contained in this next word are entered into IL register 38 and CC register 65, respectively. During this S1 CPU cycle, the address in register 54 is again incremented by incrementer 59 and returned into register 54. The address from register 54 is then again transferred into address register 18, whereby storage 10 is again addressed and the word at the addressed location is transferred from storage over bus 11 into register 17. The contents of register 17 are then entered into SA register 36. During this S1 cycle, the address in register 54 is again incremented and returned into register 54, as previously described. The contents of the SA register 36 will be transferred into a work register in the LSR array of registers 70. The work register selected depends upon an address provided by P register 90. P register 90 is a counting register used for indirect addressing of LSR array registers 70, and can be incremented or decremented by one without the contents thereof passing through ALU 45. In this instance, P register 90 is loaded with an address by means of a T1 CPU cycle, which will be described in greater detail later herein. During a T1 CPU cycle, control unit 100 provides a signal to emit encoder 60, which emits a value to B-bus assembler 62. This value will be zero, so as to address base register 0 of LSR array 70. Hence, the value of zero passed to B-bus assembler 62 passes via B-bus 63 into ALU 45 and therefrom into register 46. The value zero then leaves register 46 via bus 47 into P register 90, where it is available to address LSR array 70 via bus 91. With the address in P register 90, a T2 CPU cycle is taken to transfer the contents of SA register 36 into the addressed base register 0 of LSR array 70. The operation just described repeats until all fields of the active TDE have been retrieved from storage 10. The remaining fields in the TDE are fields which are loaded into base registers 1-15, inclusive, of LSR array 70.

The next operation is to fetch the first instruction of the active task, now that all the fields of the TDE have been fetched and loaded into the appropriate registers. Although the invention does not require it, in this particular example, an instruction is prefetched into instruction register 35, and then an instruction fetch cycle follows. The present invention is not dependent upon having instructions prefetched. Prefetching of instructions is well known in the art, and is used to enhance performance of the computer system. The prefetch operation involves two S1 cycles whereby a first S1 cycle is taken to load the high half of the IS register 35 via SO bus 19. The second S1 cycle loads the low half of IS register 35 via bus 19. Instruction register 35 is two words wide and buffers the next instruction of the instruction stream being executed. It should be noted at this time that instructions have different lengths. The computer system of FIG. 1 can process instructions having a length of one-half word, a full word or a word-and-one-half; i.e., instructions having a length of two bytes, four bytes or six bytes.

Figure 21:
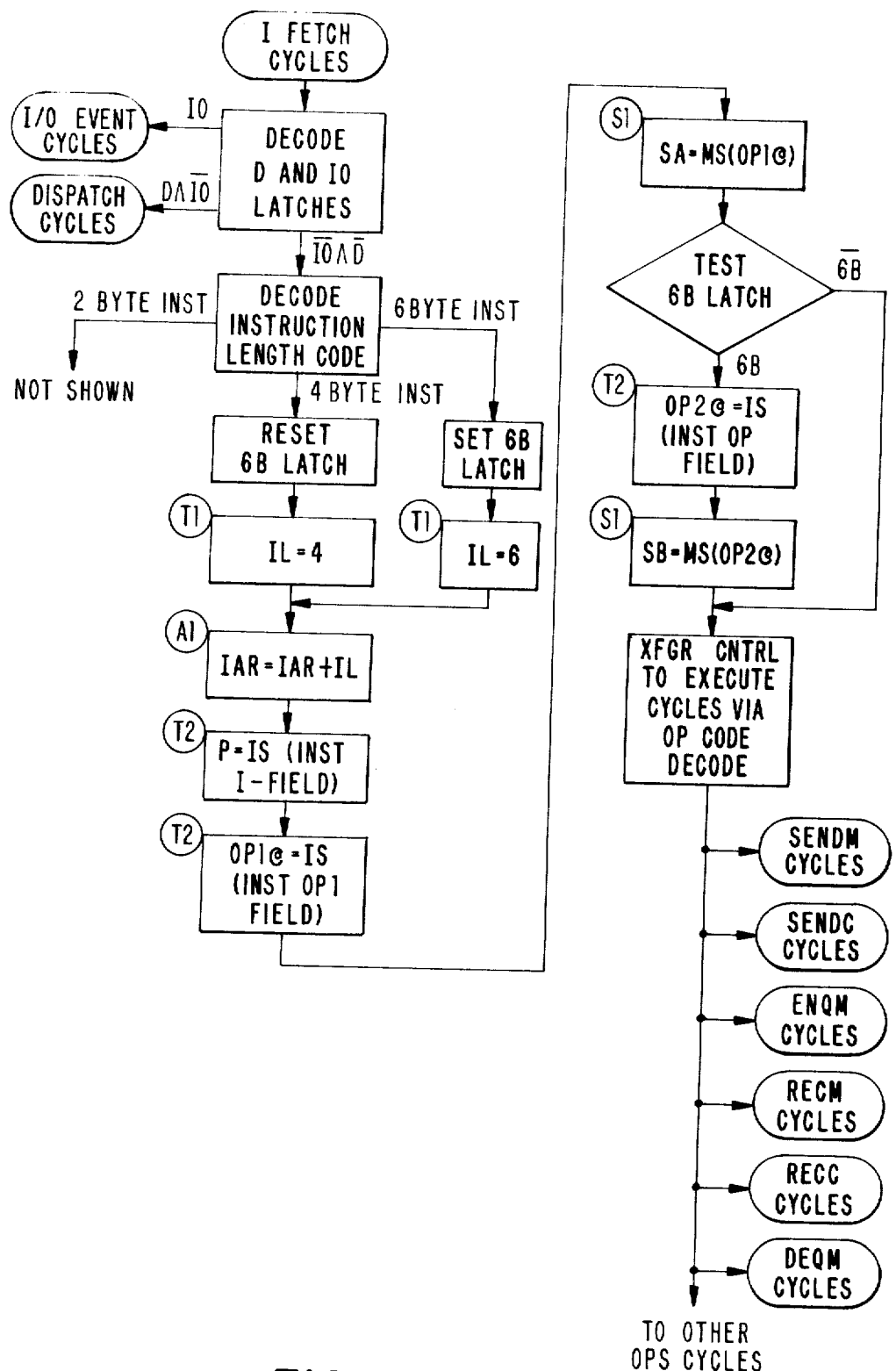
FIG. 21 is a flow diagram illustrating I-fetch cycles.

The I-fetch cycle for these instructions is shown in FIG. 21; however, it should be noted that the I-fetch for a two-byte instruction is not shown, because none of the instructions pertinent to the present invention are two-byte instructions. Each instruction, of course, has an OP code and, in this instance, the OP code also includes bits indicating the length of the instruction. It should be noted that during the I-fetch operation, control unit 100 first samples the status of a dispatch cycle latch 93 and an IO latch 94. At the start of the initial task, both of these latches will be in the reset state. The OP code is decoded by decoder 41 and the instruction length is decoded by decoder 42. Decoders 41 and 42 can be of the form set forth on page 108 of the aforementioned "Digital Logic and Computer Operations" textbook. The signals resulting from decoding the OP code are passed to control unit 100, and the signal indicating the instruction length is passed from instruction length decoder 42 to set a latch 92 if the instruction is six bytes, and reset latch 92 if the instruction is less than six bytes. The control unit 100 samples the latch 92 and a T1 cycle is taken, whereby control unit 100 provides a signal to emit encoder 60, which then emits a value indicating the instruction length. This emitted value will then be entered into IL register 38 during the T1 cycle.

The I-fetch cycle continues where the contents of instruclength (IL) register 38 are added to the current contents of IAR SAR 51 by means of an A1 CPU cycle, and the result is returned to IAR SAR 51. It should be noted that a byte add operation is performed for changing the value in IAR SAR 51. Thus, by adding an IL register value of four or six to the contents of IAR SAR 51, the storage word address is increased by one or one-and-one-half words, respectively. This provides the IAR SAR 51 with an address to point to the next instruction of the task. The IL register 38 holds the length of the instruction that is currently being executed. The length is held as an unsigned binary number. A T2 CPU cycle is taken where the instruction I-field is put into P register 90 for later use. This is followed by another T2 CPU cycle, where the instruction OP 1 field is placed into the OP 1 SAR 54. Then, a S1 cycle is taken for reading data from main storage 10 and transferring it onto bus 19, and from there, into SA register 36, whereby the first operand of the instruction is fetched. Latch 92 is then tested, and if the instruction is a six-byte instruction, a T2 cycle is taken for loading OP 2 SAR 55 with the contents of the OP 2 field in the instruction. This T2 cycle is then followed by a S1 cycle, where data is read from main storage 10 and transferred onto bus 19 to be loaded into SB register 37. SB register 37, like SA register 36, is a main storage operand buffer. Operands 1 and 2 have now been fetched from main storage 10 and placed into registers 36 and 37, respectively. If the instruction has not been a six-byte instruction, there is no operand 2 to be fetched from main storage 10.

Control transfers to execute cycles, the type of execute cycles being indicated by the decoding of the OP code by the OP code decoder 41. The execute cycles for send message, send count, enqueue message, receive message, receive count and dequeue message instructions will be described in detail later herein. If the instruction were other than one of the instructions for the execute cycles just mentioned, i.e., conventional instructions such as load, store, branch, etc., the execute cycles for these other instructions would then follow. Since these other instructions are very conventional instructions, their execute cycles are not shown.

Figures 1, 7:
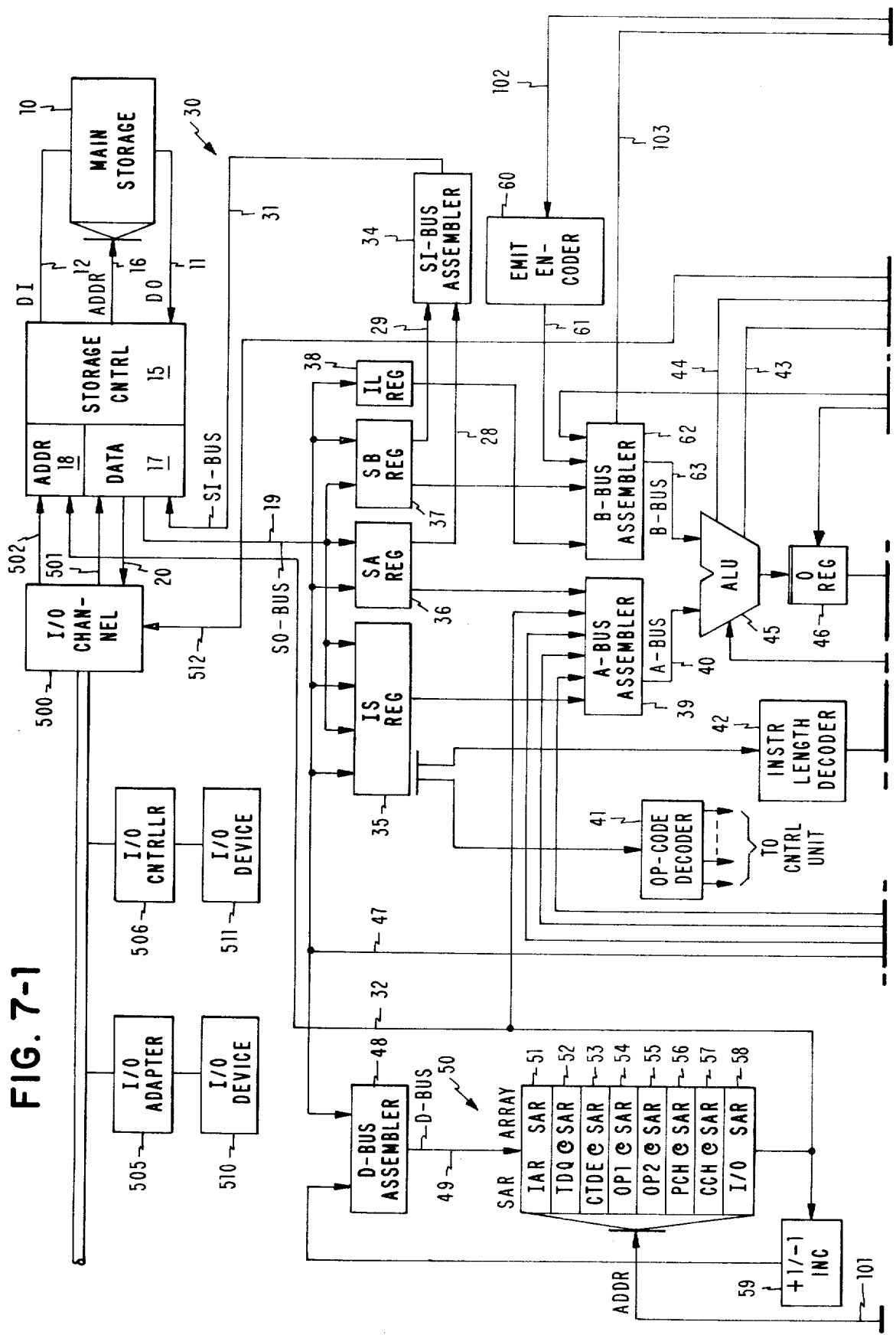
Figure 14:
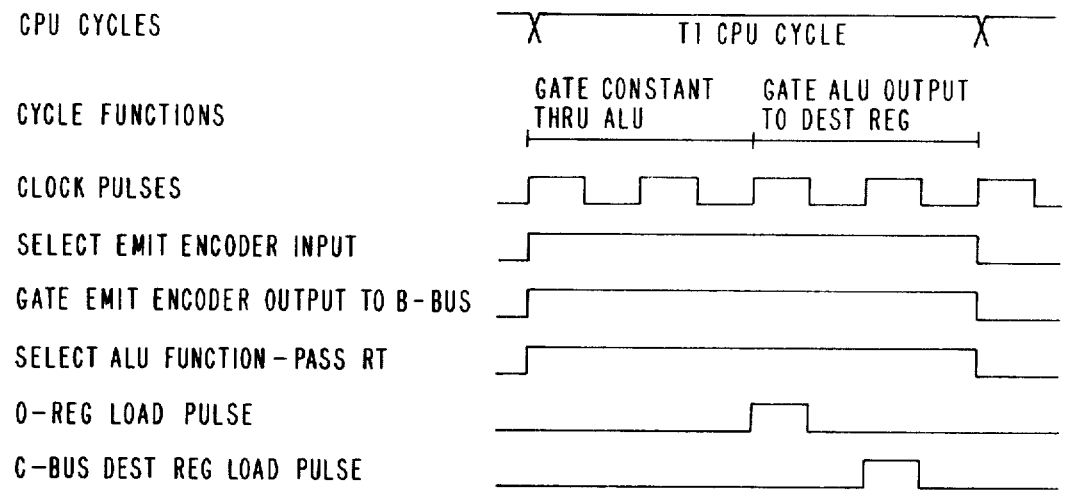
FIGS. 14-20, inclusive, are timing diagrams for 14, 15, 16, 17, 18, 19 and 20 CPU cycles, respectively.

In order to achieve a more detailed understanding of the I-fetch cycles, the T1, T2, A1 and S1 cycles will be described in detail. The control signals and those elements of the computer system which are involved during a T1 CPU cycle are shown in detail in FIG. 7. The timing diagram for a T1 CPU cycle is shown in FIG. 14. The function of a T1 CPU cycle is to load an immediate operand into a register of the CPU. As seen in FIG. 7, control unit 100 places signals on bus 102, which activates emit encoder 60 to emit a binary value. Emit encoder 60, which is a conventional encoder, in turn places the binary value on bus 61, which feeds B-bus assembler 62. In order for B-bus assembler to select emit encoder 60 as a source, control unit 100 provides signals on bus 103. The output of the B-bus assembler 62 is applied over bus 63 to ALU 45. ALU 45 is controlled by a signal from control unit 100 on line 104 to pass the input on bus 63, i.e., the righthand input, to O register 46, which is loaded under control of a signal from control unit 100 on line 105.

C-bus 47 presents the output of O register 46 to destination registers, and the destination register selected by control unit 100 is loaded when control unit 100 provides a load pulse, such as on line 106, which is representative of the load line to the selected destination register. Actually, there is a load line to each destination register. The destination registers are, of course, any register fed by the C-bus 47, and include IS register 35, SA register 36, SB register 37, IL register 38, SAR array registers 50, condition code register 65, L register 66, LSR array registers 70 and P register 90. Only single load lines are connected to SAR array registers 50 and LSR array registers 70.

The units of the computer system involved in the T2 CPU cycle are shown in FIG. 8, and the timing diagram for a T2 CPU cycle is shown in FIG. 15. The function of a T2 CPU cycle is to transfer the contents of any data source register feeding A-bus assembler 39 to any destination register connected to receive data from C-bus 47. A-bus assembler 39 receives inputs from IS register 35, SA register 36, L register 66, P register 90, SAR array registers 50 and LSR array registers 70. Control unit 100 can select a SAR array register 50, by placing an address on bus 101. The data from the selected SAR array register is then read when control unit 100 provides a read signal on line 114. The data read from the selected register then passes over bus 32 to the A-bus assembler 39.

The LSR array registers 70 are always selected by an address in P register 90. Data, however, is only read from the selected register when control unit 100 provides a read signal on line 107. Data from the selected register transfers over bus 69 to A-bus assembler 39. All other registers feeding A-bus assembler 39 do not require a read pulse, because their outputs are present without one.

The source into A-bus assembler 39 is selected when control unit 100 provides a signal on encoded bus 108. It should be noted that control unit 100 can select one of two sources with a single line. If the source to be selected is from more than two sources, then, depending upon the desired implementation, control unit 100 could send signals over an encoded bus or over a separate line to each source to make selections. The selection of data destinations can also be done in the same manner unless specified differently. The data passed by the A-bus assembler 39 enters the ALU 45 via bus 40. ALU 45 is controlled by a signal from control unit 100 over line 109 to pass the data on A-bus 40, i.e., the left-hand input, to O register 46. The data passed by ALU 45 is loaded into O register 46 under control of a signal from control unit 100 on line 105. The data residing in O register 46 is then passed to the destination registers.

One of the destination registers will be selected by a signal from control unit 100. If one of the SAR array registers 50 is the destination register, control unit 100 provides a signal on line 110 to D-bus assembler 48 which then selects C-bus 47 as a source. Control unit 100 will also provide an address on bus 101 for selecting one of the SAR array registers 50. The data would be entered into the selected SAR register from D-bus assembler 48 via bus 49 under control of a load pulse which control unit 100 would provide on line 111.

If one of the LSR array registers 70 were selected as the destination register, control unit 100 would provide a load pulse on line 112. The register selected, of course, would be the one addressed by the contents of P register 90. If the destination register is other than a SAR array register 50 or a LSR array register 70, control unit 100 provides a load pulse on line 106 which is a representative load line.

Figures 1, 10:
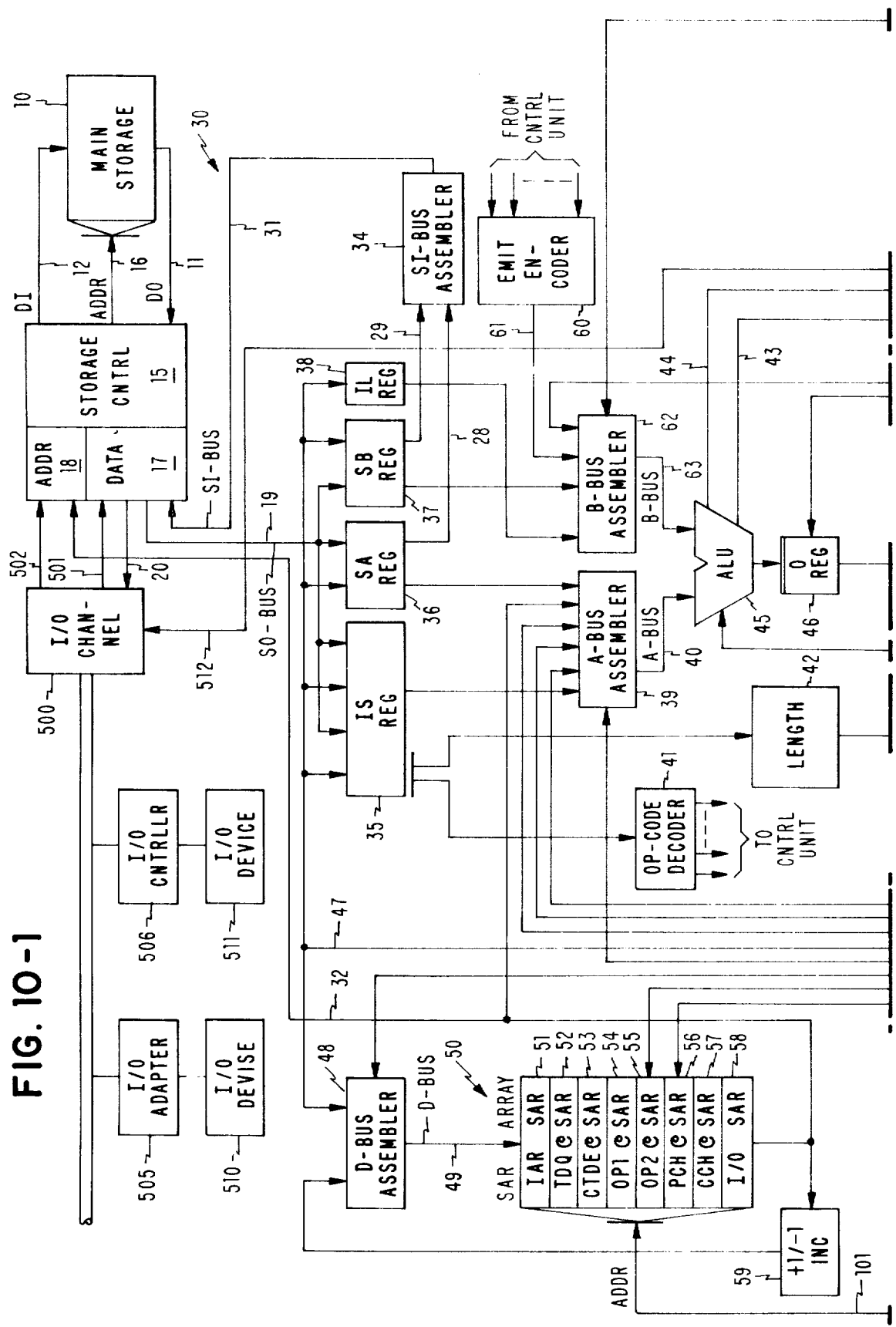
Figures 2, 10:
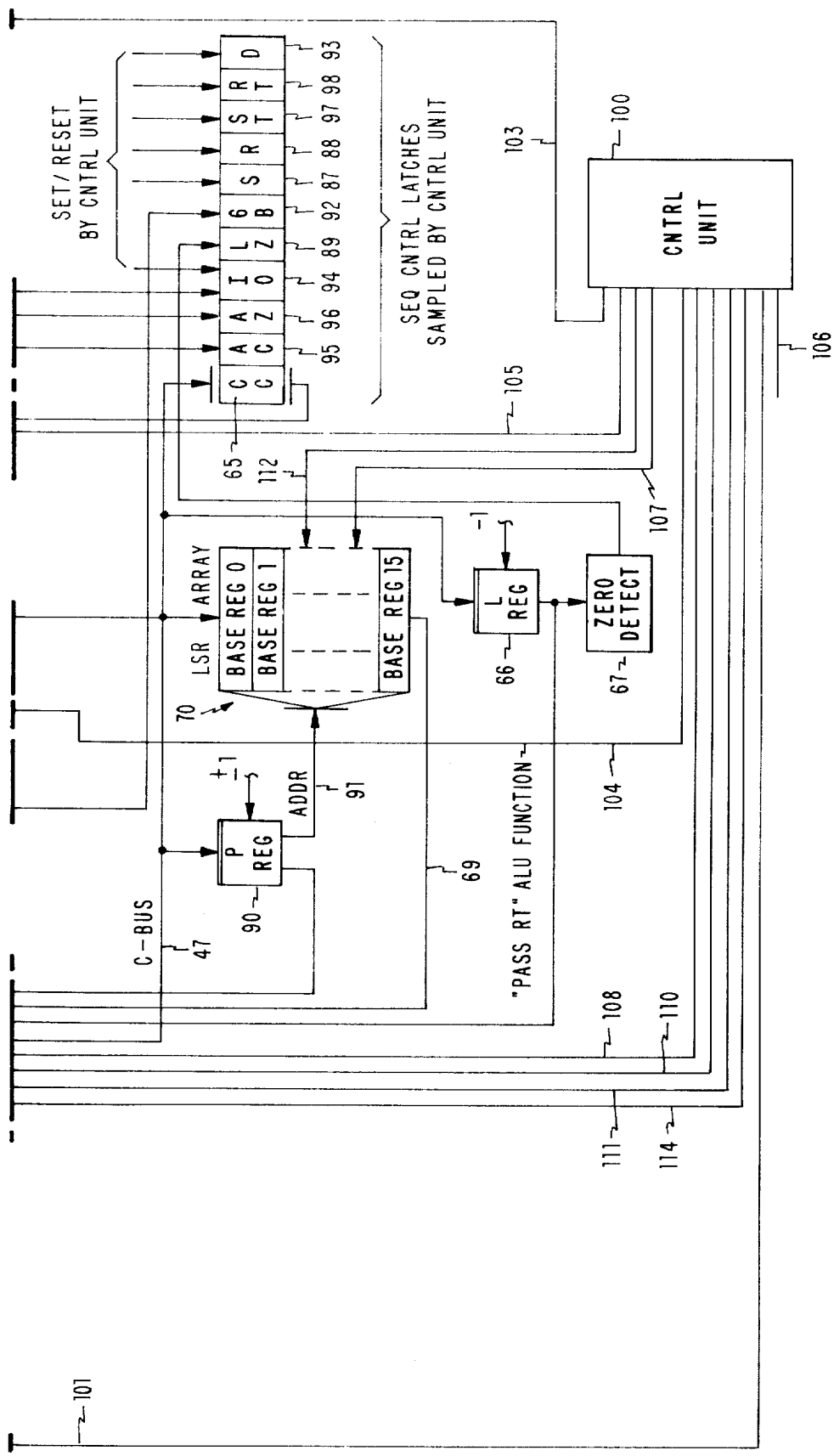
Figure 17:
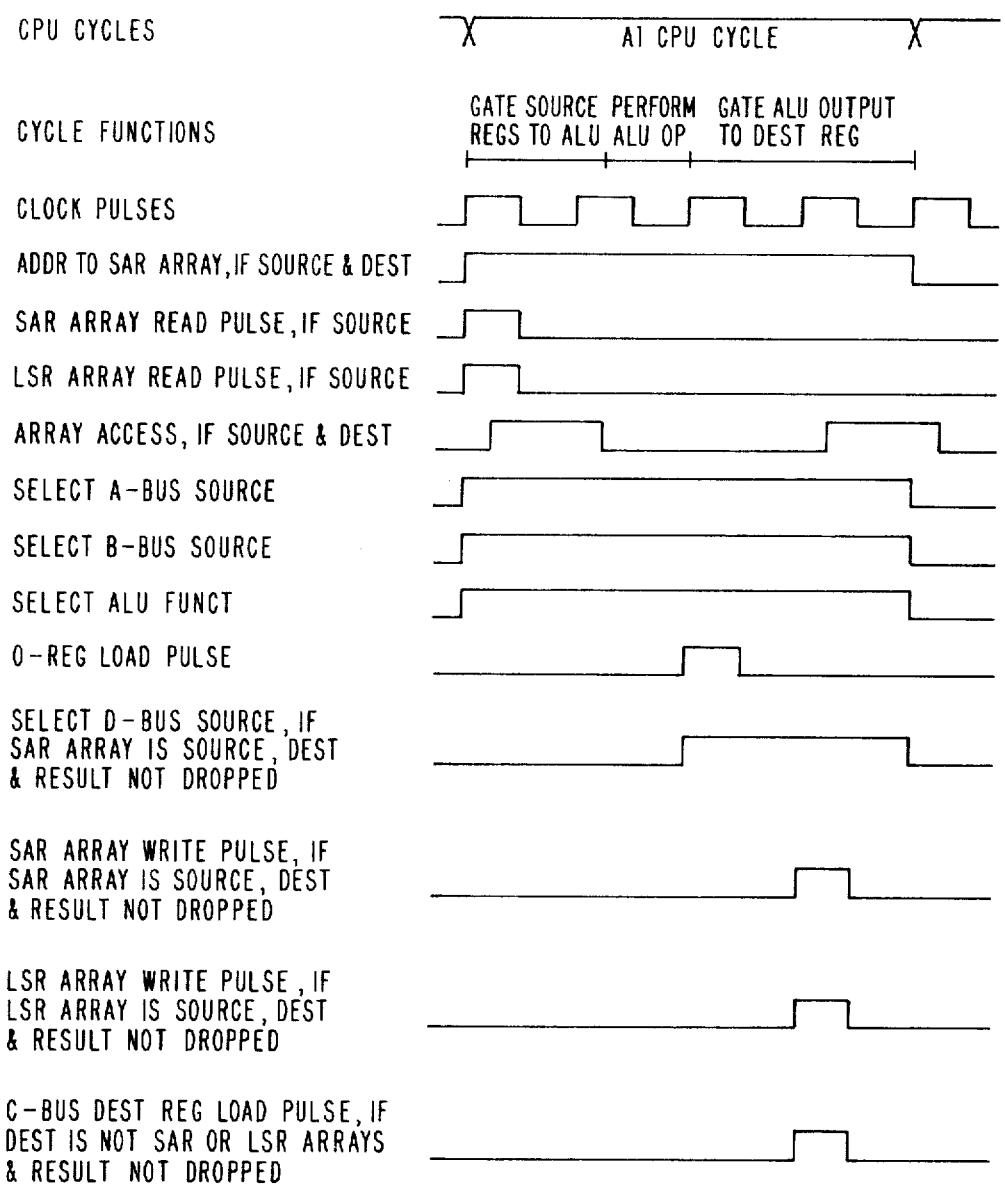
Figure 18:
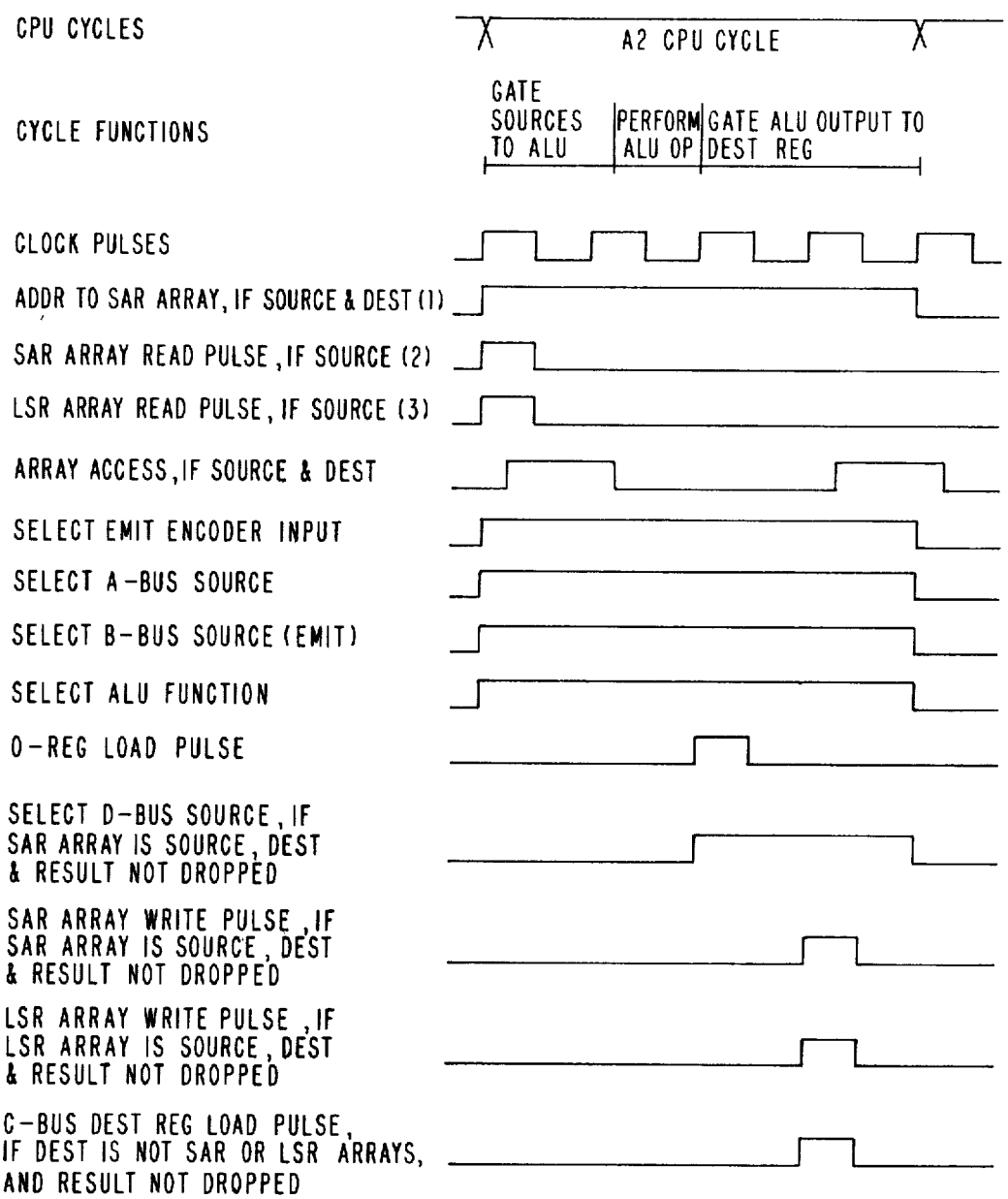

The A1 CPU cycle and the timing therefor are shown in FIGS. 10 and 17, respectively. The function of the A1 CPU cycle is to transfer the contents of two selected registers to the ALU 45, perform an ALU operation and transfer the result either to the left source register or drop the result. Also, during the A1 CPU cycle, the condition latches AC 95 and AZ 96 are appropriately put in states determined by the result of the ALU operation. In FIG. 10, control unit 100 will provide an address on bus 101 and a read signal on line 114 if one of the SAR array registers 50 is to be the source register for the lefthand input into ALU 45. If the input into the lefthand side of ALU 45 is to come from one of the LSR array registers 70, control unit 100 provides a read signal on line 107. The source for the left side input into ALU 45 is selected by control unit 100 as it provides a selection signal to A-bus assembler 39 on line 108.

The right side input is passed to the ALU 45 by B-bus assembler 62. It will be recalled that B-bus assembler 62 can select the SB register 37, the IL register 38, the emit encoder 60 or the condition code register 65. The selection is made by signals which control unit 100 provides on encoded bus 103. The function performed by ALU 45 is determined by the signal provided by control unit 100 on line 104. For example, the signal on line 104 might add the contents of the SA register 36 with the contents of SB register 37 and return the result to register 36 via the O register 46 and C-bus 47. Another example would be for the ALU to subtract the contents of the SB register 37 from the contents of the SA register 36. The result can be dropped or passed to the O register 46. Control unit 100 provides a load signal on line 105 to load the result into O register 46. The result is then available to C-bus 47 for transfer to a destination register. If the destination of the result is one of the SAR array registers 50, control unit 100 provides a signal on line 110 to D-bus assembler 48 for causing the same to select C-bus 47 as a source, and provides a signal on line 111 for loading the SAR array register 50, selected by the address on bus 101 with the result passed by D-bus assembler 48 via D-bus 49. If the result is to be placed in one of the LSR array registers 70, control unit 100 provides a signal on line 112 for loading the selected register where the selection is made by the address in P-register 90. If the destination register is other than those mentioned, control unit 100 provides a signal on line 106 which is a representative load line. Condition latches 95 and 96 are set or reset by signals from ALU 45 over lines 43 and 44, respectively.

Figures 2, 12:
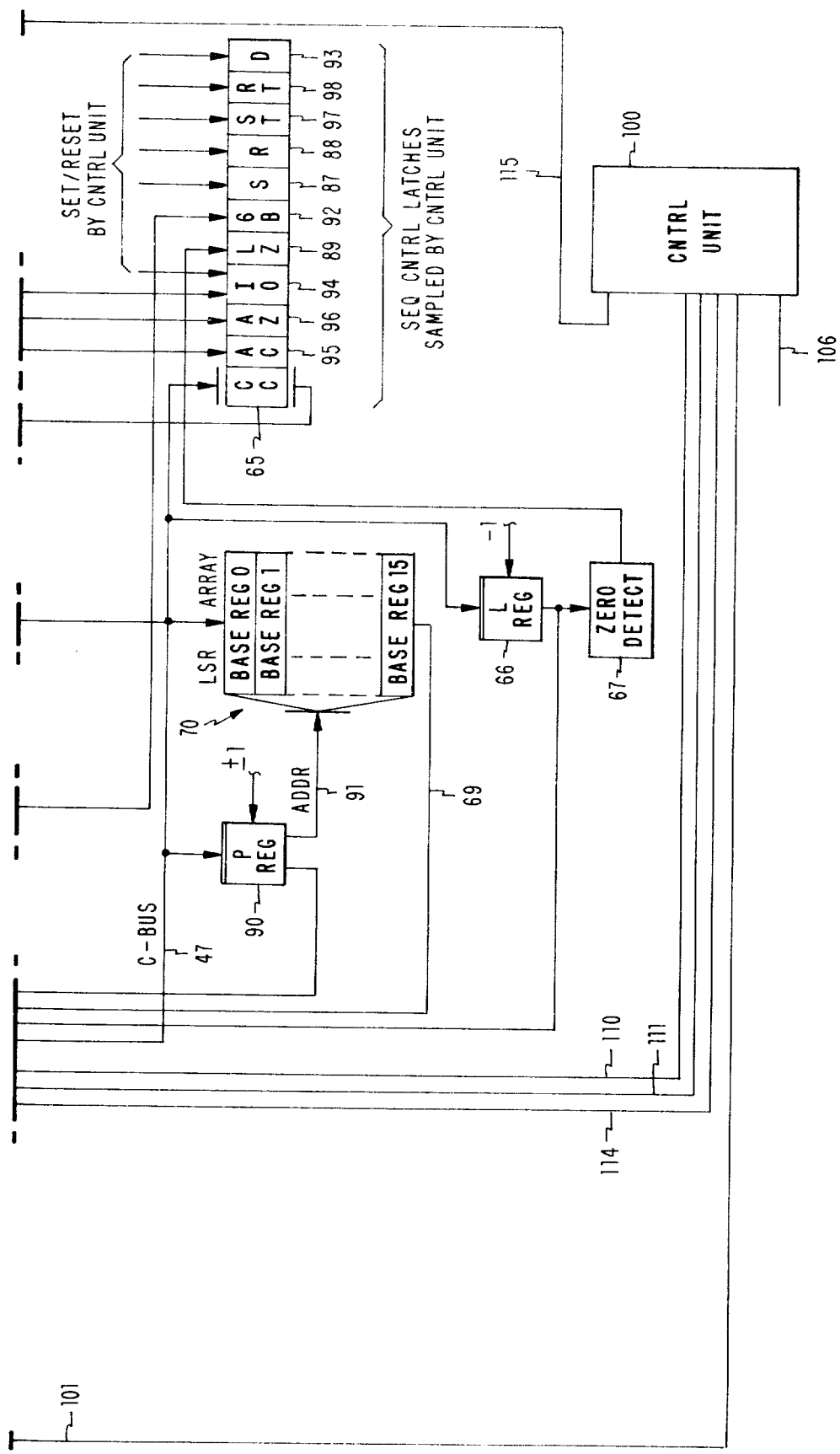
Figure 19:
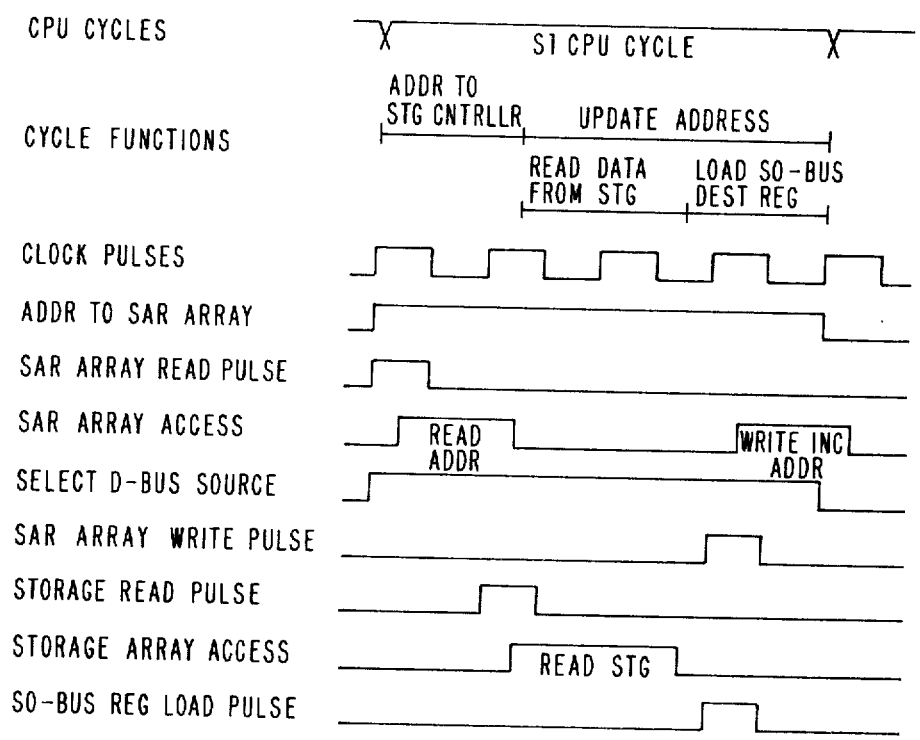

During a S1 CPU cycle, data is read from main storage 10 and loaded into a register connected to SO-bus 19. The source of the storage address is in one of the SAR array registers 50, and this address can be optionally incremented or decremented and returned into the source SAR array register. Those units of the computer system involved in a S1 CUP cycle are shown in FIG. 12, and the timing diagram for the S1 CPU cycle, is shown in FIG. 19.

Control unit 100 provides an address on bus 101 for addressing SAR array 50. The contents of the selected SAR array register are read by a signal which control unit 100 provides on line 114. The contents from the selected SAR array register 50 are placed on bus 32 and entered into register 18, and are also applied to incrementer 59. The output of incrementer 59 is passed to D-bus assembler 48, and if the incremented or decremented address is to be returned to the selected SAR array register, control unit 100 provides a signal on line 110 to D-bus assembler 48. The incremented or decremented address would then be entered into the selected SAR array register 50 when control unit 100 provides a load signal on line 111. Control unit 100 then provides a storage read pulse on line 115 to storage control 15. Data is read from storage 10 at the location addressed by the address in register 18. This data passes from storage via bus 11 to storage control 15 and into data register 17. Whether or not register 17 is actually a register is a matter of choice, and depends upon the particular type of storage used; i.e., in some storage units, the data is latched at the output of storage. The data then passes from data register 17 onto SO bus 19. The data on SO bus 19 then enters an appropriate destination register, as determined by a load signal on representative load line 106 furnished by control unit 100.

Figures 1, 4:
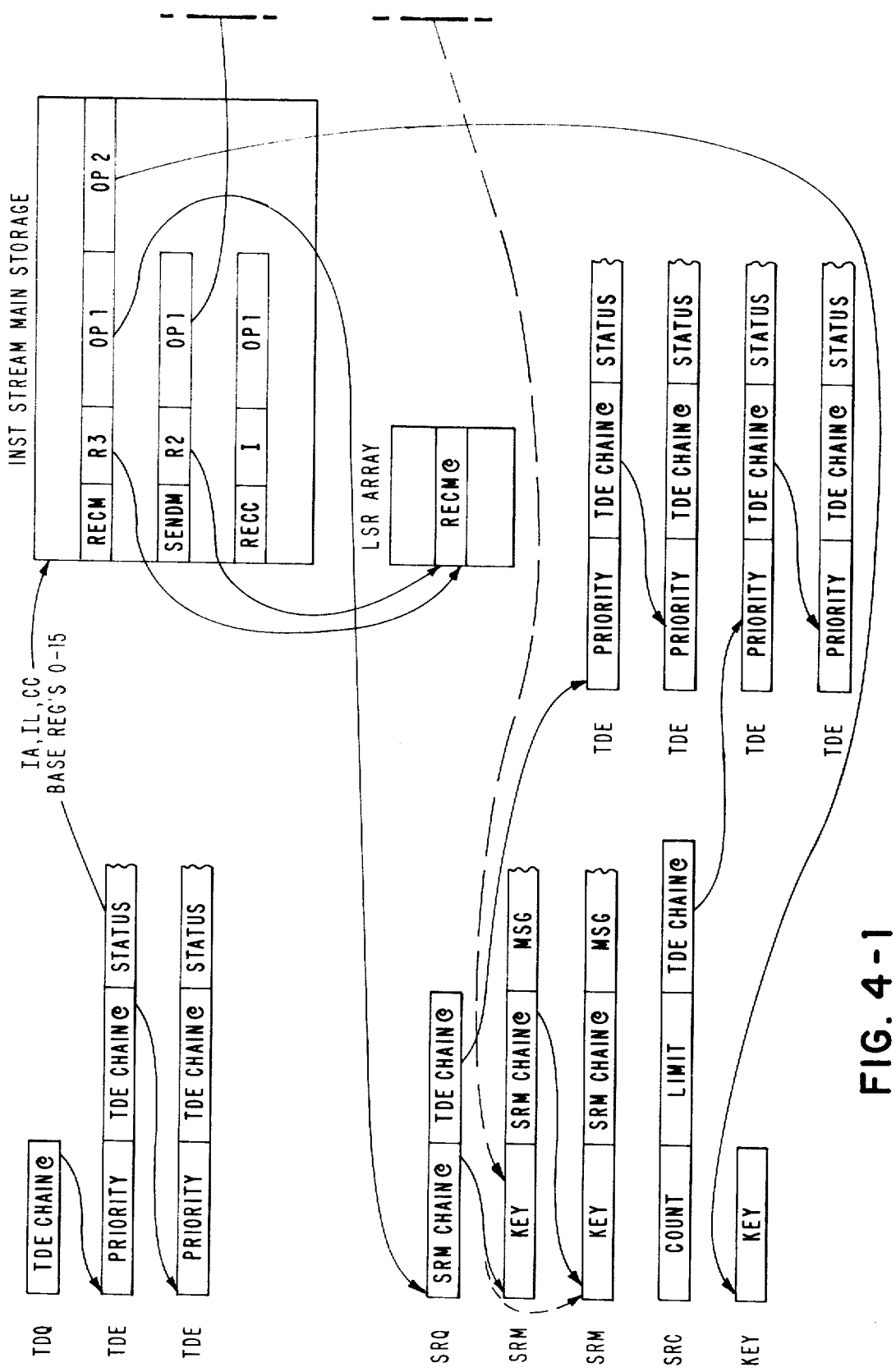
Figures 5, 6:
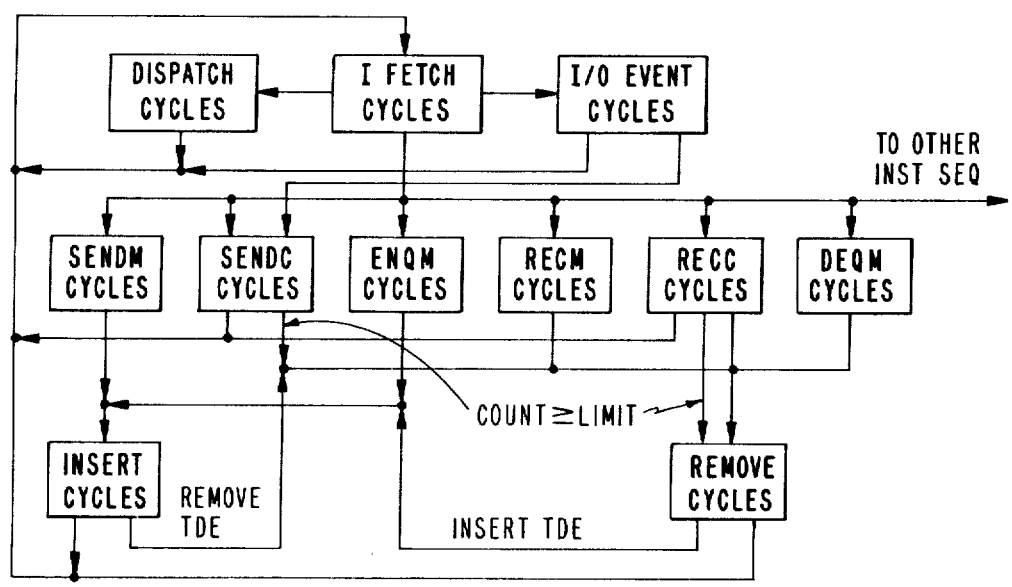
FIG. 5 is a diagram illustrating task state transitions.
FIG. 6 is a diagram illustrating control unit cycle sequence interrelationships.

The operation of the invention described up to this point is diagramatically represented in FIG. 4; i.e., the TDQ object was retrieved from storage 10 to locate the active TDE on the TDQ. Certain fields of the active TDE were then retrieved from storage. Then an instruction fetch was made, and the fetched instruction was executed. The task would then continue until some instruction associated with the task caused a task switch, or a higher priority task was enqueued onto the TDQ. This would also cause a task switch.

Figure 26:
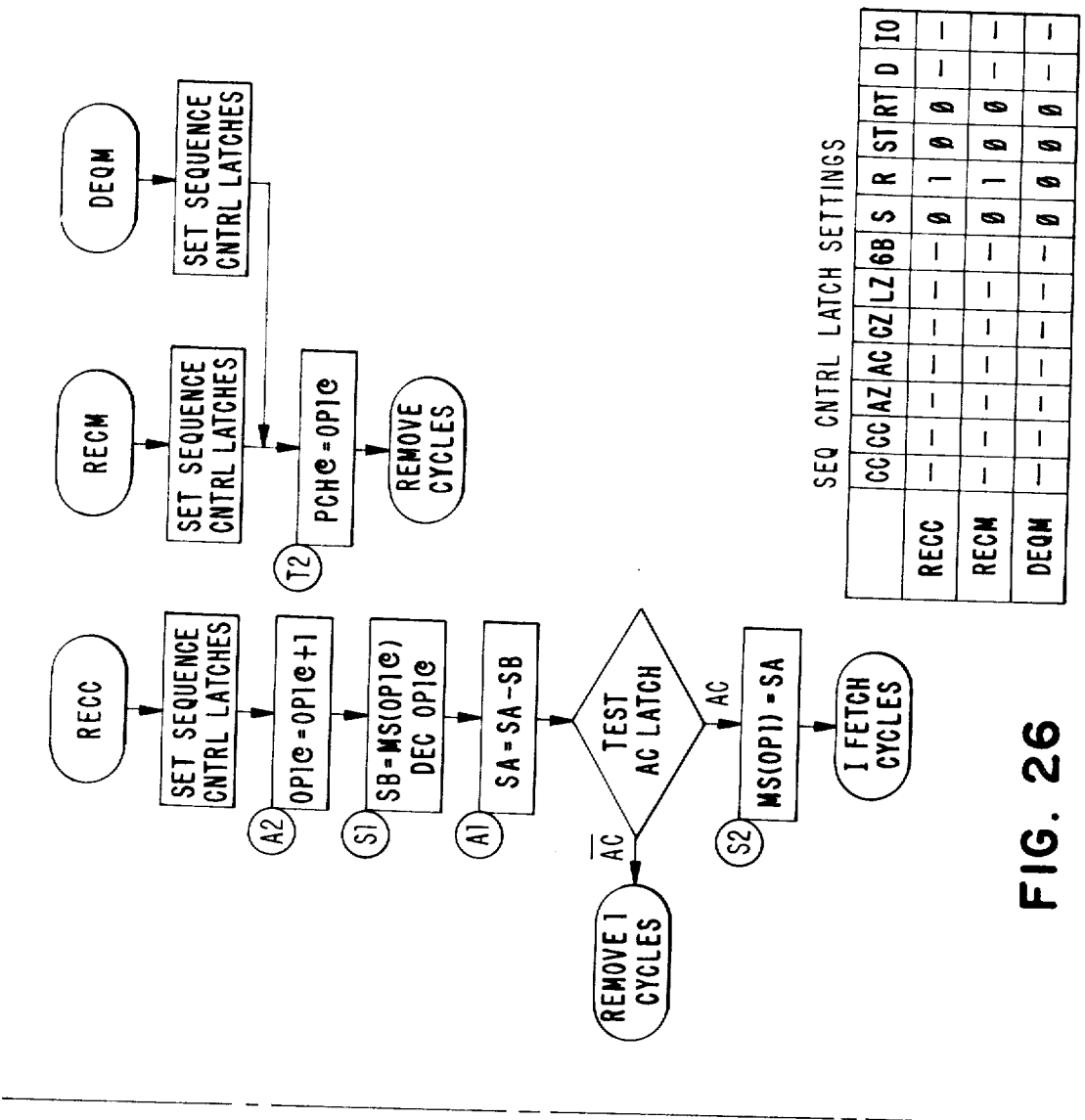
FIG. 26 is a flow diagram illustrating receive count, receive message and dequeue message execution cycles.

A receive message instruction (RECM) can cause the active task to be dequeued from the TDQ and enqueued onto a task dispatching element wait list of a send receive queue (SRQ). The function of a receive message instruction, the format of which is shown in FIG. 3, is to obtain a message (SRM) from a SRQ. If there isn't a SRM on the SRQ, then the receive message instruction is not satisfied, and the active task is taken off the TDQ and goes into a wait state as an inactive waiting TDE on a SRQ. The waiting task then waits on the SRQ until a send operation equeues a SRM on the SRQ and moves the inactive waiting TDE onto the TDQ. In FIG. 4, the receive message instruction is prefetched in the same manner as any other instruction. The I-fetch cycles for the receive message instruction are a six-byte instruction fetch. Upon completion of the I-fetch cycles, receive message (RECM) execution cycles are taken. The receive message execution cycles are shown in FIG. 26.

The receive message instruction (RECM), as seen in FIG. 3, has an OP code indicating that it is a receive message instruction. The OP code field is followed by an I field and, in this instance, the I field contains the address of an LSR array register 70. This addressed LSR array register 70 will be loaded during the execution of the receive message (RECM) instruction with the address of the dequeued message from a send receive queue (SRQ), which, in turn, is addressed by the OP 1 address field in the receive message instruction. The OP 2 address field in the receive message instruction contains an address for addressing main storage 10 at a location containing a key data object which will be used for comparison with key fields of send receive messages (SRM) on a SRQ to identify the SRM to be dequeued from the SRQ. The SRM's are chained on the SRQ in key sequence. The key data object retrieved from storage is compared with the key field of the first SRM on the SRQ, and if the keys are equal, that SRM is dequeued from the SRQ. If the comparison is not equal, the key data object retrieved from storage is compared with the key field of the next SRM, and so forth, until an equal comparison is found.

Assuming that there is an equal comparison, the address of the particular SRM containing the key field which compares equal is placed in the LSR array register 70, addressed by the R3 field in the receive message instruction, and the SRM is removed from the chain of SRM's on the SRQ. If the key data object retrieved from storage does not compare with the key field of any SRM's on the SRQ, the receive message instruction is considered unsatisfied.

Because the IAR SAR 51 is pointing to the next instruction to be fetched from main storage 10 and if the receive message instruction was not satisfied, it is necessary to decrement the IAR so that it points to the address of the unsatisfied receive message instruction. This operation will be described in detail during the description of the remove cycles. It is necessary to save the address for this unsatisfied receive message instruction, because the active task which contained this instruction in its instruction stream will be dequeued from the TDQ and enqueued onto the wait list of the SRQ addressed by the OP 1 field of the unsatisfied receive message instruction. The dequeueing of the active TDE from the TDQ and the enqueueing of this TDE onto the SRQ will be described in detail during the description of the remove cycles. The dequeueing of the active TDE causes a task switch to take place and the new highest priority TDE on the TDQ, if any, will then become the active task. This is illustrated by example in FIG. 28.

During the execution of a receive message instruction, control unit 100 resets send latch 87, sets receive latch 88 and resets ST phase latch 97 and RT phase latch 98. Control unit 100 accomplishes this either just prior to, or simultaneously with, a T2 CPU cycle, which is taken to transfer the contents of the OP 1 SAR 54 into the PCH SAR 56. PCH SAR 56 normally contains the address of the last or previous queue element. The T2 cycle is then followed by remove cycles. Remove cycles are shown in FIG. 27.

Figure 28:
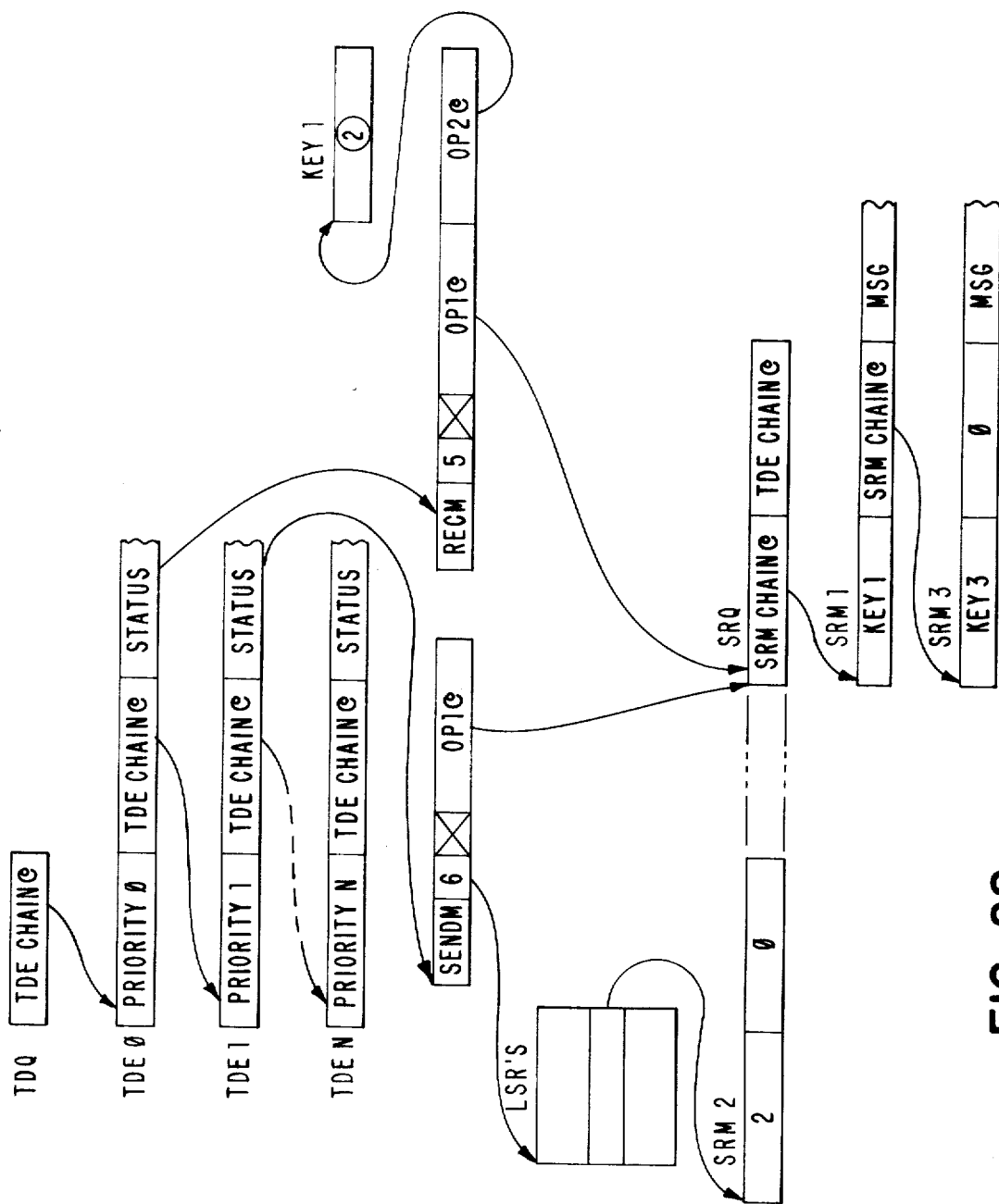
FIG. 28 is a diagram illustrating the initial state of a task issuing a receive message instruction to a send receive queue.
Figure 29:
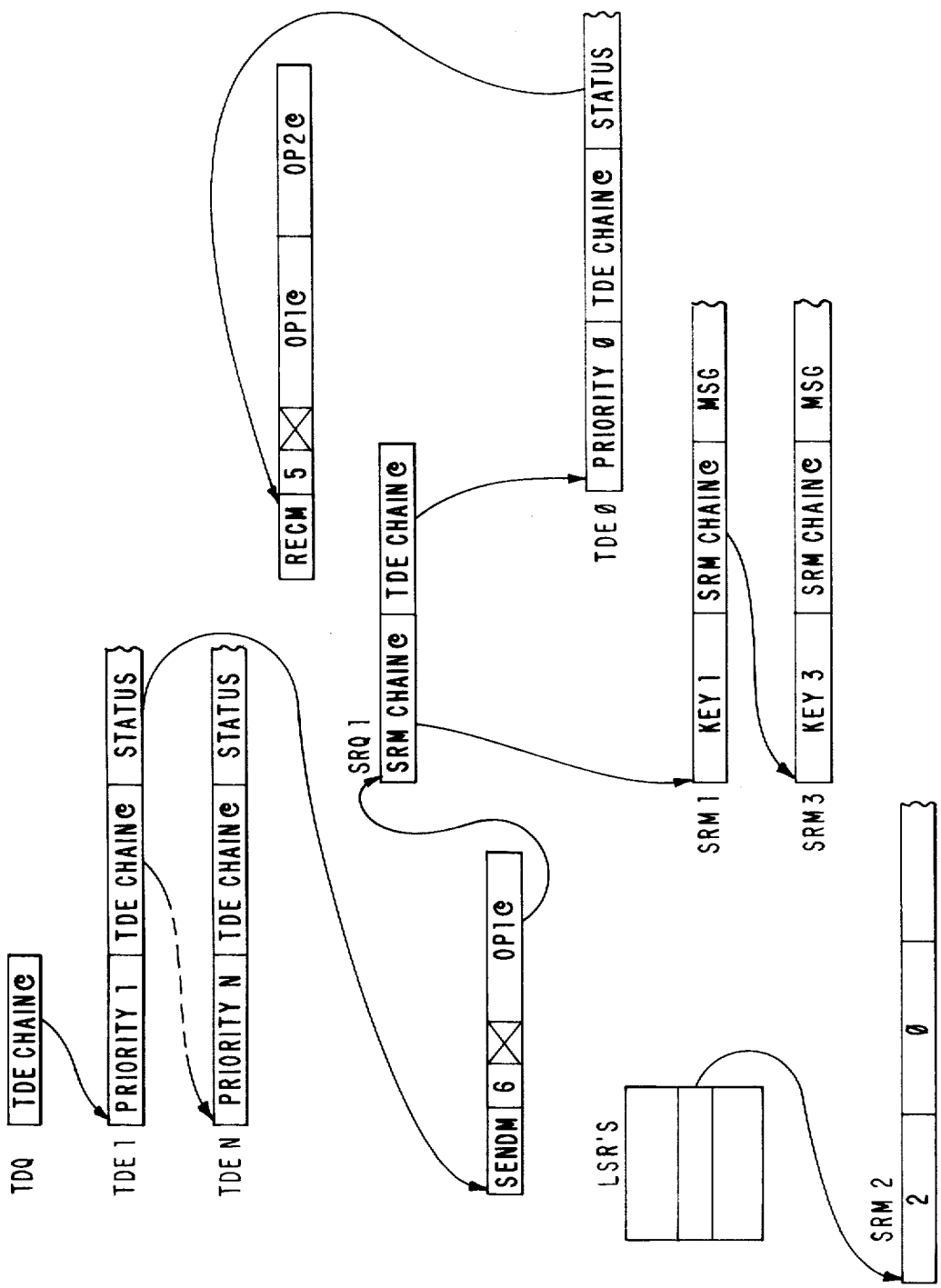
FIG. 29 is a diagram illustrating the state of the task dispatching queue and the send receive queue after the receive message instruction of FIG. 28 was unsatisfied.
Figures 30, 31:
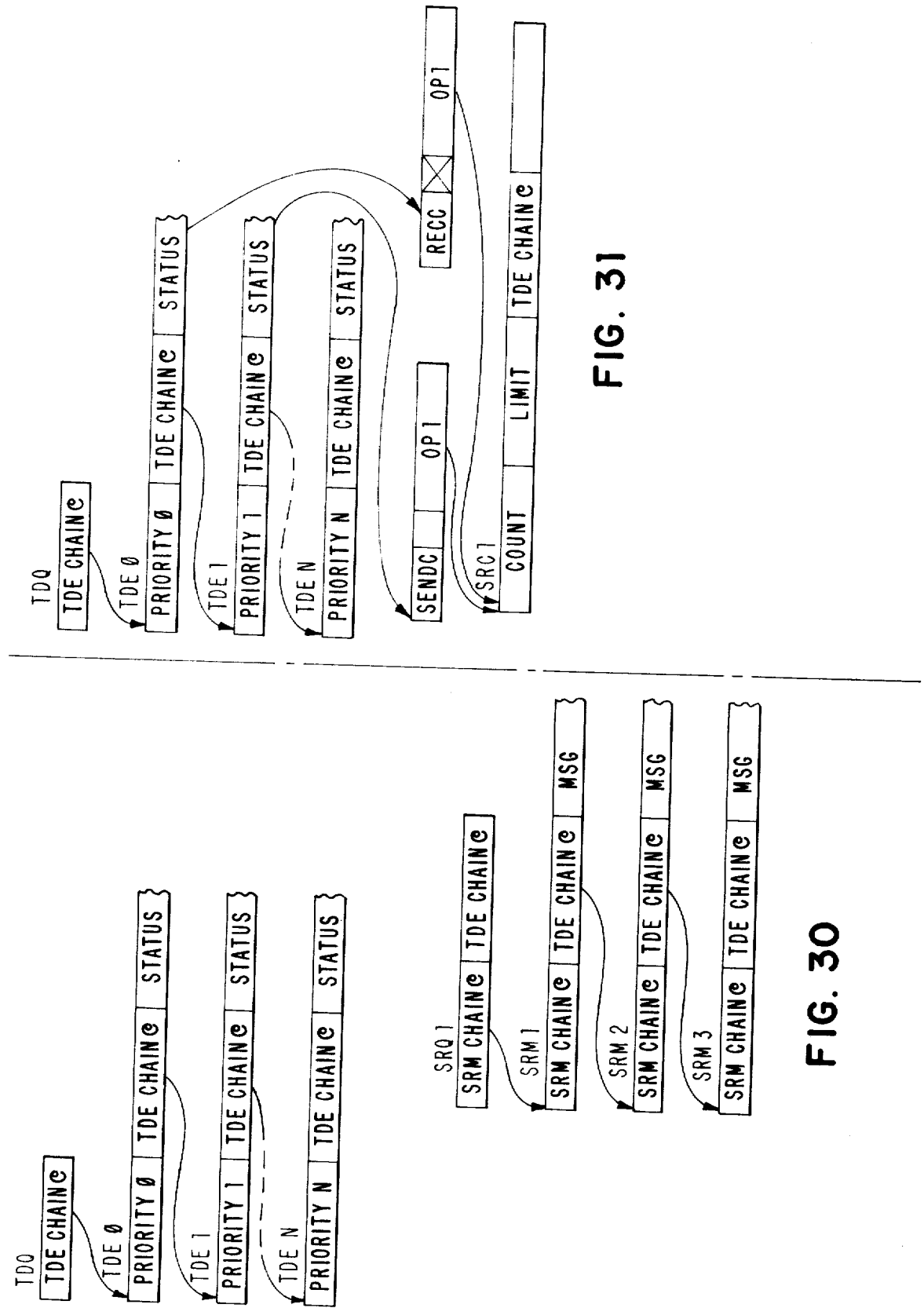
FIG. 30 is a diagram illustrating the state of the task dispatching queue and the send receive queue after the active task in FIG. 29 issued a send message instruction to the same send receive queue that was issued the receive message instruction.
FIG. 31 is a diagram illustrating the state of a task issuing a receive count instruction to a send receive count queue.

In FIG. 28, it is seen that the TDQ object has a TDE address which points to the highest priority TDE on the TDQ. This happens to be a TDE having a priority of zero. The TDE with the zero priority is chained to a TDE having a priority of one and this TDE chains to the next highest priority TDE, and so forth, with TDE having a priority of N being the last TDE on the TDQ. The TDE having the zero priority is the active task and its IA field points to a receive message instruction in storage. The OP 1 field of the receive message instruction points to SRQ 1 which has SRM 1 chained to it. SRM 3 is chained to the SRM 1. There are no TDE's chained to the SRQ 1. This indicates that there are no inactive waiting TDE's on the SRQ 1. The OP 2 field of the receive message instruction points to a key data object in main storage 10 having a value of two. None of the SRM's on the SRQ 1 contain a key field having a value of two and, therefore, the receive message instruction is unsatisfied. It should also be noted that the IA field of TDE 1 on the TDQ points to a send message instruction. The I field of this send message instruction points to a LSR array register 70 containing a main storage address of a storage word SRM 2. Because the receive message instruction is not satisfied, the active TDE O will be dequeued from the TDQ and enqueued onto the wait list of the SRQ 1., as illustrated in FIG. 29. The TDE 1 will then become the active TDE and the execution of the send message instruction will cause SRM 2 to be enqueued in priority sequence onto SRQ 1, as illustrated in FIG. 30.

The remove cycles involved during the receive message instruction start with a T2 CPU cycle, as illustrated in FIG. 27. Prior to the T2 CPU cycle, it should be noted that SA register 36 had been loaded with the first field of the SRQ. This took place during the I-fetch cycle for the receive message instruction. Also during the I-fetch cycle for this instruction, register 37 was loaded with the key data object from main storage 10, which will be used for locating a particular SRM, if any, on the SRQ. The CCH SAR 56 was loaded during the receive message execution cycle with the address of the first field of the SRQ 1 just prior to the remove cycle. During the T2 CPU cycle, the CCH SAR 57 is loaded with the contents of the SA register 36. The CCH SAR 57 contains the address of the current queue element being processed. This T2 CPU cycle is followed by an A2 CPU cycle, where the contents of CCH SAR 57 are examined to determine if they are zero. This is done to determine if there are any SRM's on the SRQ.

In the particular example of FIG. 28, there are two SRM's on the SRQ and, therefore, the CCH address is not zero, and thus the AZ latch 96 will not be set by ALU 45. A S1 CPU cycle is then taken to fetch the key field of SRM 1 and to increment the CCH address. The key field retrieved from storage 10 is then placed into SA register 36. An A1 cycle is then taken to compare the key data object with the key field to determine if the key field equals the key object. This is accomplished by subtracting the contents of the SB register 37 from the SA register 36. It should also be noted that if the key data object were greater than the key field, that would be an indication that no further comparisons would be necessary because the key field of any lower priority SRM could never be equal to the key object. If the key field equals the key object, the AZ latch 96 is set. A S1 cycle is then taken to fetch the chained address of the SRM 1 from main storage 10 and place the same in the SA register 36. During this S1 cycle, the AZ and ST latches 96 and 97 are decoded to determine the next cycle of operation. Because the AZ latch 96, in the example of FIG. 28, would be in the reset state because the key field of SRM 1 didn't compare with the key data object and the ST latch 97 is reset, a T2 CPU cycle is taken to transfer the contents of CCH SAR 57 to PCH SAR 56. This is to put the address of SRM 1 into the PCH SAR. The PCH SAR is then incremented by one during an A2 CPU cycle. The value of the address for the SRM chain address field has now been saved for subsequent use if the next SRM on the chain of SRM's is to be removed.

Because the key object did not compare with the key field of SRM 1, the operation loops back to the beginning of the remove cycles and the key field of the next SRM on the SRQ 1 will be compared with the key data object. This operation continues until the key field of the last SRM on the SRQ has been compared with the key data object. In this instance, when the compare operation has been completed with respect to the key field of SRM 3, the main search loop is executed again, and because the SRM chain address field of SRM 3 is zero, the AZ latch 96 will be set and the operation switches, whereby the S and R latches 87 and 88 are decoded by control unit 100. It should be noted that when the AZ latch 96 was set, that was an indication that the receive message instruction was not satisfied. Receive latch 88 is still set; hence, the next operation is that the control unit 100 sets D latch 93 to invoke dispatch cycles at the beginning of the next I-fetch cycle. The S latch 87 is then tested, and because it is off, the RI latch 98 is set by control unit 100. A T2 CPU cycle is then taken to load the contents of the TDQ SAR 52 into the PCH SAR 56. A S1 CPU cycle is then taken to load SA register 36 with a PCH address from main storage 10, where the PCH address is the address of the TDQ. A T2 CPU cycle is then taken to transfer the contents of the current TDE SAR 53 into the OP 2 SAR 55. A S1 cycle is then taken to retrieve the priority field of TDE O from main storage 10 and enter the same into SB register 37. This is done so that the search loop previously described can be used for dequeueing the TDE from the TDQ.

The main remove cycle's search loop is executed again and, because the priority field of the TDE O is being compared with itself, the contents of the SA register will equal the contents of the SB register, and hence, the AZ latch 96 will be set. The ST latch 97, however, will still be in the reset state. Hence, the next operation will be a S2 CPU cycle rather than a T2 CPU cycle. During the S2 CPU cycle, the value in the SA register 36 is loaded into main storage 10 at a location containing the TDE address in the TDQ field. This breaks the previous chain whereby the TDE address in the TDQ field now points to TDE 1 rather than TDE O. It should be noted that, although the TDE O is removed from the TDQ, the movement is not a physical movement of the TDE, but only a change in the TDE address in the TDQ field.

The SR and RT latches 87, 88 and 98 are then decoded by control unit 100. In this instance, the S latch 87 is reset, and the R and RT latches 88 and 98 are set. Thus, the next operation is to load the contents of the CCH SAR 57 into the OP 2 SAR 55 during a T2 CPU cycle. The control unit 100 is setting up the proper conditions for switching the operation to insert cycles. A S1 CPU cycle is than taken to load the SB register 37 with the priority field of TDE 0 from main storage 10. Also during this S1 CPU cycle, the address in the OP 2 SAR 55 is incremented and returned to register 55. A test is then made to determine the type of operation, and this is done by testing the S latch 87. Because the S latch 87 is not set, the next cycle is an A2 CPU cycle, where the contents of the OP 1 SAR register 54 are incremented and placed back into the OP 1 SAR 54, so that the contents of OP 1 SAR 54 point to the TDE address field of SRQ 1. The contents of OP 1 SAR 54 are then transferred to PCH SAR 56 during a T2 CPU cycle. A S1 CPU cycle is then taken to load SA register 36 with the PCH address, i.e., in the example of FIG. 28, with the TDE address field of SRQ 1. The operation then proceeds with insert cycles, which are shown in detail in FIG. 25. At the start of an insert cycle, for the example illustrated in FIG. 28, the SA register 36 contains the TDE address field of SRQ 1, the SB register 37 contains the priority field of TDE 0, the PCH SAR 56 contains the address of the TDE address field of SRQ 1 and the OP 2 SAR 55 contains the chain address field of TDE 0.

The first cycle of the insert cycles is a T2 CPU cycle which is taken to load the CCH SAR 57 with the contents of SA register 36. An A2 CPU cycle is then taken to determine if the value of CCH SAR 57 is zero. In the particular example of FIG. 28, the contents of CCH SAR 57 will be zero, because the TDE address field of SRQ 1 is zero. The zero value indicates that there were no TDE's waiting in the inactive state on SRQ 1. Because the value of CCH SAR 57 is zero, the ALU 45 sets the AZ latch 96. This latch is tested and, because it is set, the next operation is a T2 CPU cycle to load the SA register 36 with the contents of the CCH SAR 57. This cycle is followed by a S2 CPU cycle, where the contents of the SA register 36 are stored in main storage 10 at the address contained in the OP 2 SAR 55. Hence, the TDE address field of SRQ 1 (all zeroes) now resides in the chain address field of TDE 0. The OP 2 address in SAR 55 is decremented during the S2 CPU cycle. It is sufficient to note, at this time, that the S2 CPU cycle is illustrated in detail in FIG. 13, and will be described later herein.

A T2 CPU cycle is then taken to load the SA register 36 with the contents of the OP 2 SAR 55. The contents of OP 2 SAR 55, as noted, were decremented during the previous S2 CPU cycle. Hence, the SA register 36 is loaded with the address of TDE 0. This address in SA register 36 is then stored in main storage 10 during a S2 cycle at an address specified by PCH SAR 56, whereby the TDE 0 is enqueued to SRQ 1. At this time, it should be noted that the states of the TDQ and SRQ 1 are as shown in FIG. 29. In FIG. 29, it should also be noted that the chain of SRM's on SRQ 1 remains unchanged.

The control unit 100 then decodes the S, ST and RT latches 87, 97 and 98, and finds that the S latch 87 is not set, and that the RT latch 98 is set. Because the S latch 87 is not set, the state of the ST latch 97 is not pertinent at this time. A1 and T1 CPU cycles are then taken in succession so as to reset the IAR SAR 51 so that it will point to the unsatisfied receive message instruction and the IL register 38 is set to zero. The operation then switches to an I-fetch cycle of the active task, which is still TDE 0 because a task switch has not as yet taken place.

Figure 22:
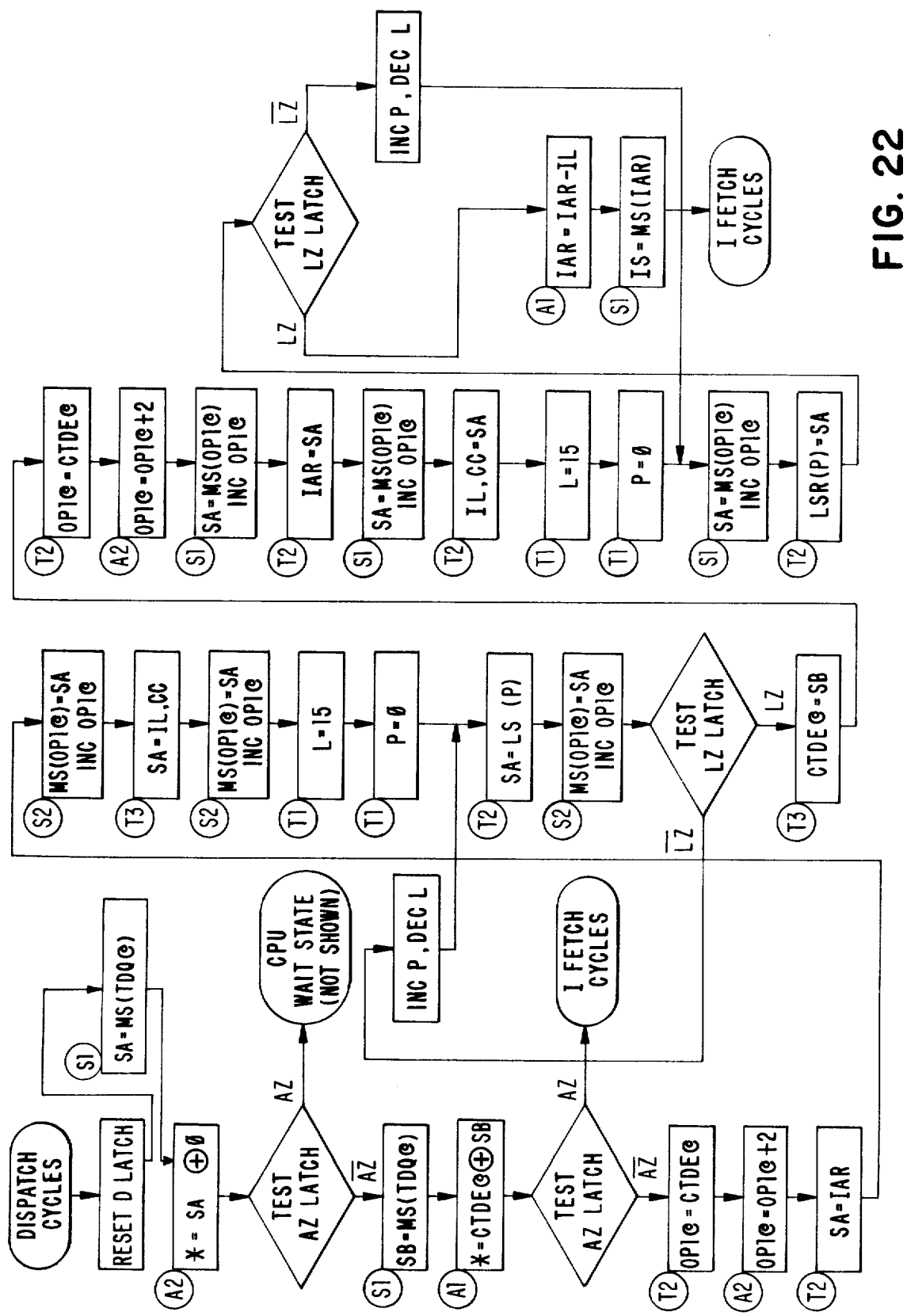
FIG. 22 is a flow diagram illustrating dispatch cycles.

With reference again to FIG. 21, the I-fetch cycle is entered, and the D and IO latches 93 and 94 are decoded by control unit 100 and it is found that the D latch 93 is set and the IO latch 94 is reset; hence, dispatch cycles are entered. The dispatch cycles are shown in detail in FIG. 22. Upon entering the dispatch cycles, the D latch 93 is reset by control unit 100. A S1 cycle is then executed to load SA register 36 with the TDE chain address field of the TDQ. An A2 CPU cycle is then taken to determine if the TDE chain address field in SA register 36 is zero. Because in the particular example of FIGS. 28 and 29, there are additional TDE's on the TDQ, the contents of SA register 36 will not be zero. Hence, the AZ latch 96 will not be set. If there were no more TDE's on the TDQ, the CPU 30 would enter a wait state.

With the AZ latch 96 in the reset state, a S1 CPU cycle is taken to load the SB register 37 with the TDQ chain address field (which points to the top TDE on the TDQ) from main storage 10. The current TDE address in CTDE SAR 53 is then compared with the contents of the SB register 37 during an A1 cycle. In the particular example, the current TDE address is for TDE 0, whereas the TDE address in the TDQ data object is pointing to TDE 1. Hence, as a result of the ALU operation, the AZ latch 96 will not be set. If it had been set, a task switch would not be required, and I-fetch cycles would follow. A T2 CPU cycle, however, follows where the OP 1 SAR 54 is loaded with the contents of the current TDE SAR 53. The contents of the OP 1 SAR 54 are then incremented by two, so as to point to the IA field of TDE 0. This takes place during an A2 CPU cycle. The function to be performed is to store the status fields of the current TDE. After this is accomplished, as will be described shortly, the status fields for the new active TDE, i.e., TDE 1, will be loaded into the appropriate registers.

A T2 CPU cycle is taken to load the SA register 36 with the contents of IAR SAR 51. The IAR SAR 51 is then saved in main storage 10 during a S2 CPU cycle by loading the contents of SA register 36 into main storage 10 at the OP 1 address in the OP 1 SAR 54, and the OP 1 address is incremented. A T3 cycle is then taken to load the SA register 36 with the contents of IL register 38 and condition code register 65. This is followed by a S2 storage cycle to load the contents of the SA register 36 into main storage 10 at the address specified by the OP 1 SAR 54.

The OP 1 address in SAR 54 is again incremented and returned to OP 1 SAR 54. A T1 cycle is then taken to put a value of fifteen into the L register 66. L register 66 is a counting register used for controling CPU loop iterations. L register 66 can be decremented by one and zero detect circuit 67 examines register 66 for an all zero condition. This T1 cycle is followed by another T1 cycle, where the P register 90 is set to zero. A T2 cycle is then taken to load the SA register 36 with the contents of the local storage array register 70, as addressed by the contents of P register 90. The contents of the SA register 36 are then transferred to main storage 10 at the address specified by the OP 1 SAR 54, and the OP 1 SAR 54 is incremented, all of this taking place during a S2 CPU cycle. A LZ latch 89, which is set when the value of L register 66 is zero, as determined by zero detect circuit 67, is then tested. In this instance, the LZ latch 89 will not be set. Hence, the P register 90 is incremented, and the L register 66 is decremented. The SA register 36 is again loaded with the contents of the LSR array register 70 addressed by the contents of the P register 90, and the sequence just described repeats until the contents of all of the LSR array registers 70 have been stored. This fact is indicated when L register 66 has been decremented to zero and the LZ latch 89 is set.

With LZ latch 89 set, a T3 CPU cycle is taken to load the CTDE SAR 53 with the contents of the SB register 37. The current TDE address in SAR 53 is then transferred into the OP 1 SAR 54 during a T2 cycle. An A2 CPU cycle is then taken to add two to the OP 1 SAR 54. A S1 CPU cycle is then taken to retrieve, from main storage 10, a value at the OP 1 address, and load this value into SA register 36 and increment the OP 1 address. Thus, SA register 36 is loaded with the IA field of TDE 1. The IAR SAR 51 is then loaded with the contents of the SA register 36 during a T2 cycle. The IL and condition code registers 38 and 65, respectively, are then loaded with the IL and CC fields from TDE 1 by first retrieving these fields from main storage 10 and loading them into the SA register 36 during an S1 cycle, and then transferring the contents of the SA register to registers 38 and 65 during a T2 cycle.

The LSR array registers 70 are then loaded by first setting the L register 66 to a value of fifteen during a T1 cycle, and then loading P register 90 with a zero value during another T1 cycle. A S1 cycle is then taken to load the SA register 36 with a value for base register 0 of LSR array registers 70 from main storage 10 at an address taken from OP 1 SAR 54. The OP 1 SAR 54 is incremented during this S1 cycle. A T2 cycle is then taken to load base register 0 of LSR array 70 with the value from the SA register 36. The LZ latch 89 is tested and it will not be zero. Hence, the L register 66 is decremented and the P register 90 is incremented. A S1 CPU cycle is then taken to again load the SA register 36 with a value from main storage 10 for the next LSR array register 70, i.e., base register 1 of LSR array registers 70, and the loop just described repeats until all LSR array registers 70 are loaded. This condition is indicated by the setting of LZ latch 89. An A1 cycle is then taken to subtract the contents of the IL register 38 from the IAR SAR 51. The address in IAR SAR 51 now points to the first instruction of task TDE 1, which is then prefetched into the IS register 35 during a S1 cycle. The task switch is complete and I-fetch cycles are executed for the first instruction of the new task.

Figures 1, 9:
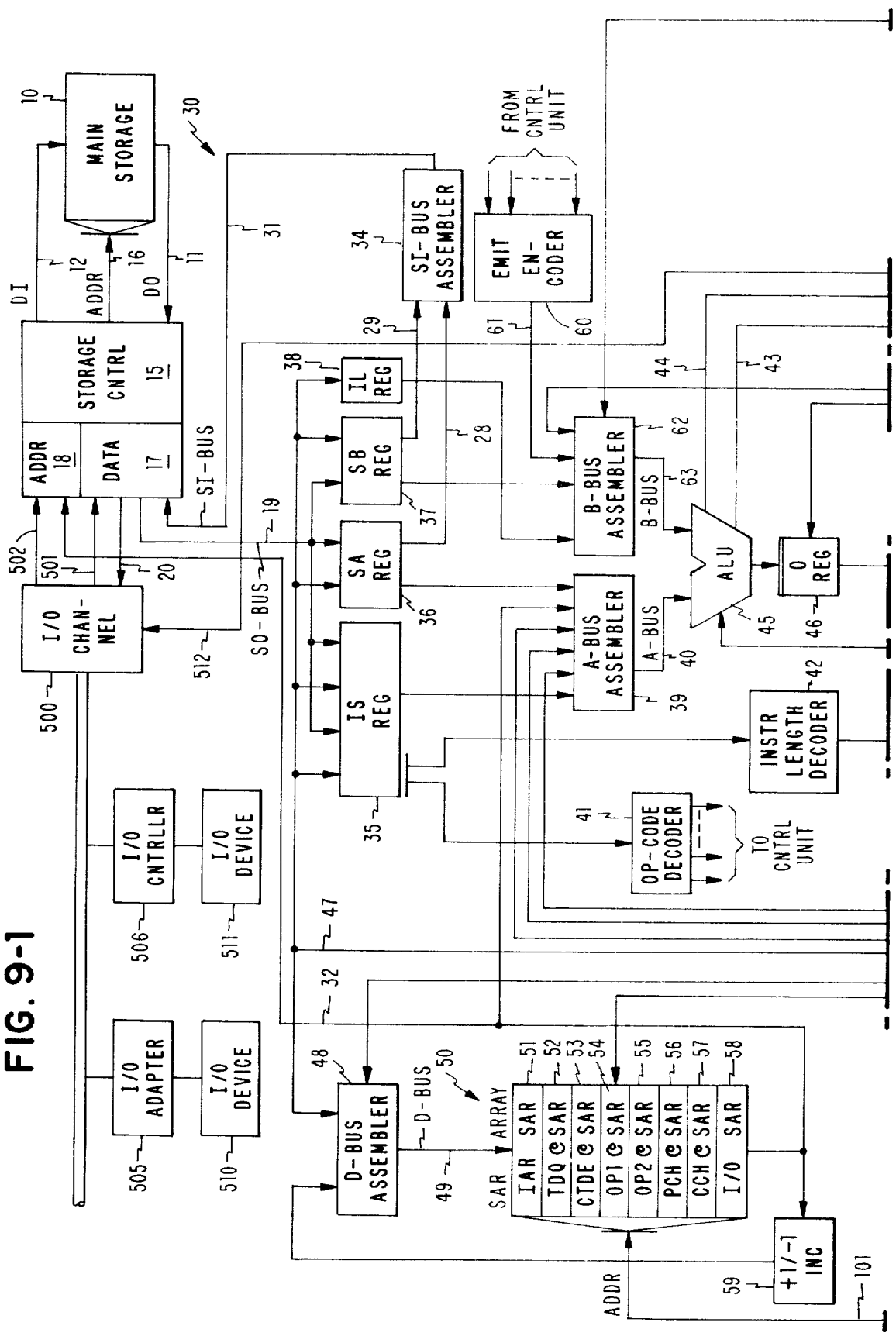
Figures 2, 9:
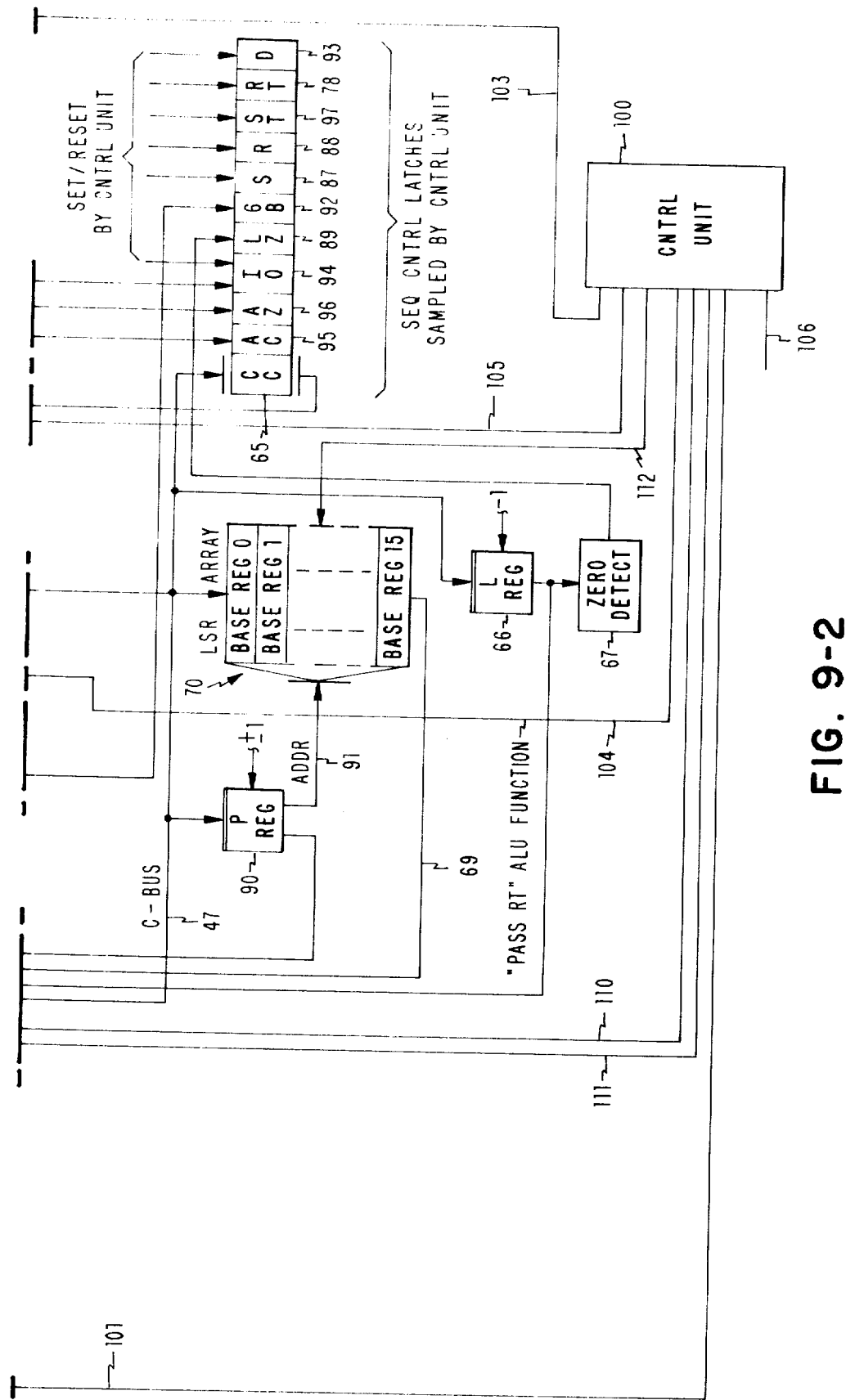
Figure 16:
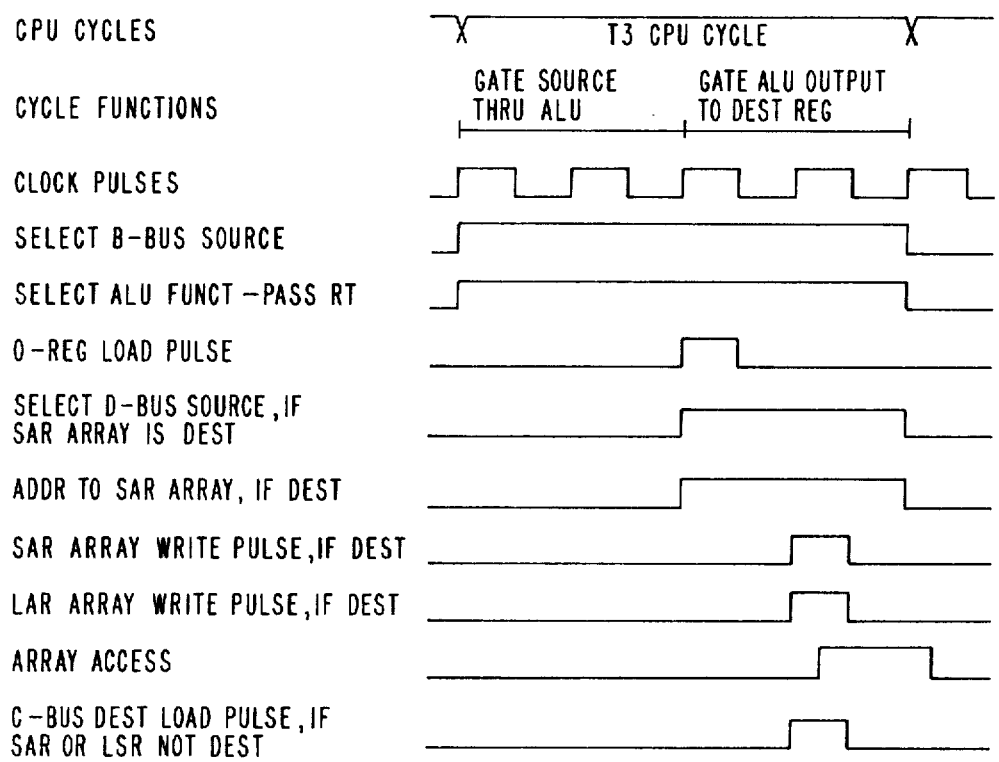

Before describing the fetching and execution of the first instruction of the new task, which, in the example shown in FIG. 28, is a send message instruction, the details of the T3, A2 and S2 CPU cycles will be described. Those elements of the computer involved in the T3 CPU cycle are shown in FIG. 9, and a timing diagram for the T3 CPU cycle is shown in FIG. 16. The function of the T3 CPU cycle is to transfer the contents of any source register feeding B-bus assembler 62 to any register connected to receive data via C-bus 47. The inputs into B-bus assembler 62 have been previously described, and are selected by signals from control unit 100 over bus 103. The data fed into B-bus assembler 62 from the selected source then passes over B-bus 63 to ALU 45. ALU 45 is controlled by a signal from control unit 100 over line 104, to pass the data on B-bus 63 to 0 register 46. 0 register 46 is loaded with the data from ALU 45 by a load signal from control unit on line 105. C-bus 47 receives the data from 0 register 46 and passes it to destination registers previously described. If one of the SAR array registers 50 is to be the destination register, control unit 100 provides an address on bus 101, a selection signal to D-bus assembler 48 on line 110 and a load pulse on line 111. If the destination register is to be one of the LSR array registers 70, P register 90 contains the address for selecting the LSR array register, and control unit 100 provides a load signal on line 112. If the selected register is other than the registers just described, control unit 100 provides a load pulse on representative load line 106. The other destination registers, of course, are IS register 35, SA register 36, SB register 37, IL register 38, condition code register 65, L register 66 and P register 90. From the foregoing, it is seen that the T3 CPU cycle is like a T2 CPU cycle, but the source data comes from sources feeding the B-bus assembler 62 rather than sources feeding A-bus assembler 39.

Figures 1, 11:
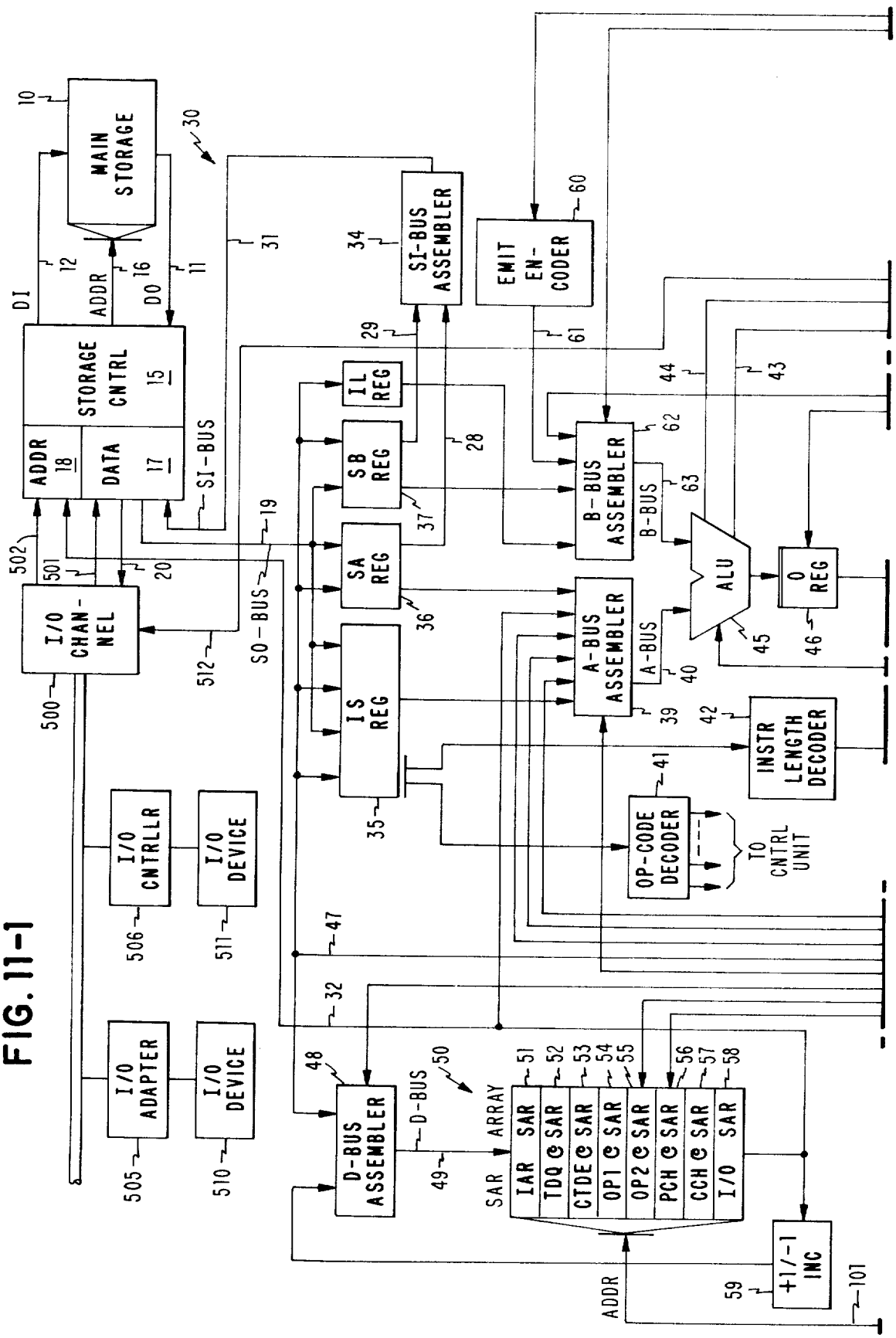
Figures 2, 11:
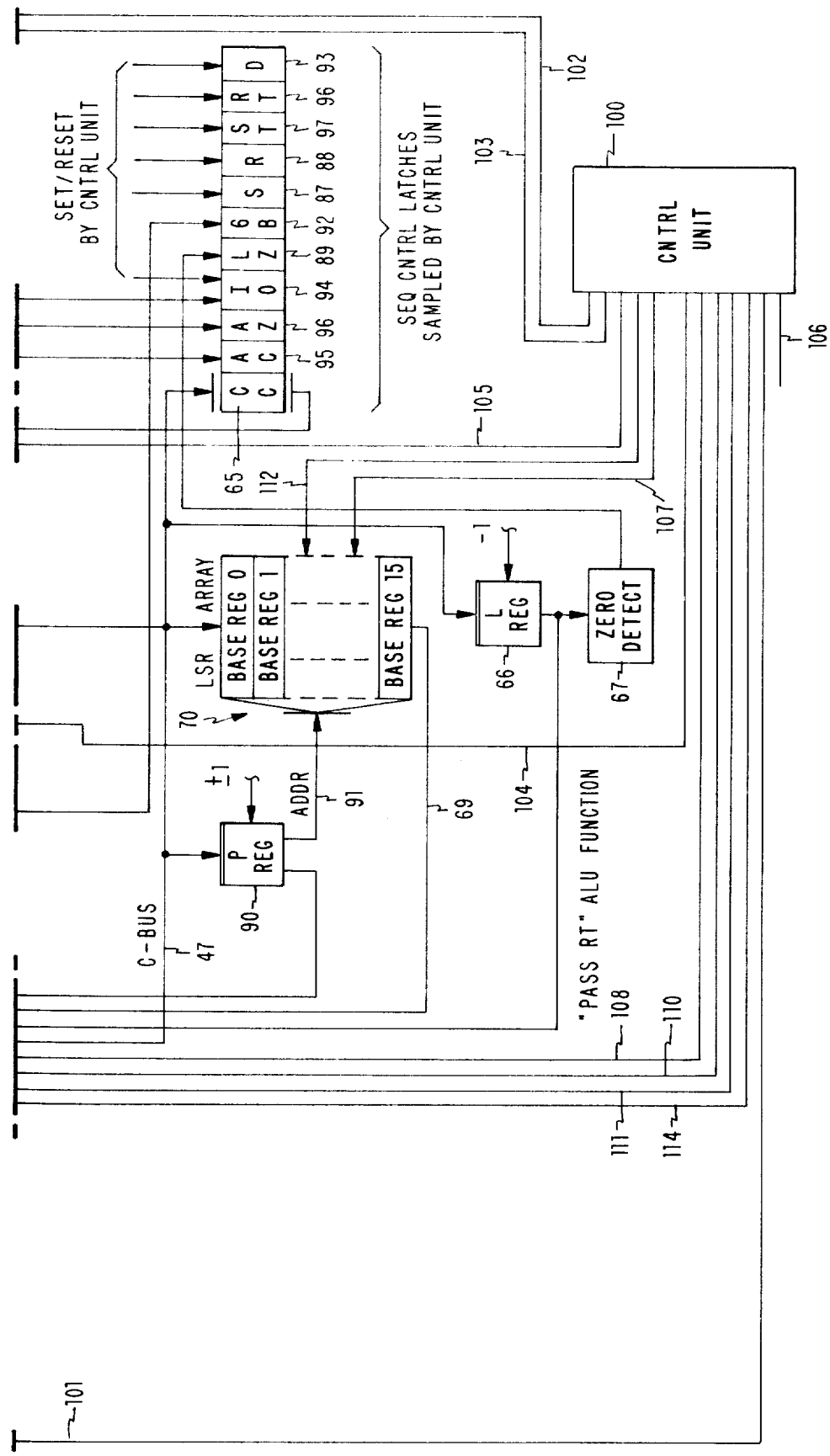

The A2 CPU cycle is similar to the A1 CPU cycle, but functions to control ALU 45 and inputs thereto from sources feeding A-bus assembler 39, and feeding ALU 45 via A-bus 40, and an immediate operand applied to B-bus assembler 62 and feeding ALU 45 via B-bus 63. ALU 45, controlled by control unit 100, performs the appropriate function, and the result is returned to either the source register or dropped. ALU 45 appropriately places AC and AZ latches 95 and 96 in their proper states via lines 43 and 44, respectively, as a consequence of the ALU operation. In FIG. 11, if the source of the data having an input into ALU 45 via A-bus 40, is to be one of the SAR array registers 50, control unit 100 provides an address on bus 101 and a read signal on line 114. The data then transfers to A-bus assembler via bus 32. If the source is to be one of the LSR array registers 70, control unit 100 provides a read pulse on line 107 and data is read from the register selected by the address in P register 90. The data passes from the selected LSR array register 70 to the A-bus assembler 39 via bus 69. All other sources feeding A-bus assembler 39 do not require a read signal.

The particular source into A-bus assembler 39 is selected by control unit 100, which provides selection signals on bus 108. The immediate operand comes from emit encoder 60, which is rendered active by control unit 100 via line 102. B-bus assembler selects the emit encoder 60 as an input source in response to control signals from control unit 100 via bus 103. ALU 45 performs the desired operation under control of a signal from control unit 100 via line 104. The result is entered into 0 register 46 when control unit 100 provides a load signal on line 105. The result in register 46 is then available to C-bus 47, where it is fed to a destination register.

If the destination register is to be one of the SAR array registers 50, control unit unit 100 again provides an address on bus 101, a load signal on line 111 and a D-bus assembler selection signal on line 110, whereby bus 47 is selected as the source into D-bus assembler 48, and the data enters the selected SAR array register 50 via D-bus 49. If the destination register is one of the LSR array registers 70, control unit 100 provides a load pulse on line 112, and the data on bus 47 enters the register selected by an address provided from P register 90. If the destination of the result is for registers other than SAR array registers 50 or LSR array registers 70, control unit 100 provides a load pulse on line 106 which is representative of load lines leading to the other destination registers.

Figures 1, 13:
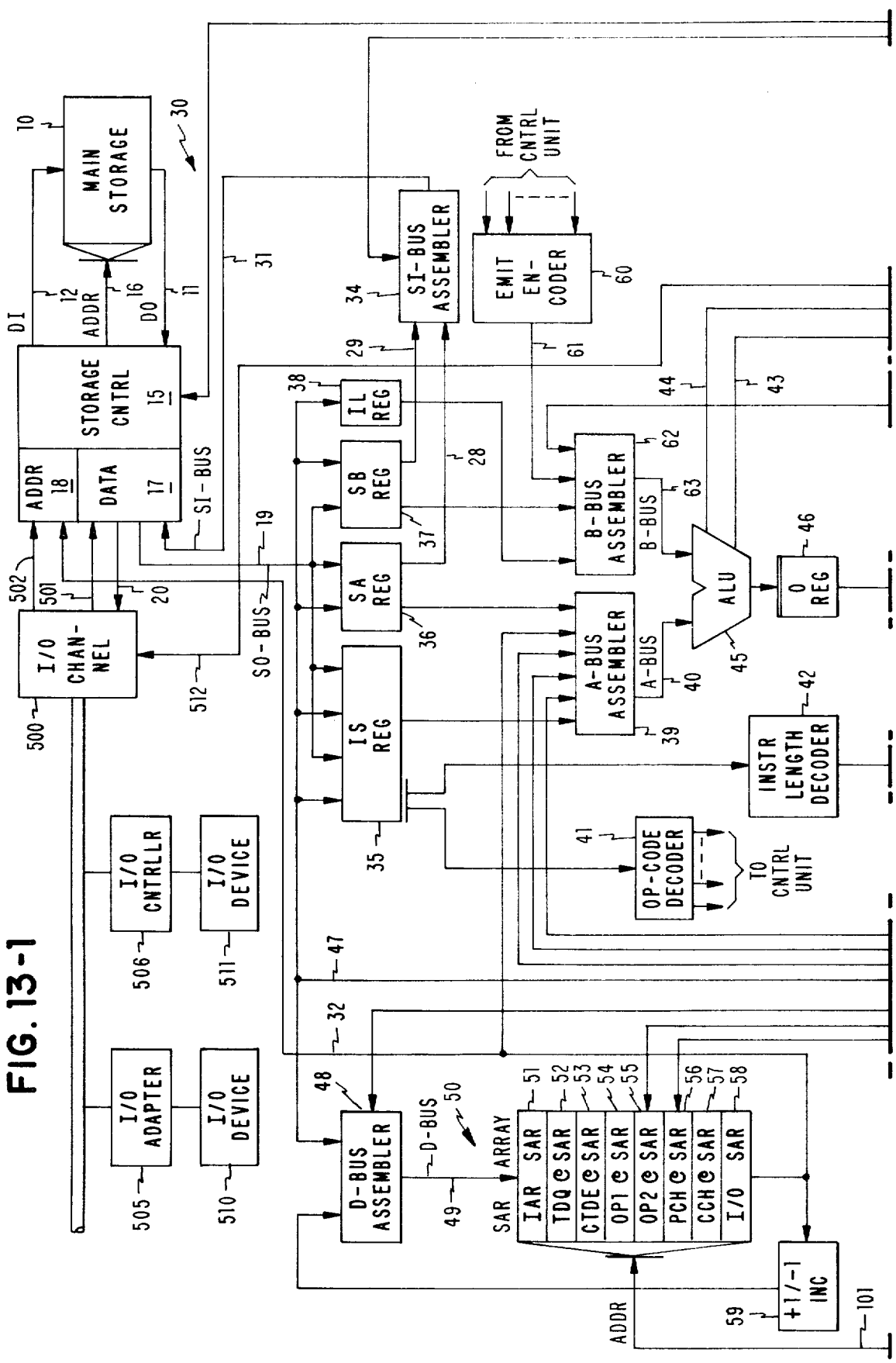
Figures 2, 13:
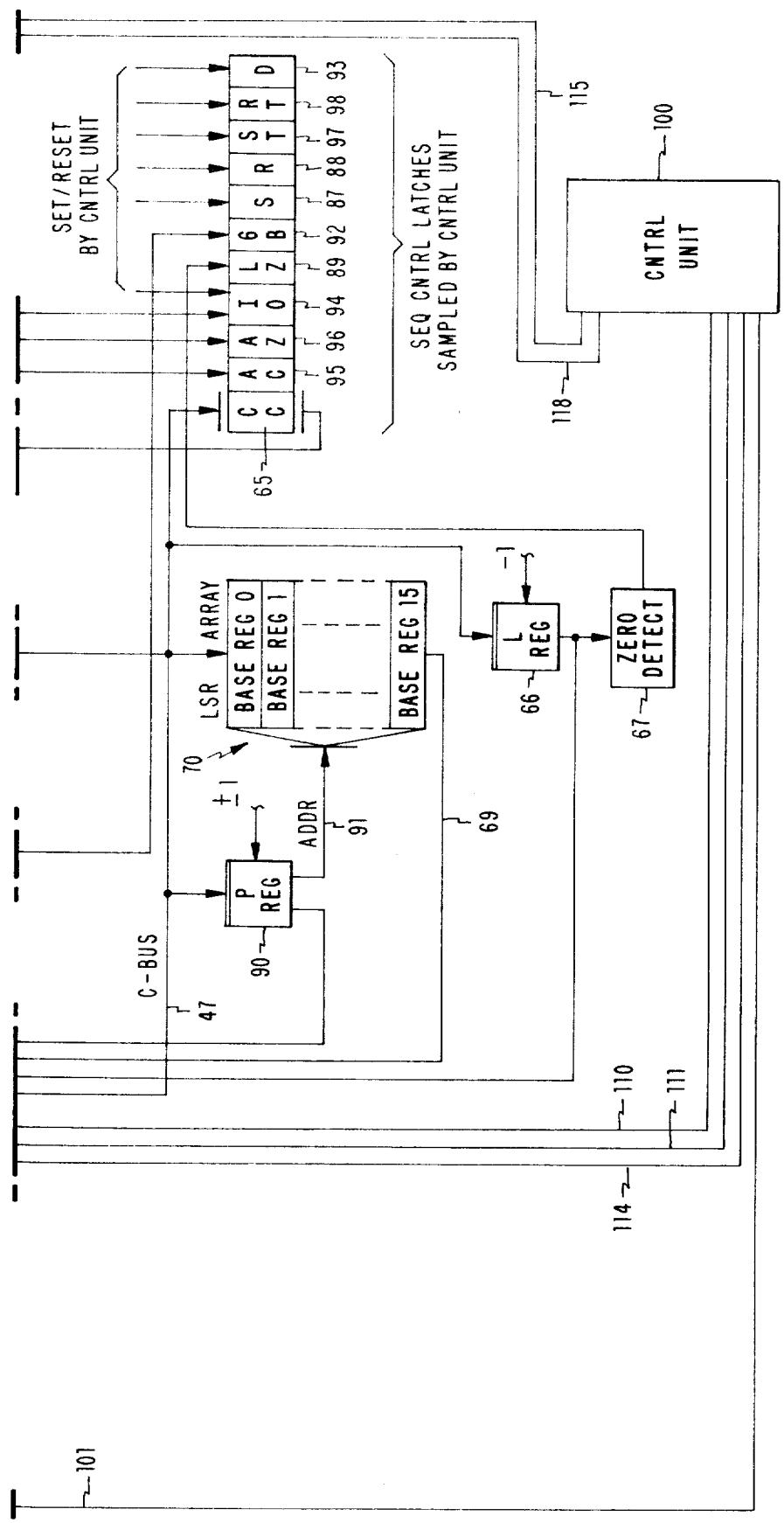
Figure 20:
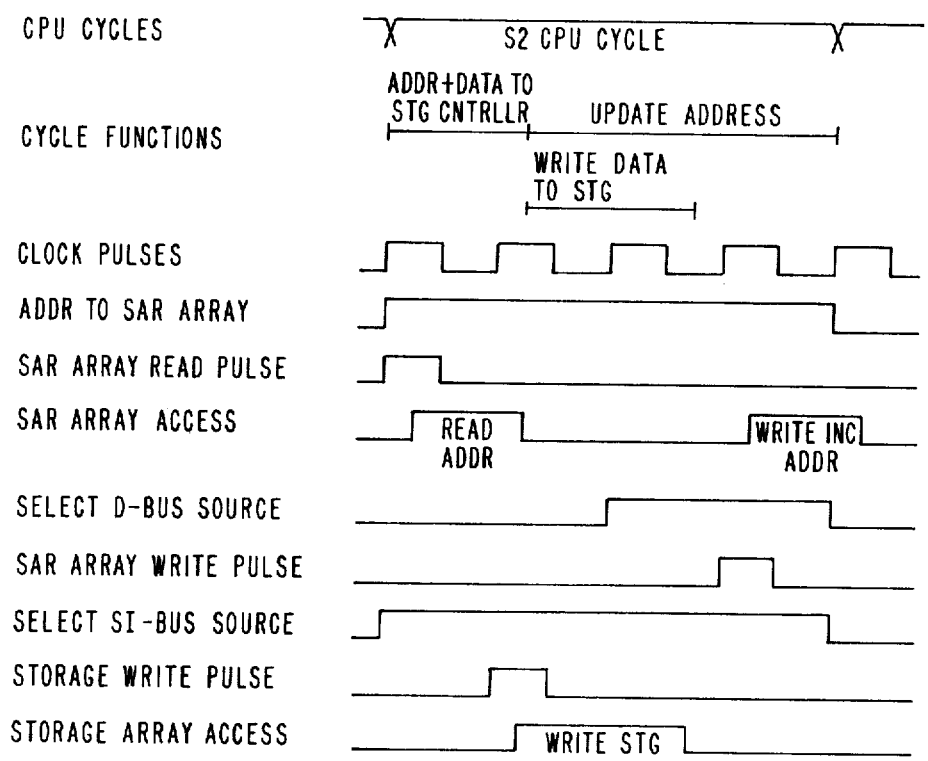

The details of the S2 CPU cycle are illustrated in FIGS. 13 and 20. The S2 CPU cycle differs from the S1 CPU cycle in that data is written into main storage from either SA register 36 or SB register 37 via buses 28 and 29, respectively, which feed SI bus assembler 34, which in turn feeds data register 17 via bus 31. The data then is passed to main storage 10 from storage control 15 over bus 12 and written into a storage location designated by the address in address register 18. The address placed into register 18 comes from one of the SAR array registers 50. Specifically, control unit 100 provides an address on bus 101 to address SAR array 50. The address data is read from the selected SAR array register 50 in response to a read signal from control unit 100 via line 114. The address data then passes from the selected SAR array register 50 over bus 32 to address register 18. The address in register 18 is then presented by storage control 15 to main storage 10 over address bus 16 when control unit 100 provides a signal on line 115. The timing for the signal on line 115 is set forth in the timing diagram of FIG. 20.

The data which is to be written into storage is selected from either SA register 36 or SB register 37 by a signal from control unit 100 via line 118 which is applied to SI bus assembler 34. The data passed by SI-bus assembler 34 enters data register 17 via bus 31, and is then presented by storage control unit 15 to main storage 10 via bus 12. The data, of course, is available to main storage 10 prior to the storage write pulse on line 115 as seen in FIG. 20. Additionally, the address provided from the selected SAR array register 50 can be incremented or decremented by incrementer 59 and then loaded back into the selected SAR array register 50. During the incrementing or decrementing operation, control unit 100 maintains the address for the selected SAR array register on bus 101. Control unit 100 provides a source selection signal to D-bus assembler 48 via line 110, and a load pulse on line 111, whereby the incremented or decremented address is then loaded back into the selected SAR array register 50.

With the immediate foregoing description, all CPU cycles involved in the present invention have now been described. Further, task initialization, instruction execution under a task and task switching have been described. Additionally, intertask communication, by way of a receive message instruction, has been described. Intertask communication by way of a send message instruction will now be described.

The format of a send message instruction (SENDM) is shown in FIG. 3, and it includes an OP code, in I field which contains a register address and an OP 1 field. The send message instruction is a four-byte instruction. The function of a send message instruction is to enqueue a message onto a SRQ and to determine if there are one or more inactive waiting TDE's on the wait list of the SRQ. If there are TDE's on the wait list of the SRQ, the TDE's are dequeued from the wait list and enqueued in priority sequence onto the TDQ, and the task dispatcher is invoked. If there are no TDE's on the wait list, the operation is complete and the next instruction of the active task is fetched without invoking the task dispatcher.

The execution of a send message instruction is generally shown in FIG. 4, and specifically shown in FIGS. 28, 29 and 30. In FIG. 4, the send message instruction enqueues the message pointed at by the pointer in the register defined in the I field of the send message instruction; i.e., the R2 register, to a SRQ specified by the OP 1 field in the send message instruction. The TDE's on the wait list of the specified SRQ are enqueued to the TDQ in priority sequence. In FIG. 28, the send message instruction is the first instruction of the task associated with TDE 1. The message is contained in storage at an address specified by base register 6 of LSR array 70. The message is SRM 2, and it will be enqueued onto SRQ 1, which is pointed at by the address in the OP 1 field in the send message instruction.

Figure 24:
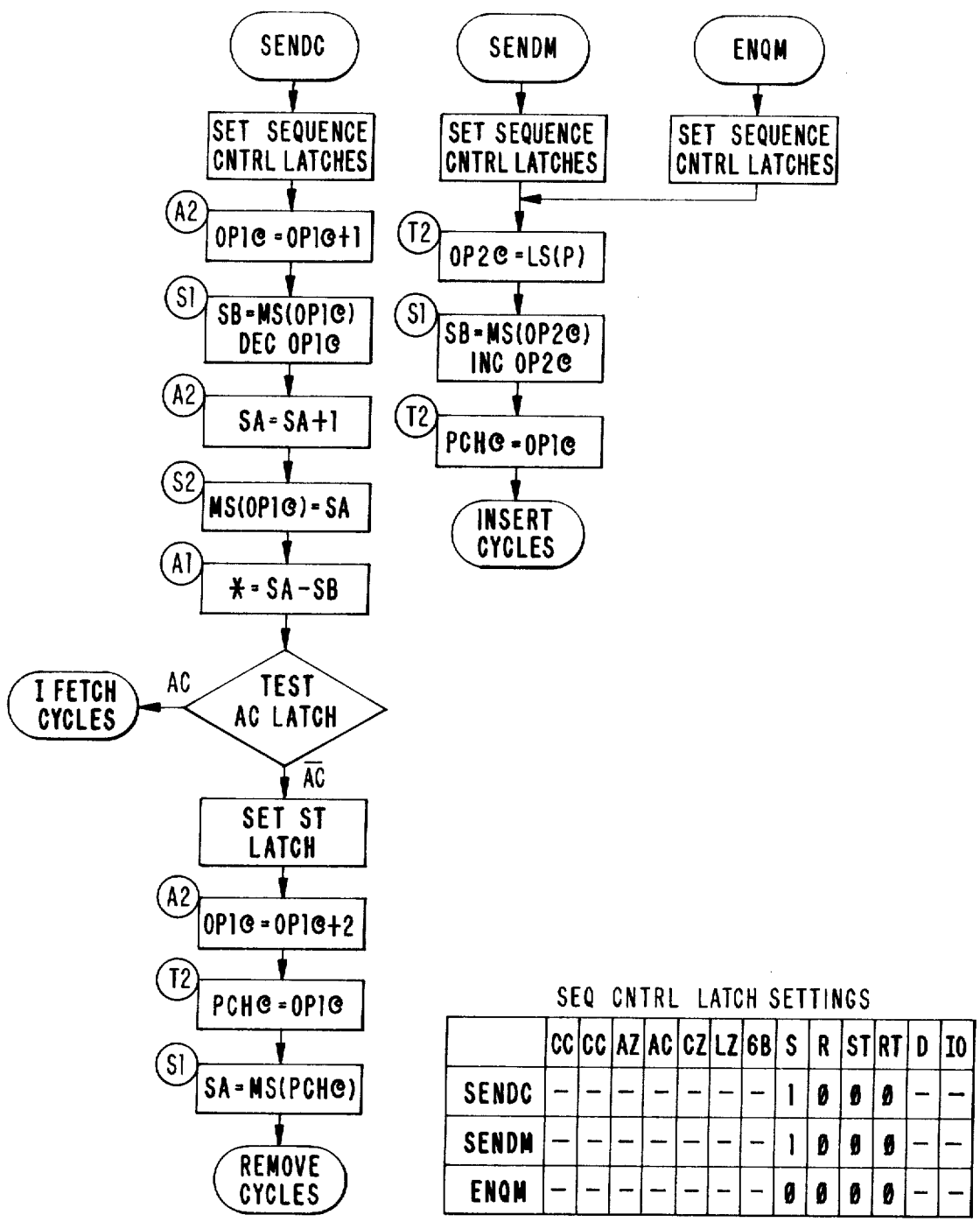
FIG. 24 is a flow diagram illustrating send count, send message and enqueue message execution cycles.
Figure 25:
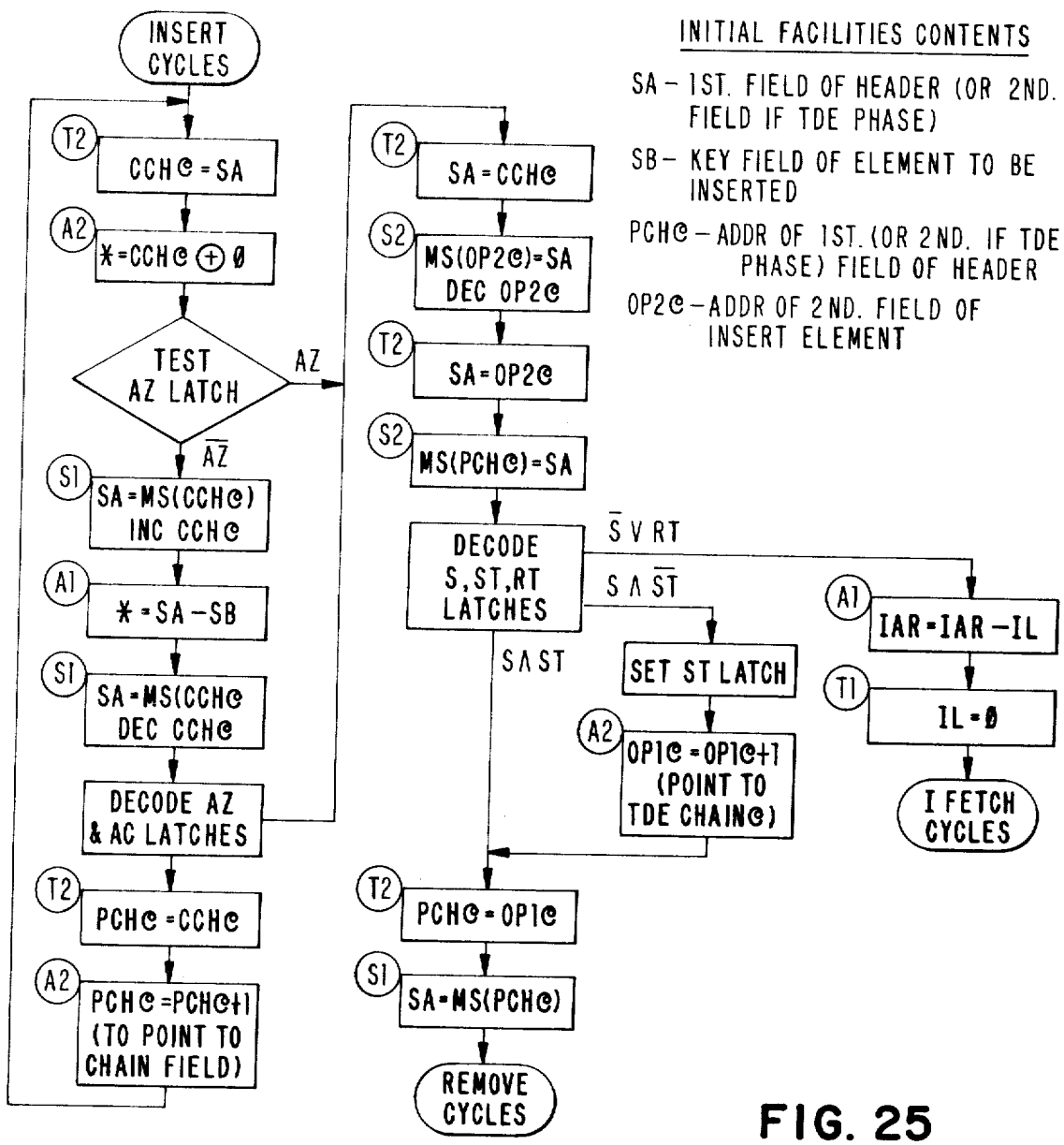
FIG. 25 is a flow diagram illustrating insert cycles.

The send message instruction is prefetched as described above, and the I-fetch cycles, as shown in FIG. 21, follow in the manner previously described. Upon completion of the I-fetch cycles, SENDM cycles are taken. The SENDM cycles are set forth in FIG. 24. Upon entering the SENDM cycles, the send latch 87 is set, and receive latch 88, send phase latch 97 and receive phase latch 98 are reset. A T2 cycle is then taken to transfer the address from base register 6 of LSR array 70 to OP 2 SAR 55. This is followed by a S1 cycle, which causes the transfer of the key field of SRM 2 from main storage 10 to SB register 37. During this S1 cycle, the address contained in OP 2 SAR 55 is incremented so as to point to the SRM chain address field of SRM 2. With the S1 cycle complete, a T2 cycle is taken to transfer the contents of OP 1 SAR 54 into the PCH SAR 56, so as to save the address in the event SRM 2 is being enqueued onto an empty SRQ. The operation then switches to insert cycles, which are shown in FIG. 25.

It should be noted that at the start of the insert cycles, SA register 36 contains the first field of SRQ 1, the SB register 37 contains the first field of SRM 2, PCH SAR 56 contains the address of SRQ 1 and OP 2 SAR 55 contains the address of the second field of SRM 2. The first cycle of the insert cycles is a T2 CPU cycle, where the contents of SA register 36 are transferred to CCH SAR 57. Thus, CCH SAR 57 contains the address of the first SRM or SRM 1 on SRQ 1. An A2 cycle is taken, and during this cycle, ALU 45 performs an Exclusive OR of the contents of CCH SAR 57 with zeros from emit encoder 60, to determine if there are any SRM's on SRQ 1.

In the particular example of FIGS. 28-30, inclusive, there are SRM's initially on SRQ 1. Hence, AZ latch 96 is reset by ALU 45. A S1 cycle is then taken to load the SA register 36 with the key field of SRM 1. Also, the CCH SAR 57 is incremented to point to the second field of SRM 1, which contains the SRM chain address. An A1 cycle is executed to determine if the key field of SRM 1, which is contained in the SA register 36, is greater than the key field of SRM 2, which is contained in the SB register 37. ALU 45 performs a subtract operation to accomplish this comparison. If the comparison is satisfied, the AC latch 95 will be set and the AZ latch 96 will be reset. In the particular example, the comparison fails because the AC latch is reset as a result of the ALU operation. A S1 cycle is then executed to transfer the SRM chain address field of SRM 1 to SA register 36, and to increment the CCH SAR address to point to SRM 1. A T2 cycle is then taken to transfer the contents of CCH SAR 57 to PCH SAR 56. This is followed by an A2 cycle to increment PCH SAR 56 so as to point to the SRM chain address field of SRM 1. The operation then loops back to a T2 cycle for transferring the contents of SA register 36, which now contains the address of SRM 3 to CCH SAR 57. The sequence of CPU cycles which test for the end of the SRM chain condition and perform the SRM key comparison, take place for a second time. In the example under consideration, the key field of SRM 3, i.e., three, is greater than the key field of SRM 2, i.e., two. Thus, the comparison is successful, and AC latch 95 is set and AZ latch 96 is reset. A T2 cycle is then taken to transfer the contents of CCH SAR 57 to SA register 36. With this transfer, the SA register 36 contains the address of SRM 3. A S2 cycle is then executed to transfer the contents of the SA register 36 to the SRM chain address field of SRM 2 in main storage 10. SRM 3 is now chained to SRM 2, whereas previously, SRM 3 had been chained to SRM 1. During this S2 cycle, the contents of OP 2 SAR 55 are decremented to point to the beginning of SRM 2. A T2 cycle is then taken to transfer the address in OP 2 SAR 55 to SA register 36. A S2 cycle is then taken to transfer the contents of SA register 36 to the SRM chain address field of SRM 1 in main storage 10. This completes the enqueueing of SRM 2 onto the SRQ 1 message chain.

The insert cycle operation continues by decoding latches 87, 97 and 98. In the example under consideration, latch 87 is set and latches 97 and 98 are in the reset state. Because of this, an operation takes place whereby latch 97 is set, and an A2 cycle is executed to increment the contents of OP 1 SAR 54 to point to the TDE chain address field of SRQ 1. A T2 cycle is then taken to transfer the contents of OP 1 SAR 54 into PCH SAR 56. A S1 CPU cycle follows, and during this cycle, the contents of the TDE chain address field of SRQ 1 are transferred into SA register 36. The various registers in the CPU 30 are now set up for removing the first TDE from the TDE chain of SRQ 1. TDE 0 had been enqueued onto SRQ 1, as illustrated in FIG. 29. With the S1 cycle complete, the operation switches to remove cycles of FIG. 27.

The remove cycles for dequeueing a TDE from a queue have already been described. In this particular instance, the TDE chain address field of the SRQ 1 is tested for a value of all zeros. The TDE chain address field of SRQ 1 will not be zero because TDE 0 is chained thereto, and thus, the test for all zeros will fail. The contents of the SA and SB registers 36 and 37 are then compared to each other. When dequeueing a TDE from a SRQ during a send message instruction, the result of the comparison of the contents of the SA register 36 with the SB register 37 is immaterial because the state of the ST latch 97 controls further CPU execution. Thus, when the AZ latch 96 and the ST latch 97 are decoded, the operation switches to a S2 cycle during which the contents of SA register 36, which represent the TDE chain address field of TDE 0, are transferred to the TDE chain address field of SRQ 1 in main storage 10. This effectively places zeros in the TDE chain address field of SRQ 1, thereby removing TDE 0 from the chain of TDE's on SRQ 1. Hence, at this time, TDE 0 has been removed or dequeued from SRQ 1.

The remaining cycles set up the necessary CPU facilities for enqueueing TDE 0 onto the TDQ. The S, R and RT latches 87, 88 and 98 are decoded, and a T2 cycle is taken to transfer the contents of CCH SAR 57 representing the address of TDE 0 to OP 2 SAR 55. The address in OP 2 SAR 55 is then used during a S1 cycle to transfer the key field of TDE 0 from main storage 10 to SB register 37, and to increment the contents of OP 2 SAR 55 so as to point to the TDE chain address field of TDE 0. Also, during this S1 cycle, the state of the S latch 87 is tested and, because it is set, a T2 cycle is executed next to transfer the contents of TDQ SAR 52 to PCH SAR 56. A S1 cycle follows to fetch the TDE chain address field of the TDQ in main storage 10 and load it into the SA register 36. CPU insert cycles of FIG. 25 then begin.

As previously described, the main loop of the insert cycles is executed until the proper location within the chain list is located for inserting the TDE 0 in key sequence. In the particular example under consideration, the loop is executed once, and TDE 0 is enqueued as the top element of the chained list of TDE's. In general, this sequence of dequeueing and enqueueing TDE's continues until all TDE's have been removed from the SRQ and inserted in key sequence onto the TDQ. Hence, the S, ST and RT latches 87, 97 and 98 are decoded during the insert cycles, and the proper CPU facilities are set up for the remove cycles which are to follow. The remove cycles of FIG. 27 are then again taken; however, in the example under consideration, there are no more TDE's chained to SRQ 1, and hence, when the TDE chain address field of SRQ 1 is tested for all zeros, the AZ latch 96 is found to be in the set state. This causes the decode of the S and R latches 87 and 88. With the S latch 87 is in the set state, D latch 93 will be set to indicate that the state of the TDQ has been changed since the beginning of the execution of the send message instruction. Hence, dispatch cycles must be executed before beginning the execution of the next instruction of the new active task.

Because the send message instruction execution is complete, the next instruction will have been prefetched in the manner previously described; howver, during the I-fetch cycles of this next instruction, the D and I/O latches 93 and 94 will be decoded, and it will be found that the D latch 93 is set and I/O latch 94 is reset. Hence, I-fetch cycles are suspended and dispatch cycles will be taken. Dispatch cycles occur in the manner previously described. In the example under consideration, the function of the dispatch cycles is to save the status of the current active task in TDE 1 and load the status of task TDE 0 into the facilities of CPU 30, and thereby pass control to the previously unsatisfied receive message instruction of TDE 0 by returning to I-fetch cycles. It will be recalled that during the dispatch cycles, D latch 93 is reset and, hence, control is passed to the previously unsatisfied receive message instruction of TDE 0, and the I-fetch cycles for that instruction continue.

In the example under consideration, the receive message instruction will now be satisfied because SRM 2 is now enqueued on SRQ 1. Upon completing the receive message execution cycles illustrated in FIG. 26, remove cycles follow. During the remove cycles, illustrated in FIG. 27, the main loop is executed two times. A key compare occurs during the second time through the loop. SRM 2 is dequeued from SRQ 1, where the dequeueing takes place in the manner previously described. The S, R and RT latches 87, 88 and 98 are decoded. R latch 88 is in the set state at this time, and thus, the address of the dequeued SRM 2, which is contained in CCH SAR 57, is transferred to the LSR array register 70 specified by the R3 field of the receive message instruction. The execution of the receive message instruction is complete, and the I-fetch cycles for the next prefetched instruction are activated. This completes the description of a satisfied receive message instruction.

Intertask communication is also accomplished by receive count and send count operations, which include execution of receive count and send count instructions, illustrated in FIG. 3. The function of a receive count operation is to indicate a readiness to provide service or to determine if a previously requested function has been completed. The receive count operation, like the receive message operation, always has a TDE associated with it; i.e., the top TDE on the TDQ. The receive count instruction has a blank I field and an OP 1 field. The OP 1 field contains an address which points to the first word of a send receive count (SRC) queue. During the operation of a receive count instruction, a count is compared to a limit, and if the count is greater than, or equal to, the limit, the count is decremented by the limit and the instruction is complete. If the count is less than the limit, the active TDE is moved from the TDQ to the wait list of the SRC. The count field is not incremented or decremented and the task dispatcher is executed.

The send count instruction contains a send count OP code and an OP 1 field where the OP 1 field points to the first word of the SRC queue. During operation of a send count instruction, the count field is incremented by one and compared to a limit field. If the count is greater than, or equal to, the limit, any TDE's on the wait list of the SRC are enqueued to the TDQ in priority sequence, and the task dispatcher is invoked. If no TDE's are on the wait list of the SRC, the instruction is complete. Also, if the count is less than the limit, the instruction is complete.

Operation of send count and receive count instructions are illustrated in FIG. 31. In FIG. 31, TDE 0 is the active TDE, and its IA field is pointing to a receive count instruction. The OP 1 field of the receive count instruction points to SRC 1. The format of an SRC queue is shown in FIG. 3, and it consists of a count field, a limit field and a TDE chain address field. In FIG. 31, SRC 1 has a count of zero, a limit of one and a TDE chain address of zero. Because the initial values of the count and limit fields of SRC 1 are zero and one, respectively, the receive count instruction is unsatisfied, and TDE 0 is dequeued from the TDQ and enqueued onto the wait list of SRC 1. TDE 1 is then dispatched by means of the task dispatcher as the highest priority task on the TDQ. TDE 1 has an instruction address which points to a send count instruction. The OP 1 field of this send count instruction points to SRC 1. During execution of the send count instruction, the count field of SRC 1 is incremented by one. Thus, the count field equals the limit field, and because of this, TDE 0 is dequeued from the wait list of SRC 1 and enqueued onto the TDQ as the highest priority TDE. The task dispatcher then dispatches TDE 0 as the active task. The receive count instruction pointed to by the IA field of TDE 0 is reexecuted. This time, the count field is greater than, or equal to, the limit field and the receive count instruction is considered to be satisfied. The count field is decremented by the limit field by means of a subtract operation, and the new value of the count is returned to the count field of SRC 1, and the receive count instruction is complete. Instruction execution then continues with the next sequential instruction of task TDE 0.

The receive count instruction goes through I-fetch cycles in the manner previously described in connection with FIG. 21, and then continues with receive count cycles set forth in FIG. 26. The sequence control latches, i.e., the S, R, ST and RT latches 87, 88, 97 and 98, are set to the states of zero, one, zero and zero, respectively. These settings are the same as they were for the receive message instruction. This assures that if TDE's are moved during execution of the receive count instruction, they are moved in an identical manner as that for the receive message instruction. After the sequence control latches have been set, an A2 cycle is taken to increment the OP 1 SAR so that it will point to the limit field of SRC 1. This is followed by a S1 cycle during which the limit field is fetched from storage 10 and loaded into the SB register 37. The contents of OP 1 SAR 54 are decremented to point back to the count field of SRC 1. Thus, the SA register 36 contains a count field of SRC 1, and SB register 37 contains the limit field of SRC 1. An A1 cycle is then taken to determine if the count field is greater than, or equal to, the limit field, and at the same time, to subtract the limit value from the count value. If the count is greater than, or equal to, the limit, the ALU carry latch AC 95 is set as a result of the ALU operation. As previously indicated in the example under consideration, the count field value of zero is less than the limit field value of one, and hence, the ALU carry latch AC 95 is reset by ALU 45. The condition of AC latch 95 is then tested, and since it is in the reset state, it is known that the receive count instruction is unsatisfied. Thus, it is necessary to dequeue TDE 0 from the TDQ and enqueue it as a waiter on SRC 1. Therefore, the operation switches to remove cycles.

The remove cycles are entered so as to dequeue TDE 0 from the TDQ, and enqueue TDE 0 on SRC 1. The remove cycles for performing the task switch have been previously described. Thus, the task switch takes place in the same manner as for other task switches, and at this time, control is passed by the task switch to TDE 1, which executes the send count instruction, as generally described above. During execution of the send count instruction, I-fetch cycles are taken, as previously described, and then the operation switches to send count cycles, which are shown in detail in FIG. 24.

At the beginning of the send count cycles, the sequence control latches S, R, ST and RT 87, 88, 97 and 98, respectively, are set to the states of one, zero, zero and zero, respectively. Thus, the sequence control latches for the send count instruction are set to the same states as for the send message instruction. This insures that if TDE manipulations are necessary, they proceed in identical fashion as for the send message instruction. An A2 CPU cycle is then taken to increment OP 1 SAR 54 so as to point to the limit field of SRC 1. This cycle is then followed by an S1 CPU cycle for fetching the SRC limit field from main storage 10, and enter it into the SB register 37. Also, during this S1 CPU cycle, the OP 1 SAR 54 is decremented to point back to the count field of SRC 1. At this time, the SA register 36 contains the count field, and SB register 37 contains the limit field of SRC 1. An A2 cycle is then taken to increment the count field by one. This A2 cycle is followed by a S2 cycle to store the incremented count field into main storage 10. Next, an A1 cycle is taken to determine if the incremented count field is greater than, or equal to, the limit field. If the count is less than the limit, the ALU carry latch AC 95 is set by ALU 45, and if the count is greater than, or equal to, the limit, the ALU carry latch 95 is reset by ALU 45. In the example under consideration, the count is greater than, or equal to, the limit and hence, the ALU carry latch AC 95 is reset by ALU 45. It should be noted that if the count were less than the limit, the send count instruction execution would be complete, and I-fetch cycles would be activated to execute the next sequential instruction of the TDE 0 instruction stream.

Because the ALU carry latch AC 95 is reset, the control unit 100 sets the ST latch 97 and, thereafter, initiates an A2 CPU cycle for incrementing the contents of OP 1 SAR 54 by two. The incremented value is then transferred to PCH SAR 56 during a T2 CPU cycle. This T2 cycle is then followed by a S1 CPU cycle for loading SA register 36 with a PCH value from main storage 10. Remove cycles are then taken so as to dequeue TDE 0 from SRC 1 and enqueue TDE 0 to the TDQ. Once this is accomplished, the dispatch cycles are activated, and the task switch from TDE 1 to TDE 0 occurs. Control is then returned to the previously unsatisfied receive count instruction of TDE 0. Instruction execution continues for the receive count instruction by executing I-fetch cycles and then activating the receive count cycles. The receive count cycles proceed exactly as described before, except that this time the ALU carry latch AC 95 is in the set state and hence, instead of proceeding to remove cycles, a S2 cycle is taken to store the decremented count field from the SA register 36 back into the count field of SRC 1 in main storage 10. This completes execution of the receive count instruction, and instruction execution continues with the next sequential instruction of the task TDE 0 instruction stream.

In addition to the receive message, receive count, send message and send count instructions, there are also enqueue message and dequeue message instructions. These instructions are shown in FIG. 3. The enqueue message instruction (ENQM) has an enqueue message OP field, an I field and an OP 1 field. The I field contains an address for pointing to base register 2 of LSR array registers 70. The enqueue message instruction functions to enqueue a SRM onto a SRQ in a manner similar to that of the send message instruction. It is seen in FIG. 24 that, upon entering the enqueue message cycles, the sequence control latches S, R, ST and RT 87, 88, 97 and 98 are all set to the reset state. Thereafter, T2, S1 and T2 cycles are taken, as in the case of a send message instruction. After the last T2 cycle, insert cycles are taken.

The dequeue message instruction (DEQM) has a format similar to the receive message instruction and functions in a manner similar to the receive message instruction. It is seen that in FIG. 26, the sequence control latches S, R, ST and RT 87, 88, 97 and 98 are all set to the reset state and, thereafter, a T2 cycle is taken. Upon completion of the T2 cycle, the operation switches to remove cycles, as in the case of a receive message instruction.

Figure 32:
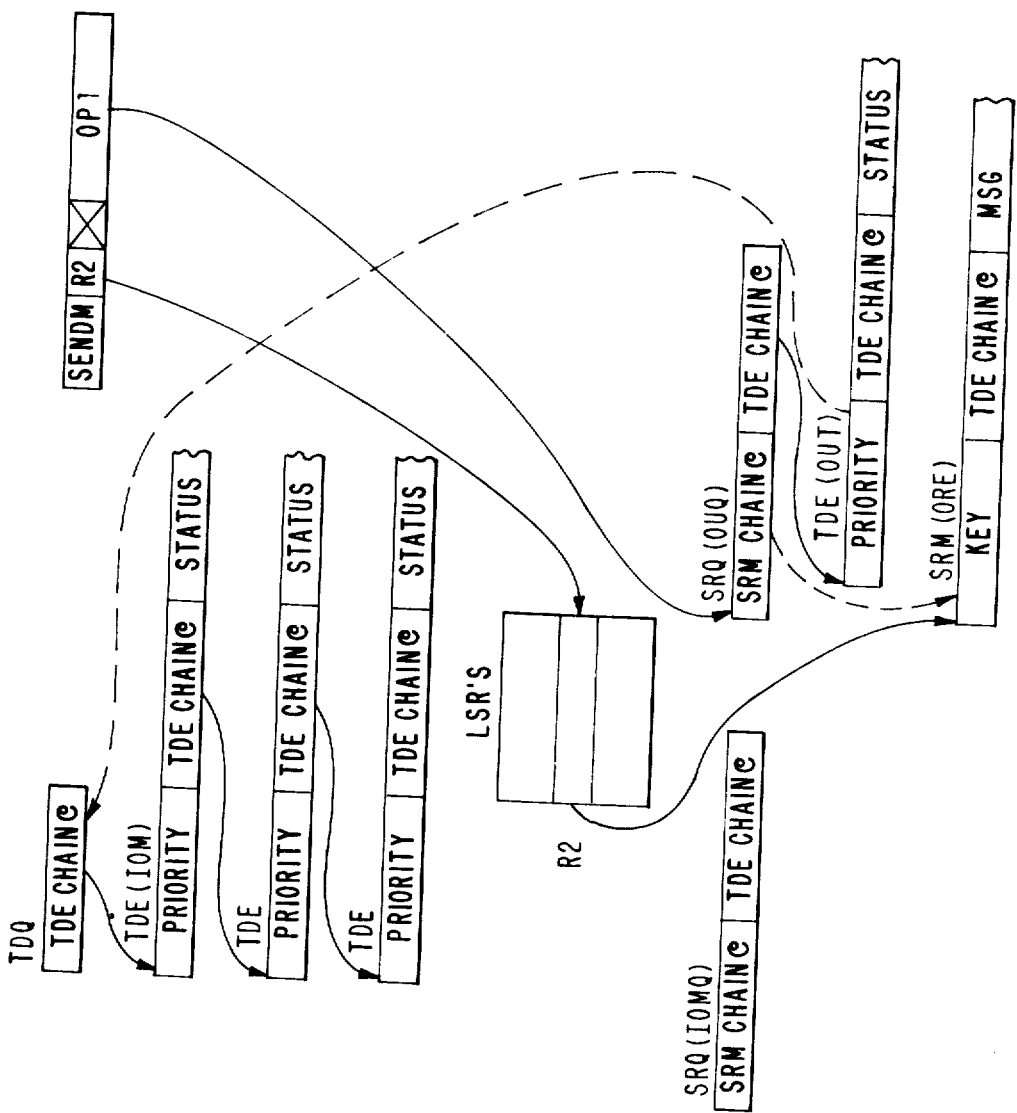
FIG. 32 is a diagram illustrating an I/O task as the active task issuing a send message instruction to a send receive queue.
Figure 33:
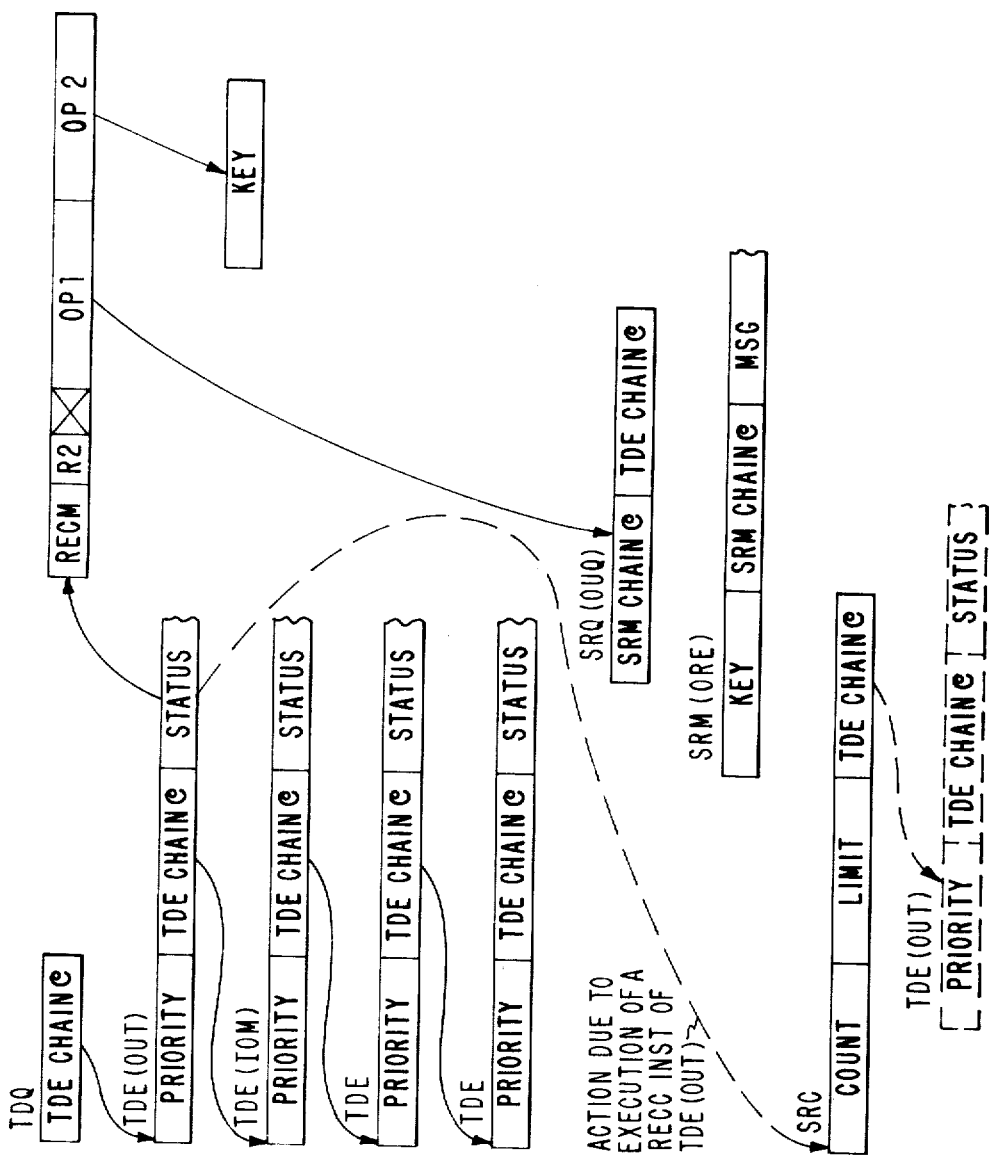
FIG. 33 is a diagram illustrating the state of the task dispatching queue and send receive queue after the send message instruction of FIG. 32 has been executed, and showing that the new active task issues a receive message instruction to the same send receive queue which has been issued the send message instruction.

I/O tasks are enqueued on the TDQ in the same manner as any other task. In FIG. 32, the I/O task is illustrated as the highest priority TDE on the TDQ. The I/O task is identified by the abbreviation IOM, meaning I/O manager. The IOM task initiates an I/O request by executing a send message instruction. The send message instruction will enqueue a SRM onto a SRQ and dequeue any TDE's on that SRQ. In the example of FIG. 32, the SRM is identified as an ORE, which means operation request element. The TDE on the SRQ is an operational unit (OU) task (OUT). The OU task, dequeued from the SRQ and enqueued onto the TDQ, becomes the active task and handles the request by using a receive message operation. This is illustrated in FIG. 33.

Figure 34:
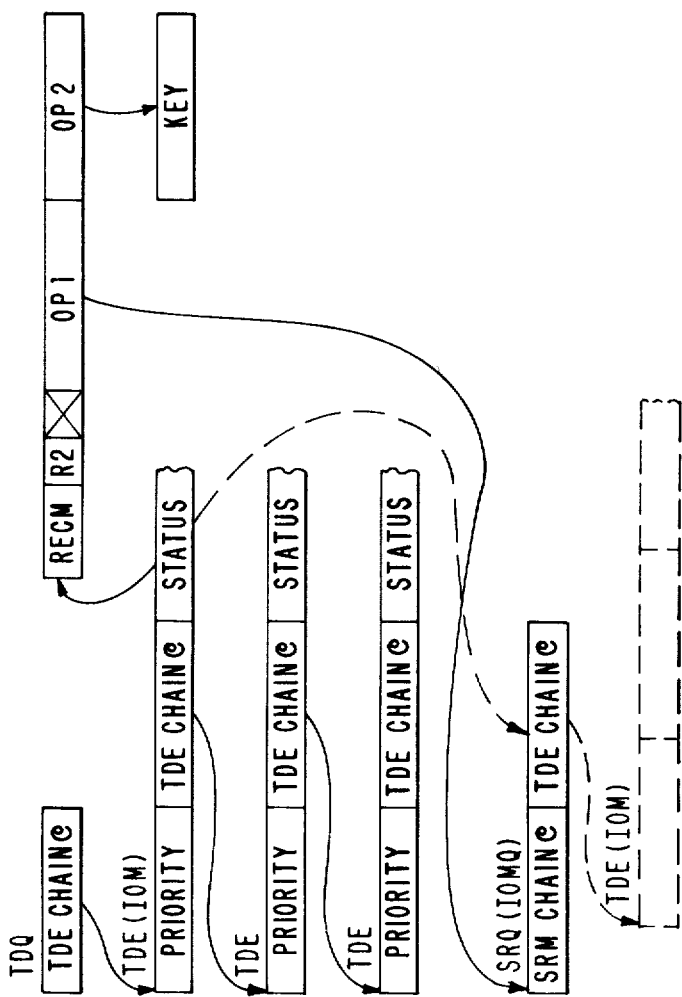
FIG. 34 is a diagram illustrating a new active task issuing a receive message instruction to another send receive queue.
Figure 35:
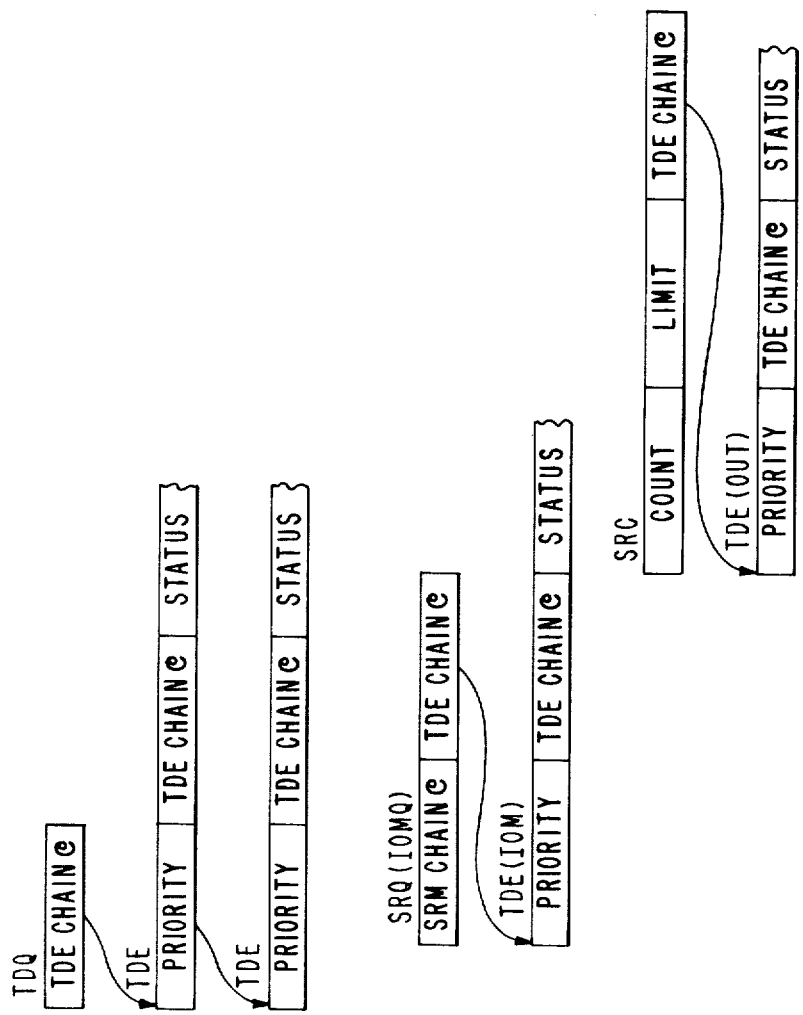
FIG. 35 is a diagram illustrating the state of the task dispatching queue, a send receive message queue and a send receive count queue with a task dispatching element waiting thereon.

The OU task interprets the request and issues a proper device command to the I/O channel 500, and then waits on the SRC until the I/O function is complete. The OU task includes a receive count (RECC) instruction in its instruction stream. This instruction is not satisfied, and, thus, TDE (OUT) is dequeued from the TDQ and enqueued onto the SRC queue. This operation is represented by the dashed line in FIG. 33. A task switch takes place as a result of the dequeuing operation, and the IOM task becomes the active task. The IOM task issues a receive message instruction which is not satisfied, and, consequently, the IOM task is dequeued from the TDQ and enqueued onto the IOM SRQ, pointed to by the OP 1 field of the receive message instruction, as illustrated in FIG. 34. A task switch takes place, and the highest priority task on the TDQ becomes the active task. The IOM task is waiting on the SRQ, and the OU task is waiting on the SRC, as illustrated in FIG. 35.

Figure 36:
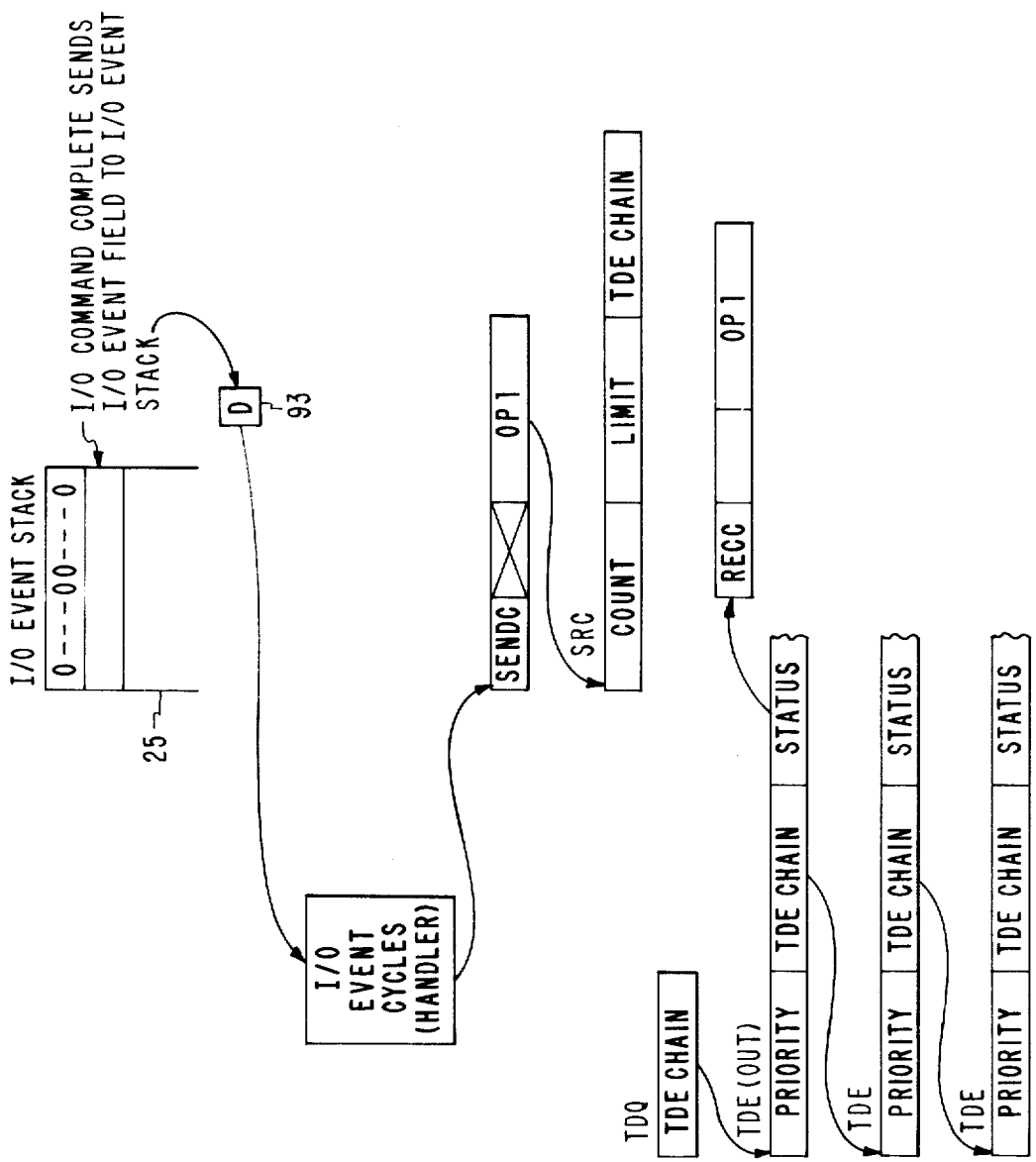
FIG. 36 is a diagram illustrating the I/O event handler.

When the I/O function is complete, the I/O channel sends a SRC address to an event stack 25, FIG. 36, which is in main storage 10, and sets the I/O latch 94 by means of a signal via line 512, FIG. 1. The I/O event field on the I/O event stack 25 is the address of the SRC on which the OU task is waiting. Because the I/O latch 94 was set by the signal from the I/O channel, then during I-fetch cycles, the operation will switch to I/O event cycles.

Figure 23:
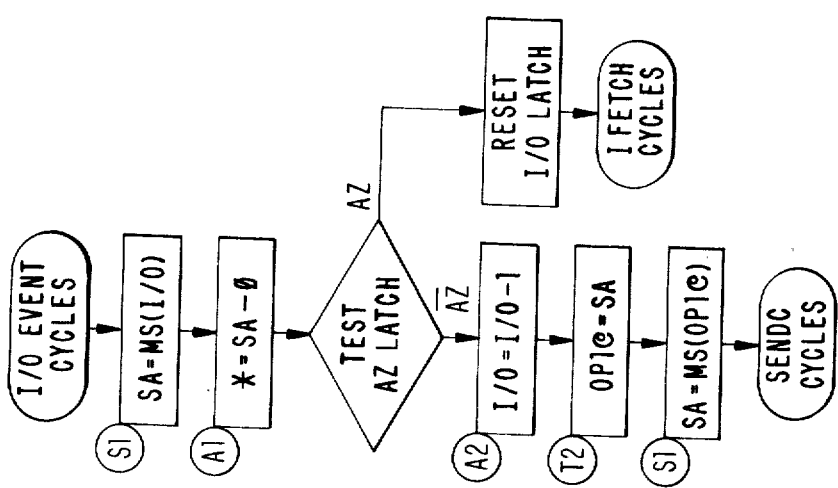
FIG. 23 is a flow diagram illustrating I/O event cycles.

The I/O event cycles, set forth in FIG. 23, perform the function of the I/O event handler. The first operation of the I/O event cycles is a S1 CPU cycle for fetching the SRC address from the event stack in main storage 10 and loading it into the SA register 36. It should be noted that the top entry of the event stack 25, in this particular example, contains all zeros. This all zeroes entry is used to indicate that the event stack is empty. Therefore, the next operation of the I/O event cycles is to determine if there is any I/O event field in the I/O event stack. This determination is made by taking an A2 CPU cycle for examining the contents of the SA register 36. If the I/O event stack is empty, ALU 45 sets the AZ latch 96. On the other hand, if there is an I/O event field on the I/O event stack, AZ latch 96 will be in the reset state. Therefore, the next operation is to test the AZ latch. If the AZ latch is set, the I/O latch 94 is reset and the operation switches to the I-fetch cycles and this time through the I-fetch cycles, the I/O latch 94 will be decoded as being in the reset state.

If the AZ latch 96 is reset and A2 CPU cycle is taken to decrement the contents of the I/O SAR 58 so that it will point to the next SRC address which, in this example, is the SRC address above the current one. It should be recognized that this is a matter of implementation. The I/O event stack, so far as the present invention is concerned, could be a set of registers, and these registers could be addressed by the contents of I/O SAR 58, and whether the address is incremented or decremented would be a matter of choice. In fact, a fixed register could address the I/O event stack of registers, and the contents of the I/O SAR 58 would be transferred to this register for addressing the I/O event stack of registers. In the particular example under consideration, there is no need to have a separate set of I/O event stack registers, because main storage 10 was adequate, both with respect to capacity and speed. Normally, if there were some critical speed requirements, the I/O event stack would be implemented as a set of registers rather than reserved positions in main storage.

A T2 CPU cycle follows the decrementing of the I/O SAR 58 to transfer the contents of SA register 36 into OP 1 SAR 54. A S1 cycle is then taken to load the SA register 36 with the contents of the main storage location pointed to by the address in OP 1 SAR 54. Send count cycles are then entered to send a count to the count field of the SRC and remove TDE's waiting on that SRC; i.e., in this particular instance, the OU task TDE. The operation just described repeats until all I/O events on the I/O event stack have been handled; i.e., until the I/O event stack is empty and the I/O latch 94 is reset.

Figure 37:
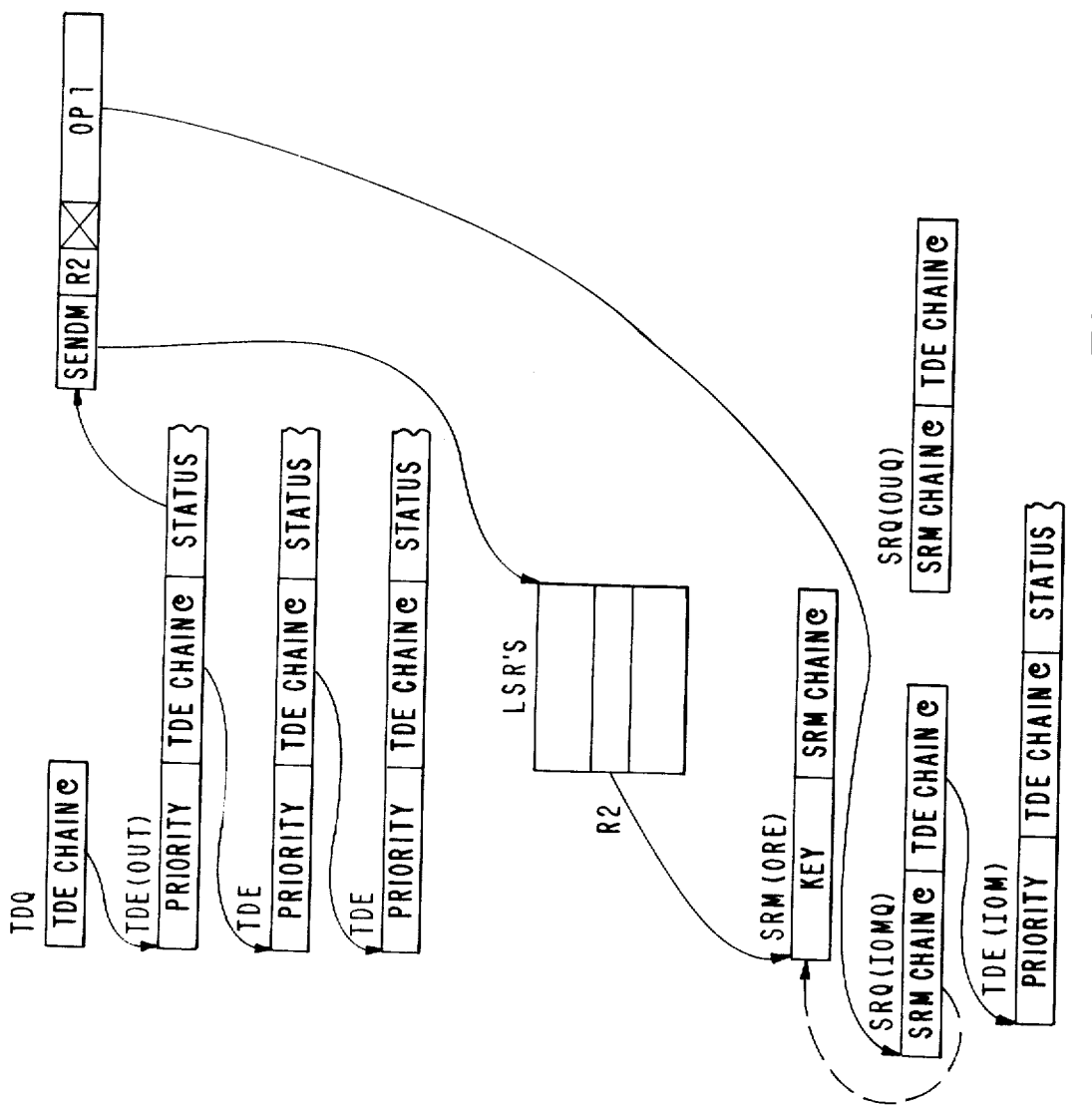
FIG. 37 is a diagram illustrating the sending of I/O completion status to the SRQ; and, FIG. 38 is a diagram illustrating the IOM task receiving the I/O completion status from the SRQ.

It is seen in FIG. 36 that the OU task has been taken out of the wait state and enqueued on the TDQ. The the receive count instruction is satisfied when the OU task had been dispatched. The OU task then sends a SRM, which contains completion status, to a SRQ; i.e., the OUQ. This operation is represented in FIG. 37, where the OU task has a send message instruction containing an R2 field for addressing a LSR 70. The selected LSR 70 contains an address which points to the SRM, in this instance an operational request element (ORE object. This SRM (ORE) object is enqueued onto the SRQ (IOM), which is pointed to by the OP 1 field of the SENDM instruction. Additionally, the TDE (IOM) waiting on the SRQ (IOM) is enqueued on the TDQ, and a task switch takes place. The IOM task is then informed of the completion status by receiving the ORE from the response queue. This is illustrated in FIG. 38, where a RECM instruction of the active task TDE (IOM) is executed.

Figures 1, 2:
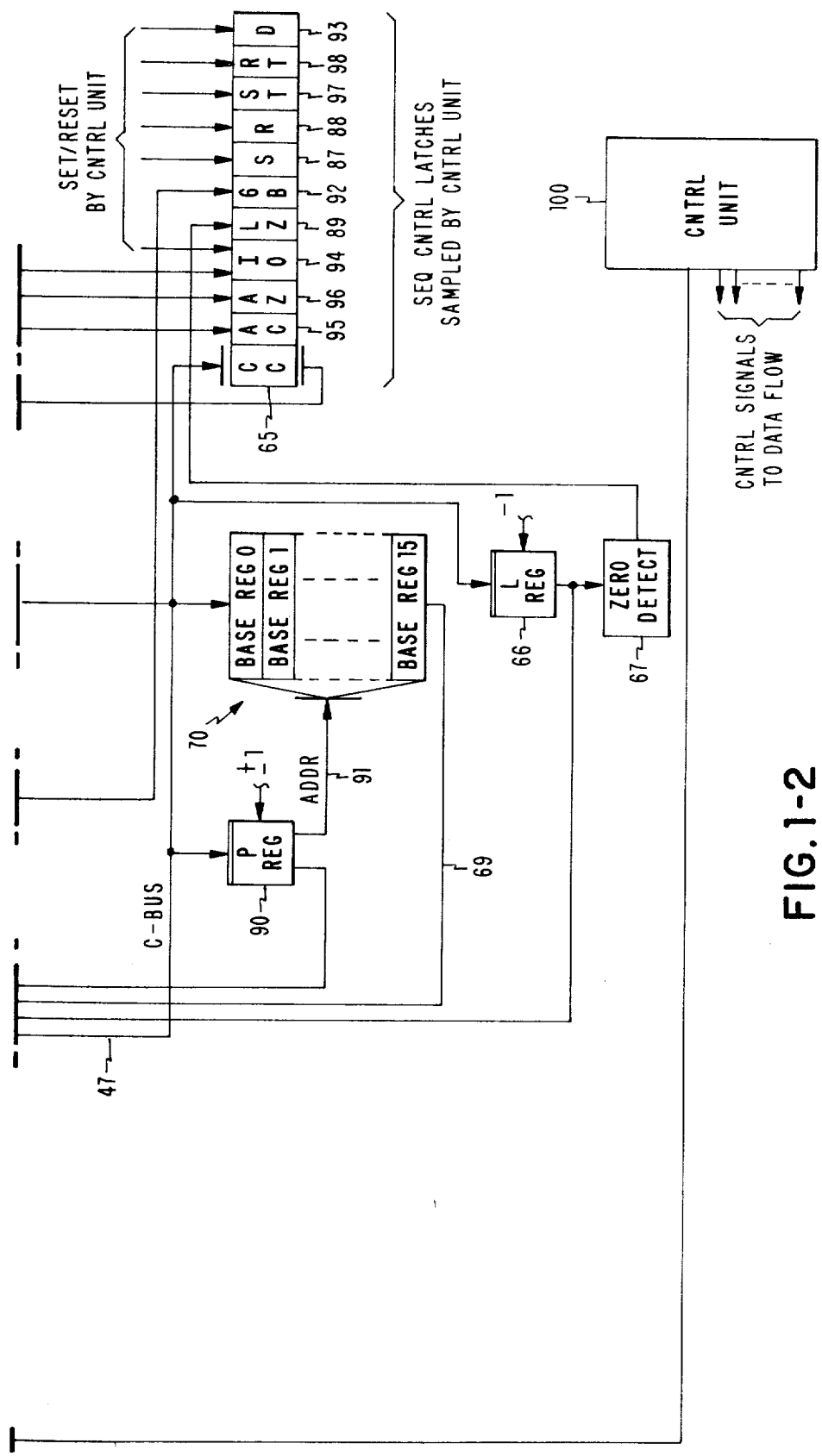
Figure 2:
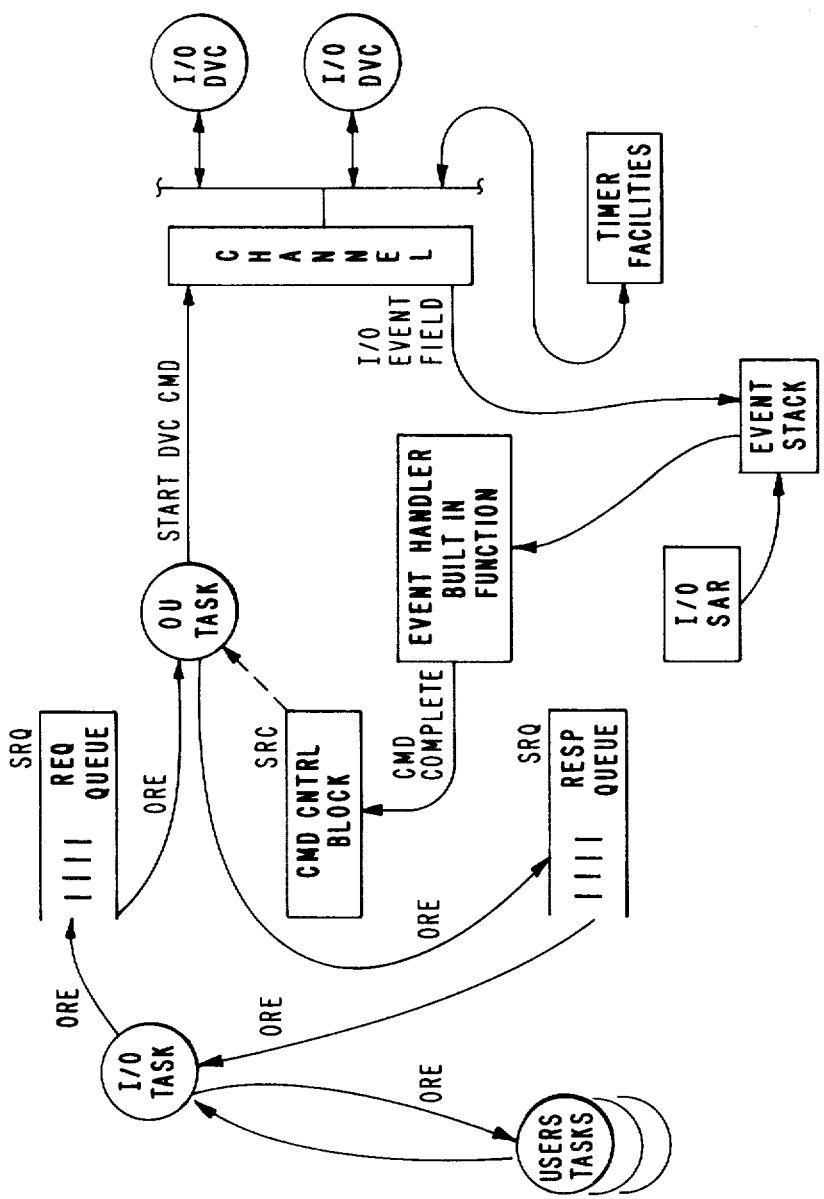

The particular operation described is also schematically illustrated in FIG. 2, where it should be noted that user tasks originate I/O requests to I/O tasks and field responses, which indicate completion by using the send receive operations to SRQ's. It should also be noted that timer events are signaled to the system as an I/O event and the I/O event handler functions in the manner previously described to perform a send count to a SRC for each timer event. These SRC's associated with timer events are managed by a system timer task to provide timing services to the system.

What is claimed is:

1. Task handling apparatus in a computer system having main storage interconnected with a central processing unit (CPU) and I/O units, where said CPU includes means for processing an active task dispatching element comprising:
   a source of task dispatching elements, each having a priority indicator, said task dispatching elements including CPU and I/O task dispatching elements,
   task queue register means selectively loadable to store said task dispatching elements,
   means for loading said task queue register means with task dispatching elements in priority sequence from said source, where the highest priority task dispatching element is dispatchable as an active task and all other task dispatching elements are inactive dispatchable task dispatching elements,
   task dispatching means for determining the highest priority task dispatching element in said task queue register means,
   a source of task messages, each having a priority key,
   intertask communication queue register means selectively loadable with task dispatching elements and with task messages,
   intertask communication means comprising send means activatable by said active task dispatching element for loading messages from said source of messages in said intertask communication queue register means and for unloading task dispatching elements from said intertask communication queue register means and loading said unloaded task dispatching elements in priority sequence in said task queue register means, said send means activating said task dispatching means whenever said send means loads one or more task dispatching elements in said task queue register means, and receive means activatable by said active task dispatching element for unloading messages for said active task dispatching element from said intertask communication queue register means and in the absence of any message for said active task dispatching element for unloading said active task dispatching element from said task queue register means and loading it in priority sequence in said intertask communication queue register means, said receive means activating said task dispatching means whenever said receive means unloads said active task dispatching element from said task queue register means, and
   task switching means having first means responsive to said task dispatching means having been activated in response to said send means loading said task queue register means with a task dispatching element and said task dispatching means having determined that said loaded task dispatching element has a priority higher than the priority of said active task dispatching element for making said active task dispatching element inactive dispatchable and said higher priority loaded task dispatching element an active task dispatching element and having second means responsive to said task dispatching means having been activated in response to said receive means unloading said active task dispatching element from said task queue register means for making the highest priority task dispatching element remaining in said task queue register means an active task dispatching element.

2. The task handling apparatus of claim 1 wherein said task dispatching elements having in addition to said priority indicator, a task dispatching element address field and a task status field, said task status field including information for starting or continuing execution of the associated task.

3. The task handling apparatus of claim 1 further comprising:
   I/O event handler means having first means responsive to an I/O event occurring in one of said I/O units for storing status of said I/O event and second means for activating said send means for loading an I/O task dispatching element in priority sequence in said task queue register means.

4. The task handling apparatus of claim 1, wherein said task queue register means is in main storage of said computer system.

5. The task handling apparatus of claim 1, wherein said task messages in addition to said priority key include a message address field and a message information field, said messages being loaded in said intertask communication queue register means according to said priority key.

6. The task handling apparatus of claim 1 further comprising:
   an intertask communication counter register means selectively loadable and unloadable with task dispatching elements, limit values and count values where said receive means loads task dispatching elements in said intertask communication counter register means and send means unloads task dispatching elements from said intertask communication counter register means,
   means for selectively incrementing said count value,
   comparing means for compring said incremented count value, with said limit value,
   indicating means responsive to said comparing means for indicating that said incremented count value is greater or equal to said limit value, or is less than said limit value said send means being responsive to said indicating means indicating that said incremented count value is greater than or equal to said limit value to unload any task dispatching element in said intertask communication counter register means and load the same in priority sequence in said task queue register means.

7. The task handling apparatus of claim 6, wherein said indicating means is a latch.

8. The task handling apparatus of claim 6, wherein said comparing means compares said count value with said limit value, said indicating means being responsive to said comparing means to indicate that said count value is greater than or equal to said limit value or that said count value is less than said limit value, and further comprising:

means responsive to said indicating means indicating that said count value is greater than or equal to said limit value for decrementing said count value by said limit value, said receive means being responsive to said indicating means indicating the said count value is less than said limit value unloads the active task dispatching element from said task queue register means and loads the same in priority sequence in said intertask communication counter register means.

9. Task handling apparatus for a computer system having main storage for storing data and instructions, storage access control mechanism for accessing main storage, a central processing unit (CPU) interconnected with said main storage and said storage access control mechanism for providing signals to said storage access control mechanism and operable to execute said instructions accessed from said main storage, and to transfer data to and from said main storage, and input/output (I/O) devices connected to said CPU to perform I/O functions, the improvement comprising:

a source of task dispatching elements including CPU and I/O task dispatching elements, each task dispatching element having a priority indicator, task dispatching means including task queue register means, means for loading said task queue register means with task dispatching elements in priority sequence from said source of task dispatching elements, priority determining means for determining the highest priority task dispatching element in said task queue register means, said task dispatching means being operable to render the determined highest priority task dispatching element active, all other task dispatching elements in said task queue register means being in an inactive dispatchable state, a source of task messages, each having a priority key, intertask communication queue register means for storing inactive waiting task dispatching elements in priority sequence and for storing messages in key sequence, and intertask communication means including a send mechanism for providing a message to an inactive waiting task by loading a message from said source of messages in said intertask communication queue register means and operable to unload inactive waiting task dispatching elements from said intertask communication queue register means and to load in priority sequence said inactive waiting task dispatching elements in said task queue register means, and a receive mechanism for unloading messages from said intertask communication queue means and providing said unloaded messages to said active task and for unloading said active task dispatching element from said task queue register means in the absence of a message for said active task and loading said unloaded task dispatching element in said intertask communication queue register means, said task dispatching means renders the highest priority inactive dispatchable task dispatching element in said task queue register means as determined by said priority determining means as the active task dispatching element.

* * * * *